United States Patent
Jin et al.

(10) Patent No.: US 10,623,991 B2
(45) Date of Patent: Apr. 14, 2020

(54) METHOD AND APPARATUS FOR COMMUNICATION IN WIRELESS COMMUNICATION SYSTEM

(71) Applicant: Samsung Electronics Co., Ltd., Gyeonggi-do (KR)

(72) Inventors: Seungri Jin, Gyeonggi-do (KR); Soenghun Kim, Gyeonggi-do (KR); Sangbum Kim, Gyeonggi-do (KR); Donggun Kim, Seoul (KR); Jaehyuk Jang, Gyeonggi-do (KR)

(73) Assignee: Samsung Electronics Co., Ltd. (KR)

(*) Notice: Subject to any disclaimer, the term of this patent is extended or adjusted under 35 U.S.C. 154(b) by 0 days.

(21) Appl. No.: 15/966,966

(22) Filed: Apr. 30, 2018

(65) Prior Publication Data

US 2018/0317130 A1 Nov. 1, 2018

(30) Foreign Application Priority Data

Apr. 28, 2017 (KR) .................. 10-2017-0055205

(51) Int. Cl.
| | |
|---|---|
| *H04W 28/06* | (2009.01) |
| *H04W 76/27* | (2018.01) |
| *H04W 24/10* | (2009.01) |
| *H04B 7/06* | (2006.01) |
| *H04W 28/26* | (2009.01) |
| *H04W 28/02* | (2009.01) |

(Continued)

(52) U.S. Cl.
CPC ........ *H04W 28/065* (2013.01); *H04B 7/0626* (2013.01); *H04W 24/10* (2013.01); *H04W 28/0278* (2013.01); *H04W 28/26* (2013.01); *H04W 72/0406* (2013.01); *H04W 72/1284* (2013.01); *H04W 76/27* (2018.02); *H04L 1/1812* (2013.01); *H04L 1/1854* (2013.01); *H04L 1/1896* (2013.01)

(58) Field of Classification Search
None
See application file for complete search history.

(56) References Cited

U.S. PATENT DOCUMENTS

| | | |
|---|---|---|
| 2014/0293896 A1 | 10/2014 | Kuo |
| 2017/0055191 A1 | 2/2017 | Shinada et al. |

(Continued)

OTHER PUBLICATIONS

Ericsson, Data Duplication in Lower Layers (HARQ), R2-1702032, 3GPP TSG-RAN WG2 #97, Feb. 13-17, 2017, 6 pages.

(Continued)

*Primary Examiner* — Ruihua Zhang
(74) *Attorney, Agent, or Firm* — The Farrell Law Firm, P.C.

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. An embodiment of the present disclosure relates to a method and an apparatus for transmitting data in a next-generation mobile communication system.

12 Claims, 51 Drawing Sheets

(51) Int. Cl.
*H04W 72/04* (2009.01)
*H04W 72/12* (2009.01)
*H04L 1/18* (2006.01)

(56) References Cited

U.S. PATENT DOCUMENTS

2017/0310433 A1* 10/2017 Dinan .................... H04W 74/08
2018/0279163 A1*  9/2018 Wu ........................ H04W 76/14
2018/0279168 A1*  9/2018 Jheng ..................... H04W 76/20
2018/0279262 A1*  9/2018 Babaei ...................... H04L 1/00
2018/0309660 A1* 10/2018 Loehr ................. H04W 36/0066
2019/0274183 A1*  9/2019 Pelletier .............. H04W 52/365

OTHER PUBLICATIONS

Oppo, "MAC Operation on the Duplicated Data from PDCP Layer", R2-1702546, 3GPP TSG-RAN2 #97bis, Apr. 3-7, 2017, 2 pages.
Huawei, HiSilicon, "Activating and Deactivating Packet Duplication", R2-1703529, 3GPP TSG-RAN2 #97bis, Apr. 3-7, 2017, 4 pages.
International Search Report dated Aug. 10, 2018 issued in counterpart application No. PCT/KR2018/004772, 7 pages.
Intel Corporation, "Packet Duplication for URLLC in DC and CA Deployment", R2-1700336, 3GPP TSG-RAN WG2 NR Ad-hoc, Jan. 17-19, 2017, 3 pages.
Ericsson, "Controlling of Duplication in Case of CA", R2-1702753, 3GPP TSG-RAN WG2 #97bis, Apr. 3-7, 2017, 4 pages.
European Search Report dated Feb. 28, 2020 issued in counterpart application No. 18790544.3-1205, 9 pages.

* cited by examiner

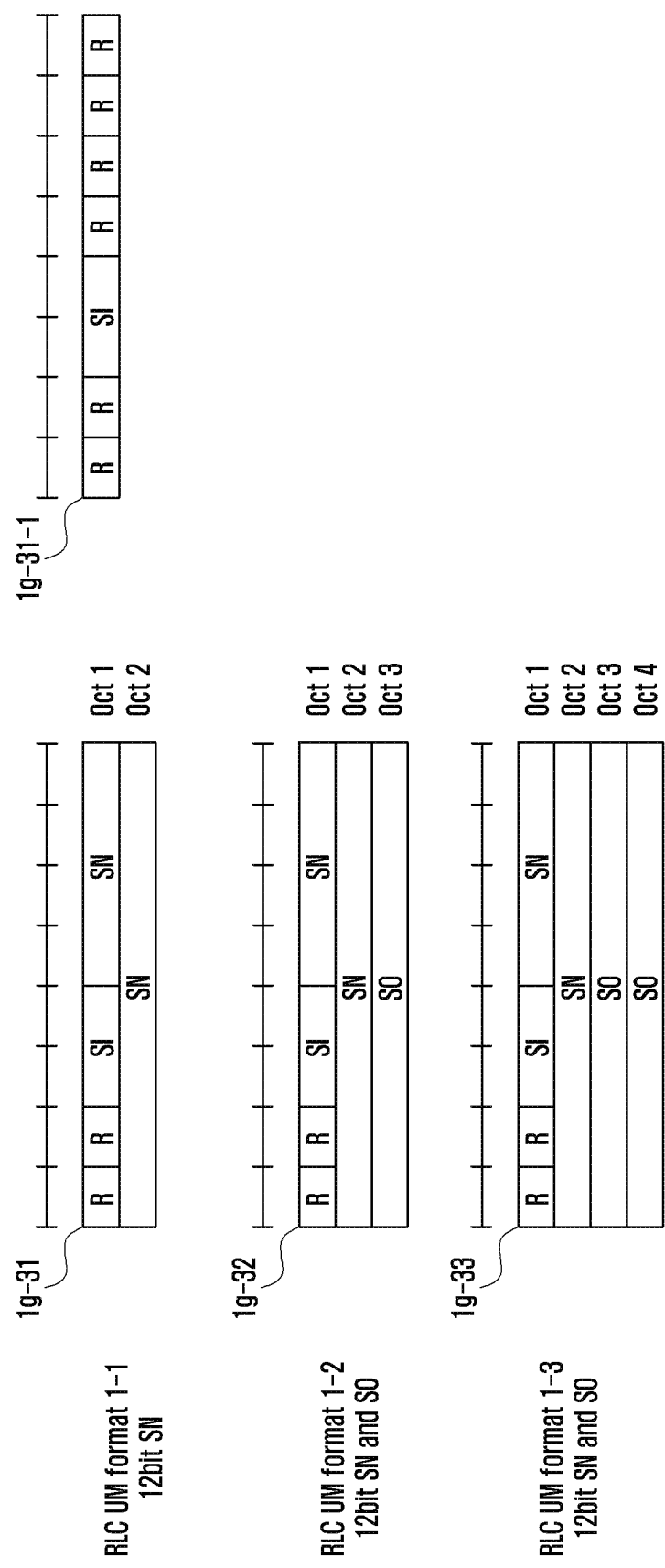

In LTE, there are several kinds of Modification Periods:
1) SFN mod m= 0 (for normal case)
1) (H-SFN * 1024 + SFN) mod m=0 (for BL UEs and UEs in CE)
2) H-SFN mod 256 =0 (called eDRX acquisition period)
3) H-SFN mod 1024 =0 (eDRX acquisition period for NB-IoT)

The period of 3) and 4) are fixed, e.g. eDRX acquisition period corresponds to max eDRX cycle (43.69 min)

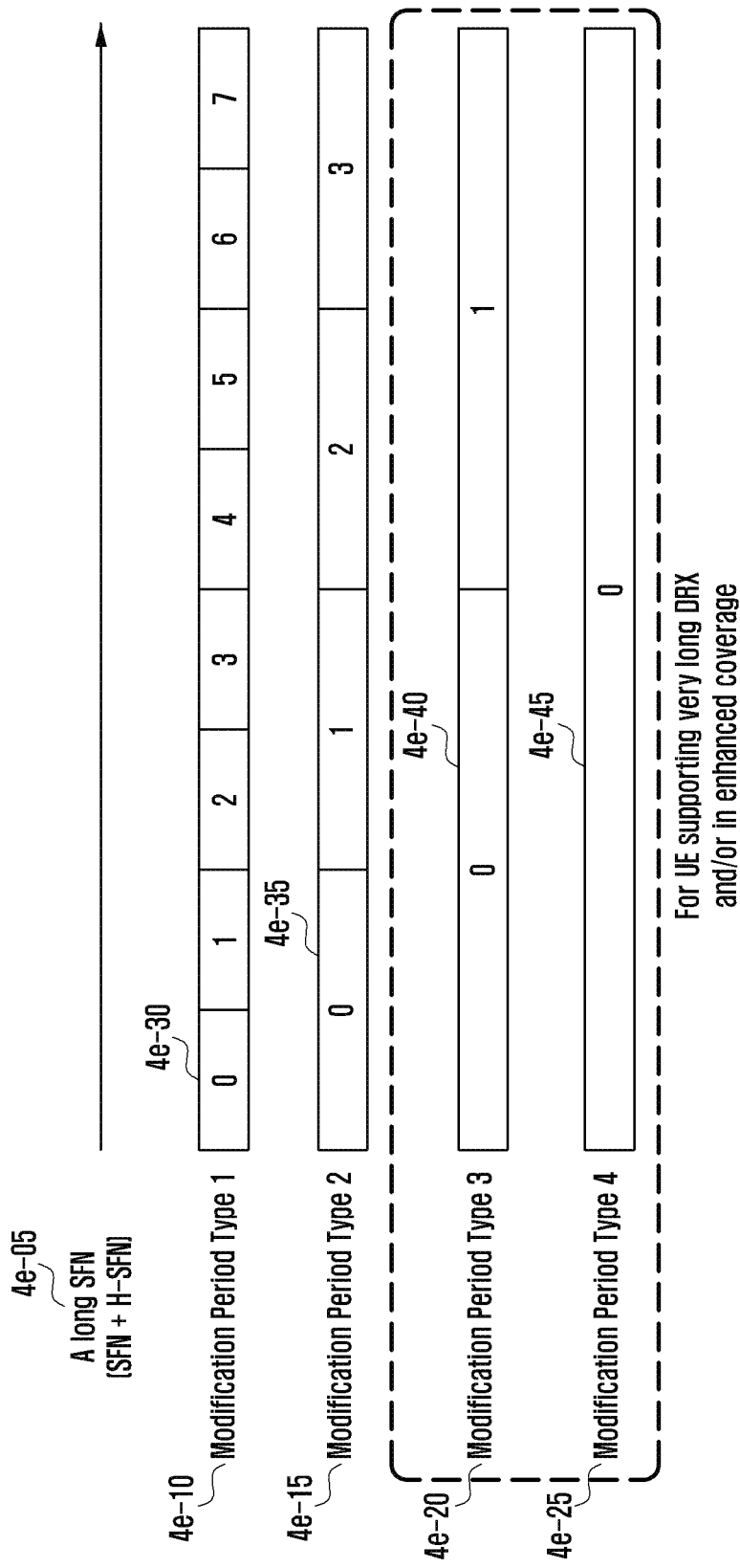

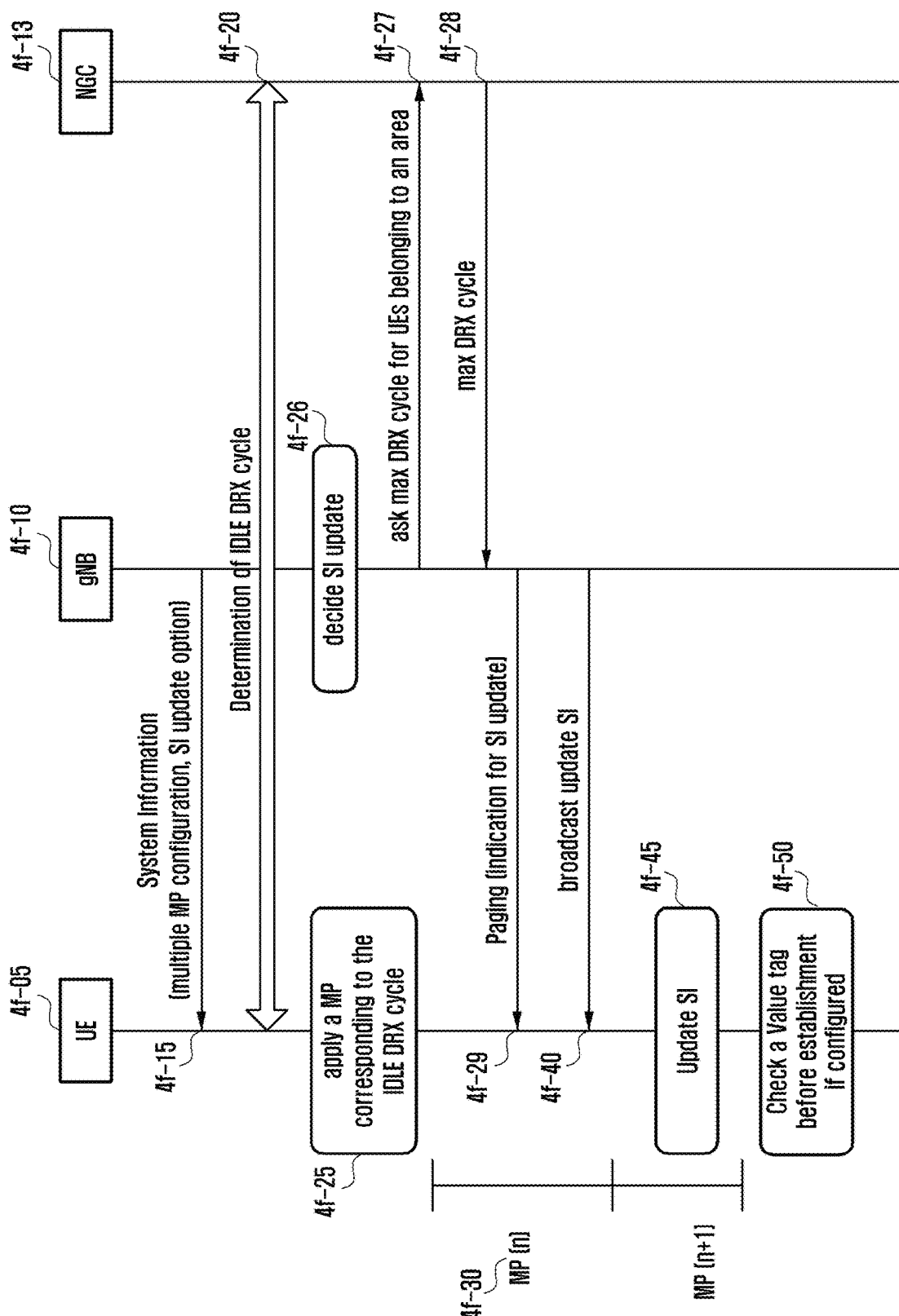

METHOD AND APPARATUS FOR COMMUNICATION IN WIRELESS COMMUNICATION SYSTEM

CROSS-REFERENCE TO RELATED APPLICATION(S)

This application is based on and claims priority under 35 U.S.C. § 119(a) to Korean Patent Application Serial number 10-2017-0055205, filed on Apr. 28, 2017 in the Korean Intellectual Property Office, the entire disclosure of which is incorporated herein by reference.

BACKGROUND

1. Field

The present disclosure relates, generally, to a communication method, and more particularly, to a method and apparatus configured for communication in a next-generation wireless communication system.

2. Description of the Related Art

To meet the demand for wireless data traffic, which has increased since deployment of 4G communication systems, efforts have been made to develop an improved 5G or pre-5G communication system, also called a 'beyond 4G network' or a 'post LTE system'. The 5G communication system implements higher frequency (mmWave) bands, e.g., 60 GHz bands, to accomplish higher data rates. To decrease propagation loss of the radio waves and increase the transmission distance, beamforming, massive multiple-input multiple-output (MIMO), full dimensional MIMO (FD-MIMO), array antenna, an analog beam forming, large scale antenna techniques are contemplated in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency-shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Moreover, the Internet is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as sensing technology, wired/wireless communication and network infrastructure, service interface technology, and security technology have been used for IoT implementation, a sensor network, a machine-to-machine (M2M) communication, machine type communication (MTC), and so forth have been recently researched. Such an IoT environment may provide intelligent Internet technology services that can be used for collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

Various attempts have been made to apply 5G communication systems to IoT networks. For example, technologies such as a sensor network, MTC, and M2M communication may be implemented by beamforming, MIMO, and array antennas. Application of a cloud RAN is also an example of convergence between the 5G technology and the IoT technology.

Further, a next-generation mobile communication system, when a radio link control (RLC) layer performs segmentation operation, may split an RLC service data unit (SDU) into several segments based on a segment offset (SO) field. For each segment, an SO field is included in an RLC header to indicate at what location of the original RLC SDU the segmentation has come. However, since an SO field may have a size of about 2 bytes, inclusion of such an SO field for each segment may increase overhead during data transmission and may result in a waste of radio resources.

SUMMARY

The disclosure has been made to address at least the disadvantages described above and to provide at least the advantages described below.

Accordingly, an aspect of the disclosure provided a method for reducing overhead in a wireless communication system.

An aspect of the disclosure provides a method for transmitting packet-duplicated data introduced in a next-generation mobile communication system. A scheduler can be required to determine how much data is to be duplicated. That is, duplicated data should be transmitted from different time resources through different carriers or different medium access control (MAC) PDUs, and transmission resources should not be allocated so that all data are transmitted from one MAC PDU. Accordingly, an aspect of the disclosure provides a method for mapping the method for transmitting the packet-duplicated data newly introduced in the next-generation mobile communication system to different logical channel groups.

An aspect of the disclosure provides a method for not increasing complexity caused by unnecessary packet duplication, i.e., when packet duplication introduced in the next-generation mobile communication system is used.

An aspect of the disclosure provides a method for optimizing the SO field when the RLC layer performs segmentation in the next-generation mobile communication system. Overhead during the data transmission can be reduced, and the radio resources can be efficiently used.

Further, according to an aspect of the disclosure, the duplicated data can be transmitted from different time resources through different carriers or different MAC PDUs, and thus the reliability can be improved through the packet duplication. When the duplicated data uses the same logical channel group, the resources for the duplicated data can be allocated by introducing the new buffer status report.

An aspect of the disclosure, by introducing a method in which the terminal selects the transmission path or selectively performs the packet duplication in accordance with the channel situation in the next-generation mobile communication system, provides the communication method suitable to the channel situation can be used, and unnecessary packet duplication can be prevented to reduce signaling and system complexity.

In accordance with an embodiment, there is provided a method for wireless communication by a terminal. The method includes receiving a control message including configuration information on a logical channel from a base station, mapping, based on the configuration information, first data of a first logical channel to a first cell and second data of a second logical channel to a second cell, and transmitting the first data on the first cell and the second data on the second cell to the base station.

In accordance with an embodiment, there is provided a method for wireless communication by a base station. The method includes transmitting a control message including configuration information on a logical channel to a terminal, and receiving, based on the configuration information on the logical channel, first data of a first logical channel on a first cell and second data of a second logical channel on a second cell from the terminal.

In accordance with an embodiment, there is provided a terminal that includes a transceiver and at least one processor coupled with the transceiver and configured to receive, from a base station, a control message including configuration information on a logical channel, map, based on the configuration information, first data of first logical channel to a first cell and second data of second logical channel to a second cell, and transmit, to the base station, the first data on the cell and the second data on the second cell.

In accordance with an embodiment, there is provided a base station that includes a transceiver and at least one processor coupled with the transceiver and configured to transmit a control message including configuration information on a logical channel to a terminal and receive, based on the configuration information on the logical channel, first data of a first logical channel on a first cell and second data of a second logical channel on a second cell from the terminal.

BRIEF DESCRIPTION OF THE DRAWINGS

The above and other aspects, features and advantages of certain embodiments of the disclosure will be more apparent from the following detailed description taken in conjunction with the accompanying drawings, in which:

FIG. 4E is a diagram explaining the concept of configuration of a plurality of modification periods according to a fourth embodiment of the present disclosure;

FIG. 4F is a flowchart of a method of updating system information based on a plurality of modification periods, according to an embodiment;

DETAILED DESCRIPTION

Figure 1A:
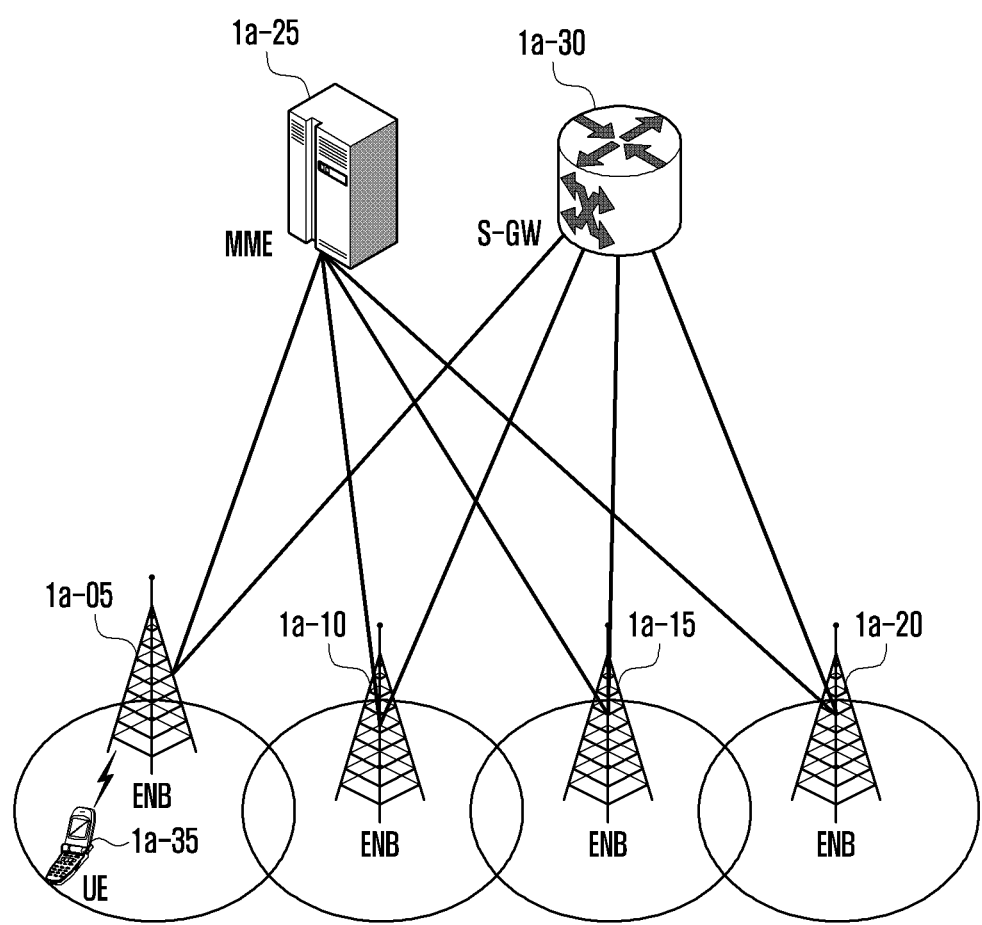
FIG. 1A is a diagram of a structure of a long term evolution (LTE) system, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device may indicate different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an IoT device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" may indicate a person using an electronic device or a device (e.g., an artificial intelligence electronic device) using an electronic device.

Hereinafter, terms and titles that are defined in the $3^{rd}$ generation partnership project long term evolution (3GPP LTE) standards are used in the disclosure. However, the disclosure is not limited by the terms and titles, but can be equally applied to systems following other standards. In the disclosure, an evolved node B (eNB) may be used interchangeably with a gNB (5G base station). That is, a base station described as the eNB may be indicated as the gNB.

FIG. 1A is a diagram of an LTE system, according to an embodiment. Referring to FIG. 1A, a RAN of an LTE system is composed of evolved node Bs (eNBs, ENBs, node Bs, or base stations) 1a-05, 1a-10, 1a-15, and 1a-20, a mobility management entity (MME) 1a-25, and a serving-gateway (S-GW) 1a-30. User equipment (a UE or terminal) 1a-35 accesses to an external network through the ENBs 1a-05 to 1a-20 and the S-GW 1a-30.

In FIG. 1A, the ENBs 1a-05 to 1a-20 correspond to existing node Bs of a universal mobile telecommunications system (UMTS). The ENBs 1a-05 to 1a-20 are connected to the UE 1a-35 on a radio channel, and play a more complicated role than that of the existing node B. In the LTE system, since all user traffics including a real-time service, such as a voice over internet protocol (VoIP) through an internet protocol, are serviced on shared channels, devices performing scheduling through summarization of state information, such as a buffer state, an available transmission power state, and a channel state of each UE, are necessary, and the ENBs 1a-05 to 1a-20 control this. In general, one ENB controls a plurality of cells. For example, in order to implement a transmission speed of 100 Mbps, the LTE system uses orthogonal frequency division multiplexing (OFDM) in a bandwidth of 20 MHz as a radio access technology (RAT). Further, the LTE system adopts an adaptive modulation & coding (AMC) scheme that determines a modulation scheme and a channel coding rate to match the channel state of the terminal. The S-GW 1a-30 is a device that provides a data bearer, and generates or removes the data bearer under the control of the MME 1a-25. The MME is a device that controls not only mobility management of the terminal but also various kinds of control functions, and is connected to the plurality of ENBs.

Figure 1B:
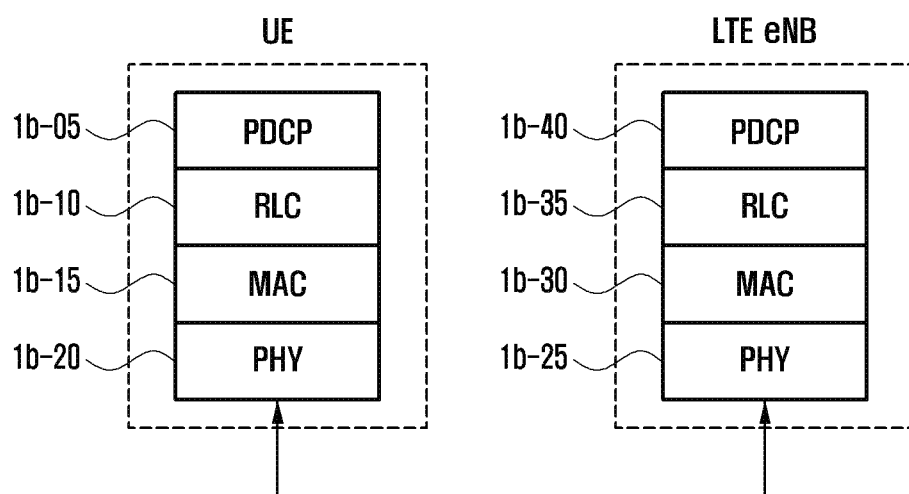
FIG. 1B is a diagram of a radio protocol structure of an LTE system, according to an embodiment.

FIG. 1B is a diagram of a radio protocol structure in an LTE system, according to an embodiment.

Referring to FIG. 1B, in UE or an ENB, a radio protocol of an LTE system is composed of a packet data convergence protocol (PDCP) 1b-05 or 1b-40, an RLC 1b-10 or 1b-35, and a MAC 1b-15 or 1b-30. The PDCP 1b-05 or 1b-40 controls IP header compression/decompression operations. The main functions of the PDCP are summarized as follows:

Header compression and decompression: robust header compression (ROHC) only;

Transfer of user data;

In-sequence delivery of upper layer physical data units (PDUs) at a PDCP reestablishment procedure for an RLC acknowledge mode (AM);

For split bearers in data communication (DC) (only support for an RLC AM): PDCP PDU routing for transmission and PDCP PDU reordering for reception;

Duplicate detection of lower layer SDUs at a PDCP reestablishment procedure for an RLC AM;

Retransmission of PDCP SDUs at handover and, for split bearers in DC, of PDCP PDUs at a PDCP data-recovery procedure, for an RLC AM;

Ciphering and deciphering;

Timer-based SDU discard in an uplink; and

The RLC 1b-10 or 1b-35 reconfigures a PDCP PDU with a proper size and performs an automatic repeat request (ARQ) operation and the like. The main functions of the RLC are summarized as follows:

Transfer of upper layer PDUs;

Error correction through an ARQ (only for AM data transfer);

Concatenation, segmentation, and reassembly of RLC SDUs (only for unacknowledged mode (UM) and AM data transfer);

Re-segmentation of RLC data PDUs (only for AM data transfer);

Reordering of RLC data PDUs (only for UM and AM data transfer);

Duplicate detection (only for UM and AM data transfer);

Protocol error detection (only for AM data transfer);

RLC SDU discard (only for UM and AM transfer); and

RLC reestablishment.

The MAC 1b-15 or 1b-30 is connected to several RLC layer devices configured in one terminal, and performs multiplexing/demultiplexing of RLC PDUs into/from MAC PDU. The main functions of the MAC are summarized as follows:

Mapping between logical channels and transport channels;

Multiplexing/demultiplexing of MAC SDUs belonging to one or different logical channels into/from transport blocks (TB) delivered to/from the physical layer on transport channels;

Scheduling information reporting;

hybrid ARQ (HARQ) function (error correction through HARQ);

Priority handling between logical channels of one UE;

Priority handling between UEs by means of dynamic scheduling;

multimedia broadcast multicast services (MBMS) service identification;

Transport format selection; and

Padding.

The physical layer 1b-20 or 1b-25 performs channel coding and modulation of upper layer data to configure and transmit OFDM symbols on a radio channel, or performs demodulation and channel decoding of the OFDM symbols received on the radio channel to transfer the demodulated and channel-decoded symbols to an upper layer.

Figure 1C:
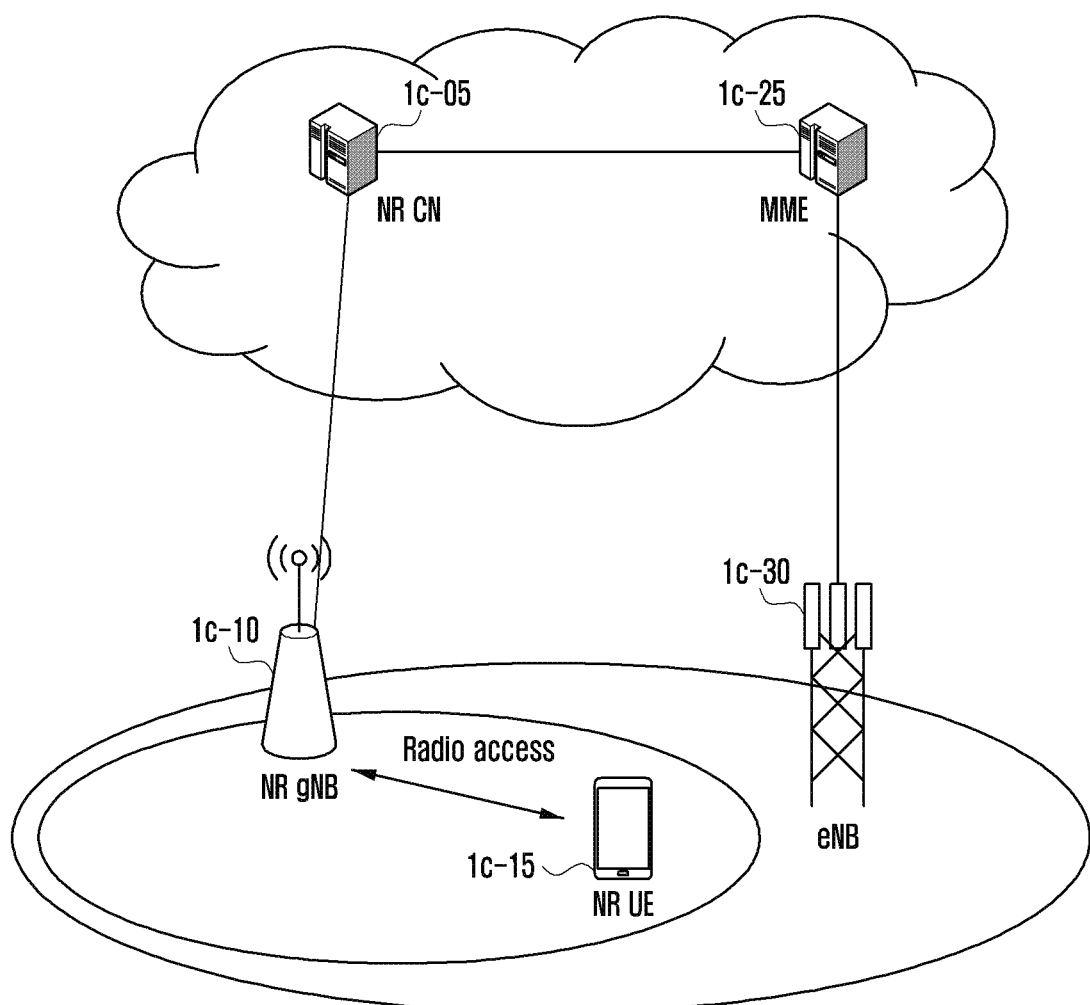
FIG. 1C is a diagram of a next-generation mobile communication system, according to an embodiment.

FIG. 1C is a diagram of a next-generation mobile communication system, according to an embodiment.

Referring to FIG. 1C, as illustrated, a RAN of a next-generation mobile communication system (NR or 5G) is composed of a new radio node B (NR gNB or NR ENB) 1c-10 and a new radio core network (NR CN) 1c-05. A new radio user equipment (NR UE or terminal) 1c-15 accesses to an external network through the NR gNB 1c-10 and the NR CN 1c-05.

In FIG. 1C, the NR gNB 1c-10 corresponds to an ENB of the existing LTE system. The NR gNB is connected to the NR UE 1c-15 on a radio channel, and thus it can provide a superior service than the service of the existing node B. Since all user traffics are serviced on shared channels in the next-generation mobile communication system, a device that performs scheduling through consolidation of status information, such as a buffer state of UEs, an available transmission power state, and a channel state, is required, and a new radio node B NR NB 1c-10 controls this operation. One NR gNB generally controls a plurality of cells. In order to implement ultrahigh-speed data transmission as compared with the existing LTE, the NR gNB may have a bandwidth that is greater than or equal to the existing maximum bandwidth, and a beamforming technology may be additionally grafted in consideration of OFDM as an RAT. Further, an AMC scheme determining a modulation scheme and a channel coding rate to match the channel state of the UE is adopted. The NR CN 1c-05 performs functions of mobility support, bearer setup, and quality of service (QoS) configuration. The NR CN is a device that controls a mobility management function of the UE, but also various kinds of control functions, and is connected to a plurality of ENBs. Further, the next-generation mobile communication system may interlock with the existing LTE system, and the NR CN is connected to an MME 1c-25 through a network interface. The MME is connected to an ENB 1c-30 that is the existing ENB.

Figure 1D:
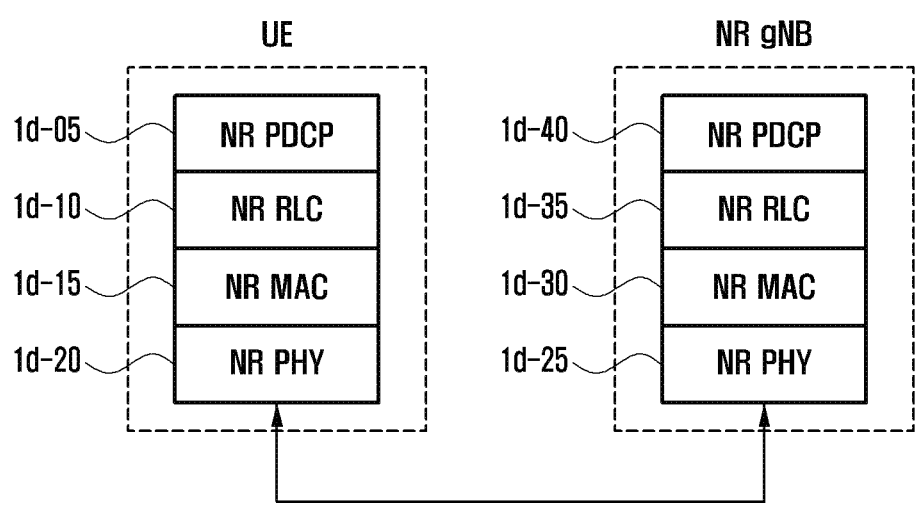
FIG. 1D is a diagram of a radio protocol structure of a next-generation mobile communication system, according to an embodiment.

FIG. 1D is a diagram of a radio protocol structure of a next-generation mobile communication system, according to an embodiment.

Referring to FIG. 1D, in UE or an NR ENB, a radio protocol of the next-generation mobile communication system is composed of an NR PDCP 1d-05 or 1d-40, an NR RLC 1d-10 or 1d-35, and an NR MAC 1d-15 or 1d-30. The main functions of the NR PDCP 1d-05 or 1d-40 may include the following functions:

Header compression and decompression: ROHC only;

Transfer of user data;

In-sequence delivery of upper layer PDUs;

PDCP PDU reordering for reception;

Duplicate detection of lower layer SDUs;

Retransmission of PDCP SDUs;

Ciphering and deciphering; and

Timer-based SDU discard in an uplink.

As described above, reordering of the NR PDCP devices may mean reordering of PDCP PDUs received from a lower layer based on PDCP sequence numbers (SNs). The reordering may include transfer of data to an upper layer in the order of reordering, recording of lost PDCP PDUs through reordering, status report for the lost PDCP PDUs to a transmission side, and retransmission request for the lost PDCP PDUs.

The main functions of the NR RLC 1d-10 or 1d-35 may include following functions:

Transfer of upper layer PDUs;

In-sequence delivery of upper layer PDUs;

Out-of-sequence delivery of upper layer PDUs;

Error correction through an ARQ;

Concatenation, segmentation, and reassembly of RLC SDUs;

Re-segmentation of RLC data PDUs;

Reordering of RLC data PDUs;

Duplicate detection;

Protocol error detection;

RLC SDU discard; and

RLC reestablishment.

As described above, in-sequence delivery of NR RLC devices may include in-sequence delivery of RLC SDUs received from a lower layer to an upper layer. When one original RLC SDU is segmented into several RLC SDUs to be received, the delivery may include reassembly and delivery of the RLC SDUs, reordering of the received RLC PDUs based on an RLC SN or a PDCP SN, recording of lost RLC PDUs through reordering, status report for the lost RLC PDUs to a transmission side, retransmission request for the lost PDCP PDUs, in-sequence delivery of only RLC SDUs just before the lost RLC SDU to an upper layer if there is the lost RLC SDU, in-sequence delivery of all RLC SDUs received before a specific timer starts its operation to an upper layer if the timer has expired although there is the lost RLC SDU, or in-sequence delivery of all RLC SDUs received up to now to an upper layer if the timer has expired although there is the lost RLC SDU. Further, the RLC PDUs may be processed in the order of their reception (in the order of their arrival regardless of the order of SNs), and may be transferred to the PDCP device in an out-of-sequence delivery manner. With regard to the segments, one complete RLC PDU may be reconfigured through reception of the segments stored in a buffer or to be received later, and then may be transferred to the PDCP device. The NR RLC layer may not include a concatenation function, and the function may be performed by an NR MAC layer or may be replaced by a multiplexing function of the NR MAC layer.

As described above, the out-of-sequence delivery of the NR RLC device can include a function of transferring the RLC SDUs received from a lower layer directly to an upper layer in an out-of-sequence manner. If one original RLC SDU is segmented into several RLC SDUs to be received, the delivery may include reassembly and delivery of the RLC SDUs, and recording of the lost RLC PDUs through storing and ordering the RLC SNs or PDCP SNs of the received RLC PDUs.

The NR MAC 1d-15 or 1d-30 may be connected to several NR RLC layer devices configured in one UE, and the main functions of the NR MAC may include the following functions:

Mapping between logical channels and transport channels;

Multiplexing/demultiplexing of MAC SDUs;
Scheduling information reporting;
HARQ function (error correction through HARQ);
Priority handling between logical channels of one UE;
Priority handling between UEs by means of dynamic scheduling;
MBMS service identification;
Transport format selection; and
Padding.

The NR PHY layer 1d-20 or 1d-25 may perform channel coding and modulation of upper layer data to configure and transmit OFDM symbols to a radio channel, or may perform demodulation and channel decoding of the OFDM symbols received on the radio channel to transfer the demodulated and channel-decoded symbols to an upper layer.

Figure 1E:
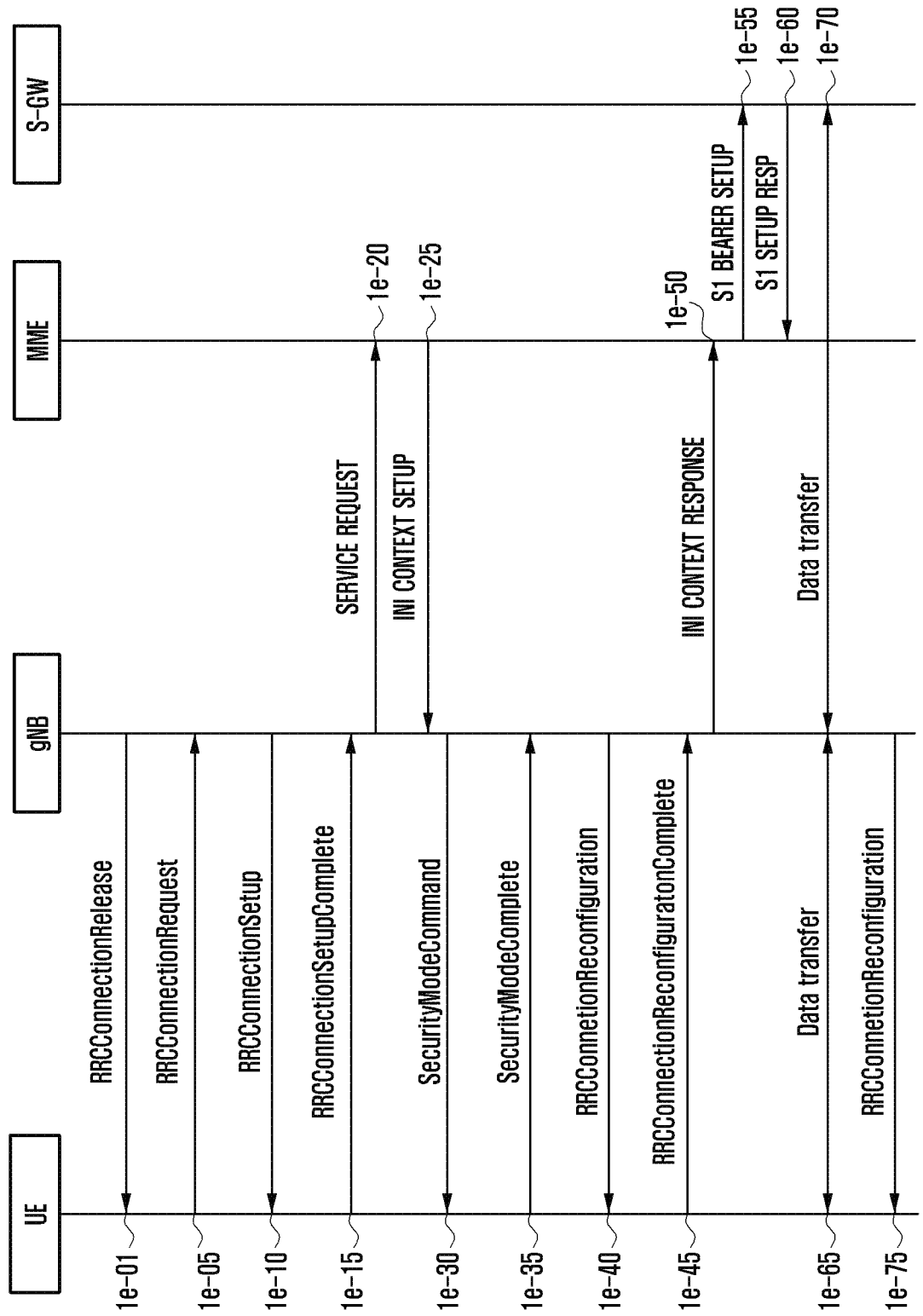
FIG. 1E is a signaling diagram in which a terminal is switched from a radio resource control (RRC) connected mode to an RRC idle mode and in which the terminal is switched from the RRC idle mode to the RRC connected mode, according to an embodiment.

FIG. 1E is a signaling diagram in which a terminal is switched from an RRC connected mode to an RRC idle mode and a procedure in which the terminal is switched from the RRC idle mode to the RRC connected mode, according to an embodiment.

Referring to FIG. 1E, if a terminal (UE) transmitting/receiving data in an RRC connected mode does not transmit/receive data for a specific reason or for a predetermined time, a base station (gNB) may transmit an RRCConnectionRelease message to the UE to switch the UE to an RRC idle mode (at step 1e-01). Thereafter, if data to be transmitted is generated, the UE of which connection is not currently set (idle mode UE) performs an RRC connection establishment process with the gNB. The UE establishes backward transfer synchronization with the gNB through a random access process (RAP), and transmits an RRCConnectionRequest message to the gNB (at step 1e-05). The message contains an identifier of the UE and a connection establishmentCause.

The gNB transmits an RRCConnectionSetup message to the UE so that the UE sets the RRC connection (at step 1e-10). The RRCConnectionSetup message may be set so as to optimally use a segment offset (SO) field as a short SO field or a long SO field according to circumstances or to use only the long SO field when a segmentation operation is performed for each service/bearer/RLC device. Further, the RRCConnectionSetup message contains RRC connection configuration information, etc. The RRC connection is also called signaling radio bearer (SRB), and is used to transmit/receive an RRC message that is a control message between the UE and the gNB.

The UE having set the RRC connection transmits an RRCConnectionSetupComplete message to the gNB (at step 1e-15). The message includes a control message so called SERVICE REQUEST for the UE to request a bearer setup for a specific service from an MME. The gNB transmits the SERVICE REQUEST message contained in the RRCConnectionSetupComplete message to the MME (at step 1e-20), and the MME determines whether to provide the service requested by the UE. If it is determined to provide the service requested by the UE as the result of the determination, the MME transmits an INITIAL CONTEXT SETUP REQUEST message to the gNB (at step 1e-25). The INITIAL CONTEXT SETUP REQUEST message includes QoS information to be applied during data radio bearer (DRB) setup and security related information (e.g., security key or security algorithm) to be applied to the DRB.

In order to set the security with the UE, the gNB exchanges a SecurityModeCommand message at step 1e-30 and a SecurityModeComplete message at step 1e-35 with the UE. If the security setup is completed, the gNB transmits an RRCConnectionReconfiguration message to the UE (at step 1e-40). The RRCConnectionReconfiguration message may be set so as to optimally use the SO field as the short SO field or the long SO field according to circumstances or to use only the long SO field when the segmentation operation is performed for each service/bearer/RLC device. Further, the RRCConnectionReconfiguration message includes setup information of the DRB whereby user data is to be processed, and the UE sets the DRB by applying the information, and transmits an RRCConnectionReconfigurationComplete message to the gNB (at step 1e-45).

The gNB that has completed the DRB setup with the UE transmits an INITIAL CONTEXT SETUP COMPLETE message to the MME (at step 1e-50), and the MME that has received this exchanges an S1 BEARER SETUP message and an S1 BEARER SETUP RESPONSE message with an S-GW in order to set the S1 bearer (at steps 1e-55 and 1e-60). The S1 bearer is a connection for data transmission set between the S-GW and the gNB, and corresponds to the DRB, in a one-to-one manner. If the above-described processes are completed, the UE transmits/receives data to/from the gNB through the S-GW (at steps 1e-65 and 1e-70). As described above, a general data transmission process is briefly composed of three stages of RRC connection setup, security setup, and DRB setup.

Further, the gNB may transmit an RRCConnectionReconfiguration message to the UE in order to renew, add, or change the setup for a specific reason (at step 1e-75). The message may be set so as to optimally use the SO field as the short SO field or the long SO field according to circumstances or to use only the long SO field when the segmentation operation is performed for each service/bearer/RLC device.

Figure 1F:
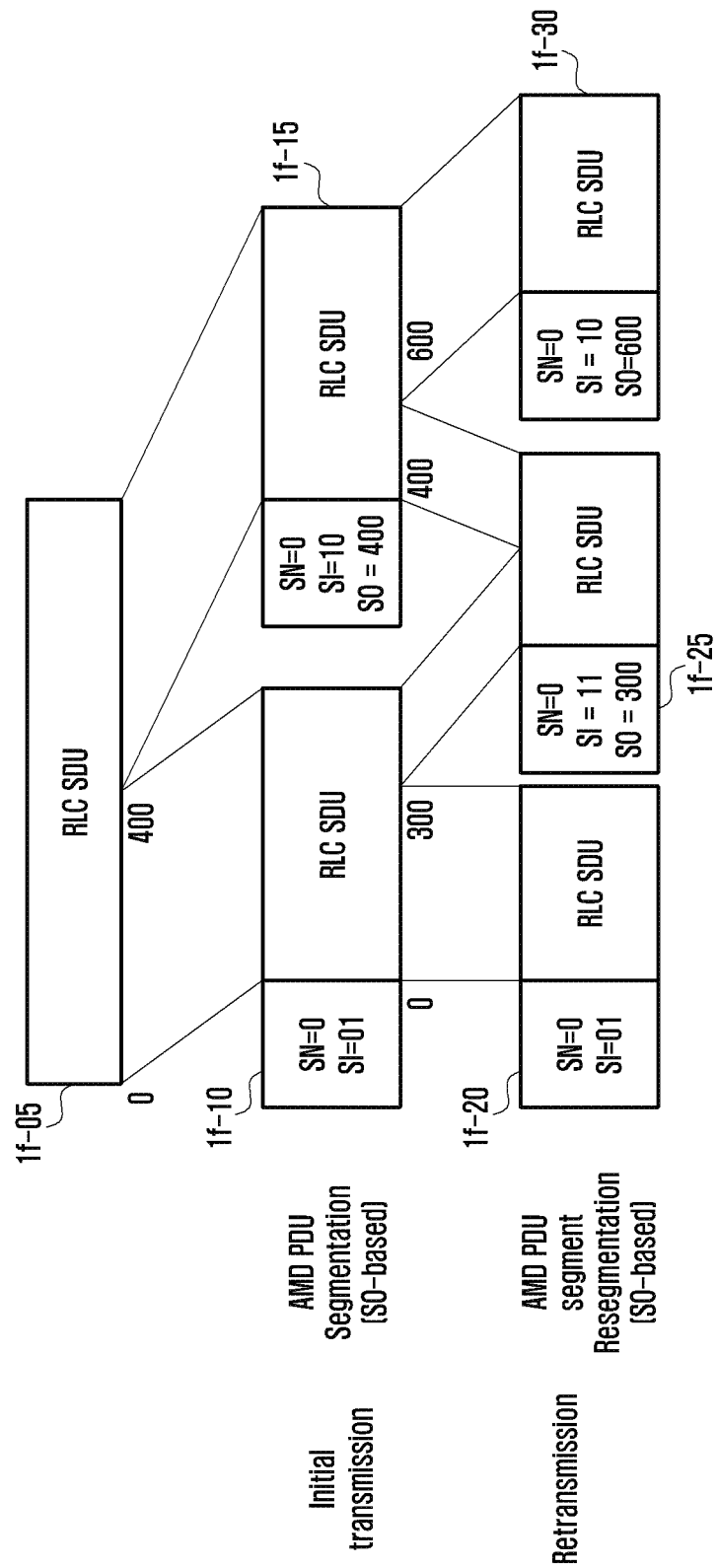
FIG. 1F is a diagram of a segmentation operation of an RLC layer, according to an embodiment.

FIG. 1F is a diagram of a segmentation operation of an RLC layer, according to an embodiment.

The disclosure provides an efficient RLC layer header structure and segmentation operation.

More particularly, the first embodiment provides a procedure and a method in which an RLC layer performs an SO-based segmentation operation with respect to packets received from an upper layer. The provided method may perform an integrated segmentation operation without dividing the segmentation operation into those in case of an initial transmission and a retransmission. Further, it may be assumed that the RLC layer does not perform concatenation, that an SI field is introduced into an RLC header to determine whether an RLC SDU that is a data part in the rear of the RLC header is a complete RLC SDU that has not been segmented, the foremost segmented RLC SDU segment, a middle segmented RLC SDU segment, or the last segmented RLC SDU segment, and that the RLC header does not have a length field indicating a length.

Referring to FIG. 1F, the RLC layer receives a PDCP PDU (RLC SDU) (at step 1f-05) transferred from a PDCP layer that is an upper layer. The RLC SDU may be processed to have a size indicated by a MAC layer, and if it is segmented, an RLC PDU may be configured to include segmentation information of a header. The RLC PDU is composed of an RLC header and an RLC payload (RLC SDU). The RLC header may include an RLC PDU character (data or control information) and segmentation information, and may further include a data/control (D/C) field, a polling (P) field, an SI field, an SN field, and an SO field. In an RLC UM mode in which an ARQ is not supported, the P field is not included, but may be replaced by a reservation field.

The D/C field is composed of 1 bit, and is used to indicate whether the configured RLC PDU is a control PDU or a data PDU.

TABLE 1

| Value | Description |
|---|---|
| 0 | Control PDU |
| 1 | Data PDU |

The SN field indicates a serial number of the RLC PDU, and may have a specific length. For example, the SN field may have a length of 12 bits or 18 bits.

The SO field is used to indicate at what location on the original RLC SDU the RLC SDU segment is segmented and to indicate the first segmented byte.

The P field may be set to 1 if a polling triggering condition occurs in a transmitting end to make a receiving end perform an RLC status report. That is, the P field makes it possible to transfer ACK/NACK information for the RLC PDUs received up to now to the transmitting end.

If the RLC layer receives the RLC SDU at 1*f*-05, it may directly insert an RLC SN into the RLC SDU, and generate an RLC header to make the RLC PDU. If segmentation is necessary for a specific reason, the RLC layer may update the SI field at 1*f*-10 or 1*f*-15, and add the SO field to the RLC header to generate the RLC PDU. That is, the SO field may or may not be added to the segmented segment in accordance with a specific condition after the segmentation operation. The specific condition is determined in accordance with the SI field. The segmentation operation is necessary when the size of the transmission resource allocated by the MAC layer is greater than the size of the MAC sub-header and the MAC SDU currently generated, and thus the RLC layer is requested to perform the segmentation operation with respect to a specific MAC SDU (RLC PDU).

The SN field is a serial number of the RLC PDU, and if it is necessary or it is set, the PDCP SN may be reused. The SO field is a field having a specific length, and may indicate what byte of the original RLC PDU data field (RLC SDU) the first byte of the RLC PDU data field (RLC SDU) segmented during an initial transmission corresponds to, and during the retransmission, it may indicate what byte of the original RLC PDU data field (RLC SDU) the first byte of the re-segmented RLC PDU data field corresponds to.

The length of the SO field may be set by an RRC message (e.g., RRCConnectionSetup or RRCConnectionReconfiguration message at steps 1*e*-10, 1*e*-40, or 1*e*-75). For example, the length of the SO field or the kind of settable SO fields (short SO or long SO) may be differently set for each bearer. That is, in a VoLTE or VoIP service, the SO field can be set to 1 byte, whereas in an eMBB service, the SO field can be set to 2 bytes. Further, a specific bit may be defined in front of the SO field so that the specific bit can indicate the length of the SO field. For example, if it is assumed that the specific bit is 1 bit, 0 may indicate that the SO field has the length of 1 byte, whereas 1 may indicate that the SO field has the length of 2 bytes. As described above, the S field may be defined as follows using the values of Table 2 below.

TABLE 2

| Value | Description |
|---|---|
| 00 | A complete RLC PDU |
| 01 | First segment of a RLC PDU |
| 10 | Last segment of a RLC PDU |
| 11 | Middle segment of a RLC PDU |

If the SI field is 00, it represents a complete RLC PDU that is not segmented, and in this case, the RLC header does not require the SO field. If the SI field is 01, it represents the foremost RLC PDU segment that is segmented, and in this case, the RLC header does not require the SO field. This is because the SO field always indicates 0 in case of the first segment. If the SI field is 10, it represents the last RLC PDU segment that is segmented, and in this case, the RLC header requires the SO field. If the SI field is 11, it represents the middle RLC PDU segment that is segmented, and in this case, the RLC header requires the SO field. The number of mapping relations between the 2 bits and the four kinds of information (complete RLC PDU, foremost segment, last segment, and middle segment) is 24 (=4×3×2×1) in total; all 24 kinds of mappings are included.

If transmission of the RLC PDUs at 1*f*-10 and 1*f*-15 has failed, retransmission may be performed, and in this case, if the transmission resource is insufficient, re-segmentation, at 1*f*-20, 1*f*-25, and 1*f*-30, may be performed. During the re-segmentation, SI fields and SO fields of newly generated RLC PDUs at 1*f*-20, 1*f*-25, and 1*f*-30 may be updated. With respect to 1*f*-20 that is the foremost segment, the SI is updated to 01, and the SO field is not necessary.

For example, at 1*f*-25, which is the middle segment, the SI is updated to 11, and the SO field is updated to 300 to indicate what byte of the original RLC PDU data field (RLC SDU) the first byte of the RLC PDU data field (RLC SDU) corresponds to. At 1*f*-30, which is the last segment, the SI is updated to 10, and the SO field is updated to 600 to indicate what byte of the original RLC PDU data field (RLC SDU) the first byte of the RLC PDU data field (RLC SDU) corresponds to.

Figure 1G:
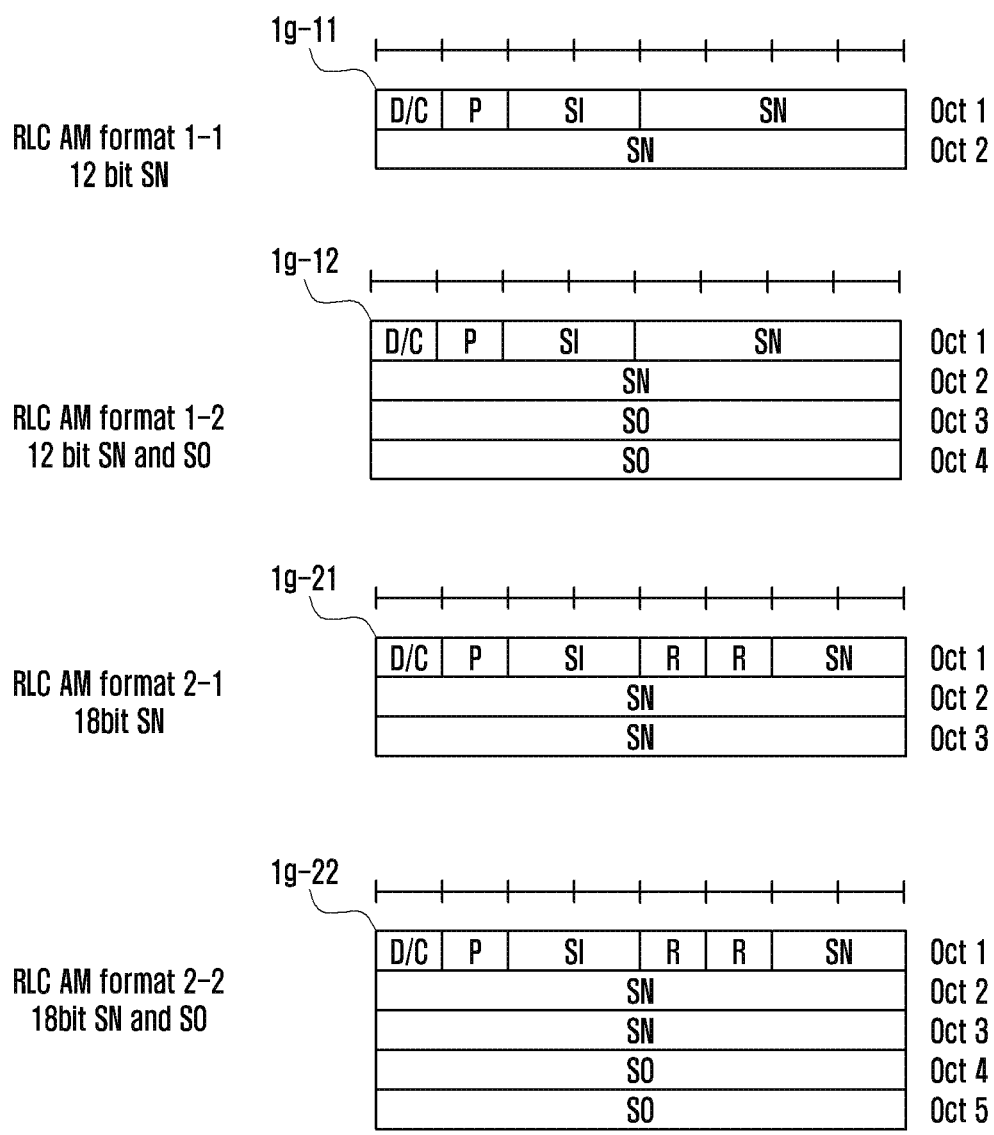
FIGS. 1GA and 1GB are diagrams of an RLC header applicable, according to an embodiment.

FIGS. 1GA and 1GB are diagrams of an RLC header, according to an embodiment.

FIG. 1GA illustrates an RLC header structure using an RLC AM mode (supporting an ARQ), and at 1*g*-11 an RLC header structure using a serial number having a length of 12 bits in a segmentation operation based on the SO field and SI field is shown. The RLC header structure may include parts of the fields as described above with reference to FIG. 1F or other new fields, and may have a different structure in accordance with lengths of the respective fields, such as different RLC serial number lengths or SO field lengths, and locations of the respective fields.

R is a reserved bit, and a P field is a field for requesting a status report from a corresponding RLC entity of a receiving end. For example, if the P field is 0, the status report is not requested, whereas if the P field is 1, the status report is requested. The status report may include information on data received up to now. The RLC header structure is featured not to have a re-segmentation flag (RF) field, a framing info (FI) field, or an extension bit (E) field. Further, the RLC header structure is featured to use an integrated header without dividing the RLC header into those in case of an initial transmission and a retransmission. As described above, the SI field serves to indicate the RLC SDU that has not been segmented, and the first, middle, and last segments that have been segmented as described above with reference to FIG. 1F. As described above with reference to FIG. 1F, since the SO field is not necessary with respect to the RLC SDU that has not been segmented and the first segment that has been segmented, the RLC header may be used in the format of 1*g*-11. However, since the SO field should indicate the offset with respect to the middle and last segments that have been segmented, the RLC header format of 1*g*-12 may be used.

When using an RLC AM mode (when supporting an ARQ) in FIG. 1GA, 1*g*-21 indicates an RLC header format using an RLC serial number having a length of 18 bits; this format can be applied to the RLC SDU that has not been segmented and the first segment that has been segmented. Further, the format of 1g-22 is a format that can be applied to the middle and last segments generated through performing of the segmentation operation, since the SO field should indicate an offset.

When using an RLC UM mode (when supporting no ARQ) in FIG. 1GB, 1g-31 indicates an RLC header format using an RLC serial number having a length of 12 bits; this format can be applied to the RLC SDU that has not been segmented and the first segment that has been segmented. Further, the format of 1g-32 can be applied to the middle and last segments generated through performing of the segmentation operation, since the SO field should indicate an offset. When indicating an offset by the SO field having a relatively long length, the format of 1g-33 may be applied. Whether to use the SO field having a short length or the SO field having a long length can be determined at a terminal at steps 1e-10, 1e-40, and 1e-75 when a base station configures the terminal in accordance with the method of FIG. 1E.

Further, the terminal may be configured not to use the RLC serial number in the RLC UM mode at steps 1e-10, 1e-40, and 1e-75. The terminal is configured not to use the RLC serial number in the RLC UM mode to reduce an overhead, and since the RLC ARQ function is not necessary in the RLC UM mode, the operation can be performed even without the RLC serial number.

When it is determined not to use an RLC serial number, a transmitting end may not attach an RLC header (1-bit indicator may be included at the head in order to indicate whether the segmentation operation has been performed) to an RLC SDU that has not been segmented, and may transfer the RLC SDU to a lower layer to perform the transmission. However, if the RLC SDU has been segmented even in case of the configuration not to use the RLC serial number to reduce the overhead, the RLC serial number should be added, and the SI field and the SO field as described above with reference to FIG. 1F should be used. The r RLC header is configured by applying the RLC serial number, the SI field, and the SO field with respect to the segmented RLC SDU so that a receiving end can receive and reassemble the segmented RLC SDU segments to restore to a complete RLC SDU. Accordingly, if the segmentation operation has been performed, even in case of the configuration not to use the RLC serial number in the RLC UM mode, the RLC header, e.g., 1g-31, 1g-32, or 1g-33, should be applied. That is, the first segment may use the format of 1g-31, and the middle segments and the last segment may use the format of 1g-32 or 1g-33.

Depending on whether the segmentation of the RLC SDU has been performed, the transmitting end may not attach the header (1-bit indicator may be included at the head in order to indicate whether the segmentation operation has been performed) to the RLC SDU that has not been segmented, and may transmit the RLC SDU to the lower layer. In contrast, with respect to the RLC SDU that has been segmented, as described above, the transmitting end may update the corresponding SI field in accordance with the kind/type (first, middle, or last) of the segmented segment, configure the RLC header by adding the SO field to the middle and the last segments, and transfer the RLC SDU to the lower layer.

The receiving end may receive the RLC SDU, identify the foremost 1-bit indicator, and discriminate whether the received RLC SDU is the RLC SDU that has not been segmented (complete RLC SDU) or the RLC SDU that has been segmented (segment). If the RLC SDU has not been segmented, the receiving end may discard the 1-bit indicator and may send the RLC SDU to an upper layer. If the RLC SDU has been segmented, the receiving end may identify whether the RLC SDU is the first, middle, or last segment based on the SI field, arrange the segments to match the RLC serial numbers in consideration of the SO field or the like, and if a reassembly function is triggered by a window or a timer, it may make a complete RLC SDU through reassembly of the segments to transfer the complete RLC SDU to the upper layer. In contrast, if the reassembly of the segments is not possible, the RLC SDU is discarded.

In the RLC UM mode, the receiving end may operate based on the window or the timer.

When the operation is based on the window, the receiving end may operate an RLC reception window, and the window may be operated with a size corresponding to a half of the RLC serial number. With respect to a lower edge of the window, a serial number through subtraction of the size of the RLC window from an upper edge may be configured, and the highest RLC serial number received from the receiving end RLC may be configured at the upper edge. Accordingly, if the received RLC serial number has a larger value than the values of the RLC serial numbers in the window, the window moves accordingly. If the received RLC PDU serial number has a smaller value than the value of the received window lower edge, the receiving end RLC layer may discard this RLC PDU serial number, and may check whether a duplicate RLC PDU is received with respect to the RLC serial number existing in the window to discard the same.

Further, if an RLC PDU segment having an RLC serial number existing in the window arrives, the receiving end RLC layer may store this, and if the lower edge of the window passes the RLC serial number corresponding to the RLC PDU segment, the receiving end RLC layer may generate and send a complete RLC PDU through performing of a reassembling procedure, whereas if the complete RLC PDU is unable to be generated, the receiving end RLC layer may discard the RLC PDU segments. Further, the receiving end RLC layer may identify the SI field or 1-bit indicator (indicator indicating whether the segmentation has been performed), and may directly send the RLC PDU that has not been segmented to the upper layer. Further, if the SI field or the 1-bit indicator indicates the RLC PDU that has been segmented, the receiving end RLC layer stores the RLC PDU segments, and if the reassembling procedure is triggered by the window as described above, the receiving end RLC layer performs the reassembling procedure to send the reassembled RLC PDU to the upper layer or to discard the same.

When the operation is based on the timer, the receiving end RLC layer operates the timer in the RLC UM mode. The receiving end RLC layer may operate several timers or one timer.

When operating only one timer, the receiving end RLC layer identifies the SI field or 1-bit indicator, and directly sends the RLC PDU that has not been segmented to the upper layer. If the SI field or the 1-bit indicator indicates the RLC PDU that has been segmented, the receiving end RLC layer stores the RLC PDU segments, and operates the timer. That is, timer triggering is performed when the segmented RLC PDU segment arrives.

Thereafter, if the RLC PDUs are received, the above-described process is repeated, and if the RLC PDU segment arrives again, the receiving end RLC layer identifies whether the timer is operated, and if the timer is not operated, the receiving end RLC layer restarts the timer. If the timer expires, the receiving end RLC layer reassembles the RLC PDU segments received up to now, and sends the reassembly-completed complete RLC PDUs to the upper layer while discarding the reassembly-failed RLC PDU segments.

When operating several timers, the receiving end RLC layer identifies the SI field or 1-bit indicator, and directly sends the RLC PDU that has not been segmented to the upper layer. If the SI field or the 1-bit indicator indicates the RLC PDU that has been segmented, the receiving end RLC layer stores the RLC PDU segments, and operates the timer with respect to the RLC serial numbers of the RLC PDU segments. That is, timer triggering is performed when the segmented RLC PDU segment corresponding to a specific RLC serial number arrives.

Thereafter, if the RLC PDUs are received, the above-described process is repeated, and if the RLC PDU segment arrives again, the receiving end RLC layer identifies whether the timer corresponding to the RLC serial number of the received RLC PDU segment is operated, and if the timer is not operated, the receiving end RLC layer restarts the timer. If the timer corresponding to the RLC serial number is not operated, the receiving end RLC layer may operate a new timer with respect to the corresponding RLC serial number. Accordingly, whenever the RLC PDU segment arrives for each RLC serial number, the timer can be operated for each RLC serial number. If the timer for the specific RLC serial number expires, the receiving end RLC layer reassembles the RLC PDU segments having the RLC serial numbers corresponding to the timer received up to now, and sends the reassembly-completed complete RLC PDUs to the upper layer while discarding the reassembly-failed RLC PDU segments.

When not using an RLC serial number, the transmitting end may attach a 1-byte RLC header, such as 1g-31-1, having no RLC serial number (when configuring the RLC header, the SI field is set to 00, and the RLC header to which the SO field is not added) with respect to the RLC SDU that has not been segmented, and may transfer the RLC SDU to the lower layer to perform the transmission. However, if the RLC SDU has been segmented, even when not using the RLC serial number to reduce the overhead, the RLC serial number should be added, and the SI field and the SO field as described above with reference to FIG. 1F should be used. The RLC header is configured by applying the RLC serial number, the SI field, and the SO field with respect to the segmented RLC SDU so that a receiving end can receive and reassemble the segmented RLC SDU segments to restore to a complete RLC SDU. Accordingly, if the segmentation operation has been performed even when not using the RLC serial number in the RLC UM mode, the RLC header, e.g., 1g-31, 1g-32, or 1g-33, should be applied. That is, the first segment may use the format of 1g-31, and the middle segments and the last segment may use the format of 1g-32 or 1g-33.

Depending on whether the segmentation of the RLC SDU has been performed, the transmitting end may attach the 1-byte RLC header, such as 1g-31-1, having no RLC serial number with respect to the RLC SDU that has not been segmented, and may transmit the RLC SDU to the lower layer. In contrast, with respect to the RLC SDU that has been segmented, as described above, the transmitting end may update the corresponding SI field in accordance with the kind/type (first, middle, or last) of the segmented segment, configure the RLC header by adding the SO field to the middle and the last segments, and transfer the RLC SDU to the lower layer.

The receiving end may receive the RLC SDU, identify the SI field from the RLC header, and discriminate whether the received RLC SDU is the RLC SDU that has not been segmented (complete RLC SDU) or the RLC SDU that has been segmented (segment). If the RLC SDU has not been segmented, the receiving end may discard the RLC header and may send the RLC SDU to the upper layer. If the RLC SDU has been segmented, the receiving end may identify whether the RLC SDU is the first, middle, or last segment based on the SI field, arrange the segments to match the RLC serial numbers in consideration of the SO field or the like, and if the reassembly function is triggered by a window or a timer, it may make the complete RLC SDU through reassembly of the segments to transfer the complete RLC SDU to the upper layer. If the reassembly of the segments is not possible, the RLC SDU is discarded.

In the RLC UM mode, the receiving end may operate based on the window or the timer.

When the operation based on the window, the receiving end may operate an RLC reception window, and the window may be operated with a size corresponding to a half of the RLC serial number. When a lower edge of the window, a serial number through subtraction of the size of the RLC window from an upper edge may be used, and the highest RLC serial number received from the receiving end RLC may be used at the upper edge. Accordingly, if the received RLC serial number has a larger value than the values of the RLC serial numbers in the window, the window moves accordingly. If the received RLC PDU serial number has a smaller value than the value of the received window lower edge, the receiving end RLC layer may discard this RLC PDU serial number, and may check whether a duplicate RLC PDU is received with respect to the RLC serial number existing in the window to discard the same.

Further, if an RLC PDU segment having an RLC serial number existing in the window arrives, the receiving end RLC layer may store this RLC serial number, and if the lower edge of the window passes the RLC serial number corresponding to the RLC PDU segment, the receiving end RLC layer may generate and send a complete RLC PDU through performing of a reassembling procedure. If the complete RLC PDU is unable to be generated, the receiving end RLC layer may discard the RLC PDU segments. Further, the receiving end RLC layer may identify the SI field or 1-bit indicator, and may directly send the RLC PDU that has not been segmented to the upper layer. Further, if the SI field or the 1-bit indicator indicates the RLC PDU that has been segmented, the receiving end RLC layer stores the RLC PDU segments, and if the reassembling procedure is triggered by the window as described above, the receiving end RLC layer performs the reassembling procedure to send the reassembled RLC PDU to the upper layer or to discard the same.

When the operation is based on the timer, the receiving end RLC layer operates the timer in the RLC UM mode. The receiving end RLC layer may operate several timers or one timer.

When operating only one timer, the receiving end RLC layer identifies the SI field or 1-bit indicator, and directly sends the RLC PDU that has not been segmented to the upper layer. If the SI field or the 1-bit indicator indicates the RLC PDU that has been segmented, the receiving end RLC layer stores the RLC PDU segments, and operates the timer. That is, timer triggering is performed when the segmented RLC PDU segment arrives.

Thereafter, if the RLC PDUs are received, the above-described process is repeated, and if the RLC PDU segment arrives again, the receiving end RLC layer identifies whether the timer is operated, and if the timer is not operated, the receiving end RLC layer restarts the timer. If the timer expires, the receiving end RLC layer reassembles the RLC PDU segments received up to now, and sends the reassembly-completed complete RLC PDUs to the upper layer while discarding the reassembly-failed RLC PDU segments.

When operating several timers, the receiving end RLC layer identifies the SI field or 1-bit indicator, and directly sends the RLC PDU that has not been segmented to the upper layer. If the SI field or the 1-bit indicator indicates the RLC PDU that has been segmented, the receiving end RLC layer stores the RLC PDU segments, and operates the timer with respect to the RLC serial numbers of the RLC PDU segments. That is, timer triggering is performed when the segmented RLC PDU segment corresponding to a specific RLC serial number arrives.

Thereafter, if the RLC PDUs are received, the above-described process is repeated, and if the RLC PDU segment arrives again, the receiving end RLC layer identifies whether the timer corresponding to the RLC serial number of the received RLC PDU segment is operated, and if the timer is not operated, the receiving end RLC layer restarts the timer. If the timer corresponding to the RLC serial number is not operated, the receiving end RLC layer may operate a new timer with respect to the corresponding RLC serial number. Accordingly, whenever the RLC PDU segment arrives for each RLC serial number, the timer can be operated for each RLC serial number. If the timer for the specific RLC serial number expires, the receiving end RLC layer reassembles the RLC PDU segments having the RLC serial numbers corresponding to the timer received up to now, and sends the reassembly-completed complete RLC PDUs to the upper layer while discarding the reassembly-failed RLC PDU segments.

Figure 1H:
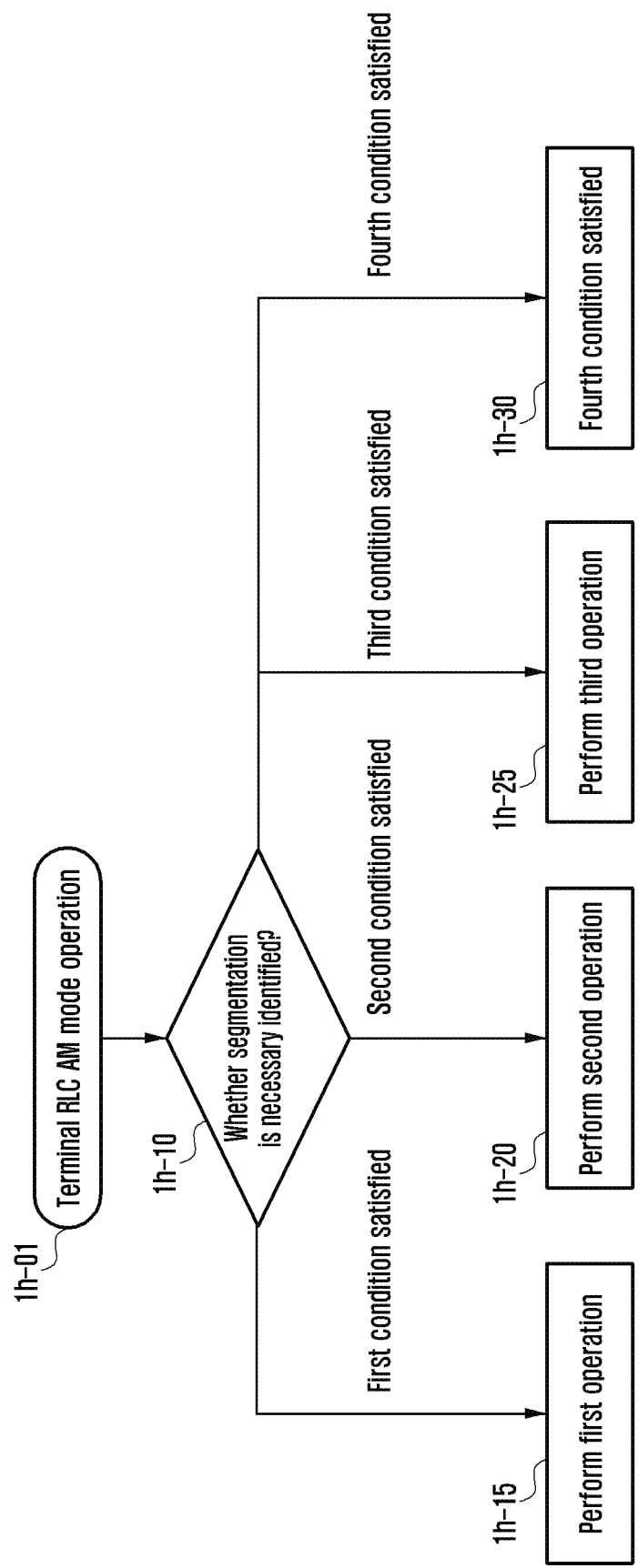
FIGS. 1HA and 1HB are flowcharts of a method in which a terminal configures an RLC header, according to an embodiment.
Figure 1H:
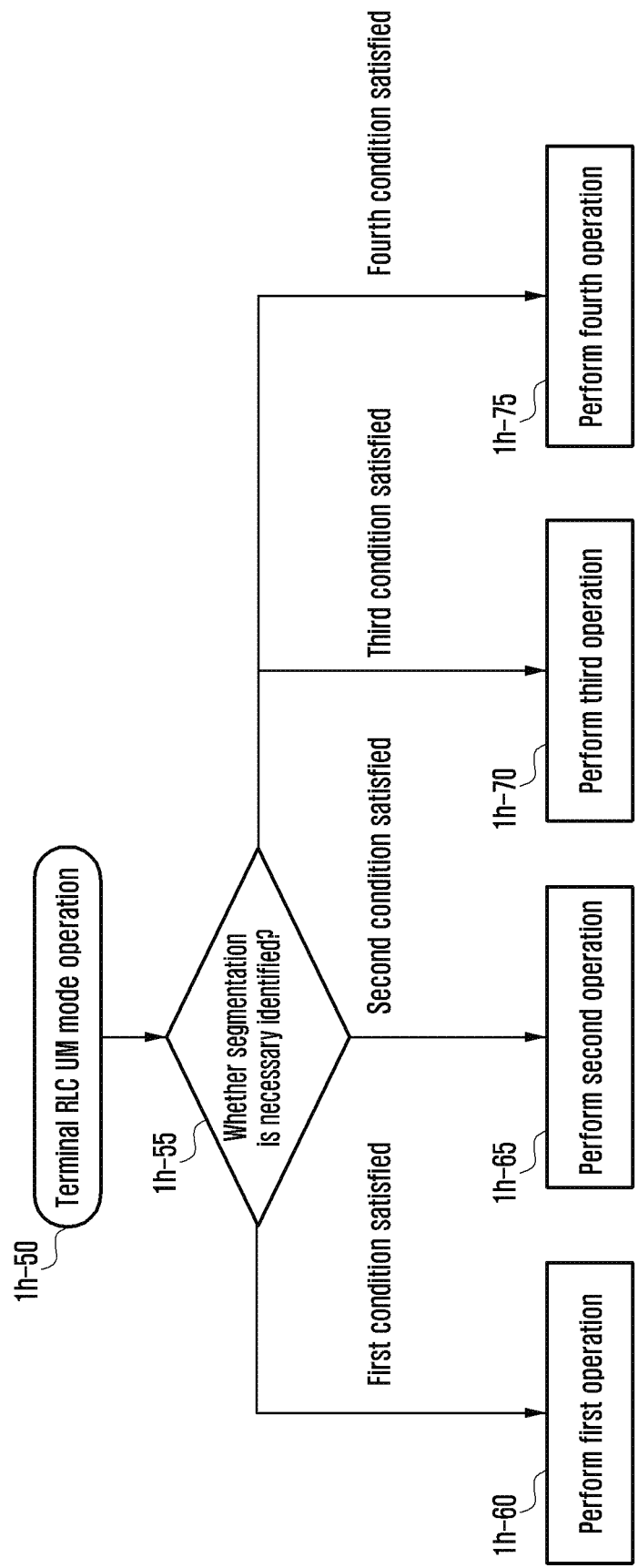

FIGS. 1HA and 1HB are diagrams of a method in which a terminal configures an RLC header, according to an embodiment.

In an RLC AM mode (at step 1h-01), if a segmentation operation is requested from a lower layer with respect to an RLC SDU (PDCP PDU) transferred from an upper layer, a terminal may perform the segmentation operation. Further, if a segmentation request comes from the lower layer, even when the RLC header has already been configured and the RLC PDU has been sent to the lower layer, the terminal may perform the segmentation operation, and may newly configure or update the RLC header to transfer the RLC PDU again to the lower layer. As described above, when configuring the RLC header for the RLC SDU, the terminal first identifies whether the segmentation operation is necessary (1h-10).

If a first condition is satisfied, the terminal performs a first operation (at step 1h-15), if a second condition is satisfied, the terminal performs a second operation (at step 1h-20), if a third condition is satisfied, the terminal performs a third operation (at step 1h-25), and if a fourth condition is satisfied, the terminal performs a fourth operation (at step 1h-30).

The first condition corresponds to a case when the segmentation operation is not necessary with respect to the RLC SDU, and the segmentation operation is not performed, and the RLC header for a complete RLC SDU should be configured.

The second condition corresponds to a case when the segmentation operation is necessary with respect to the RLC SDU, and the segmentation operation is performed, and then the RLC header should be configured with respect to the first RLC SDU segment.

The third condition corresponds to a case when the segmentation operation is necessary with respect to the RLC SDU, and the segmentation operation is performed, and then the RLC header should be configured with respect to the middle RLC SDU segment that is not the first or last RLC SDU segment.

The fourth condition corresponds to a case when the segmentation operation is necessary with respect to the RLC SDU, and the segmentation operation is performed, and then the RLC header should be configured with respect to the last RLC SDU segment.

For example, the first operation may include setting the SI field to 00 when configuring the RLC header and configuring the RLC header to which the SO field is not added.

The second operation may include setting the SI field to 01 when configuring the RLC header and configuring the RLC header to which the SO field is not added.

The third operation may include setting the SI field to 11 when configuring the RLC header and configuring the RLC header so that an offset can be indicated through addition of the SO field.

The fourth operation may include setting the SI field to 10 when configuring the RLC header and configuring the RLC header so that an offset can be indicated through addition of the SO field.

In an RLC UM mode (at step 1h-50), a segmentation operation is requested from a lower layer with respect to an RLC SDU (PDCP PDU) transferred from an upper layer, and a terminal may perform the segmentation operation. Further, if a segmentation request comes from the lower layer, even when the RLC header has already been configured and the RLC PDU has been sent to the lower layer, the terminal may perform the segmentation operation, and may newly configure or update the RLC header to transfer the RLC PDU again to the lower layer. As described above, when configuring the RLC header for the RLC SDU, the terminal first identifies whether the segmentation operation is necessary (at step 1h-55).

If a first condition is satisfied, the terminal performs a first operation (1h-60), if a second condition is satisfied, the terminal performs a second operation (at step 1h-65), if a third condition is satisfied, the terminal performs a third operation (at step 1h-70), and if a fourth condition is satisfied, the terminal performs a fourth operation (at step 1h-75).

The first condition corresponds to a case when the segmentation operation is not necessary with respect to the RLC SDU, and thus the segmentation operation is not performed.

The second condition corresponds to a case when the segmentation operation is necessary with respect to the RLC SDU, and the segmentation operation is performed, and then the RLC header should be configured with respect to the first RLC SDU segment.

The third condition corresponds to a case when the segmentation operation is necessary with respect to the RLC SDU, and the segmentation operation is performed, and then the RLC header should be configured with respect to the middle RLC SDU segment that is not the first or last RLC SDU segment.

The fourth condition corresponds to a case where since the segmentation operation is necessary with respect to the RLC SDU, and the segmentation operation is performed, and then the RLC header should be configured with respect to the last RLC SDU segment.

The first operation may include not configuring the RLC header if the base station configures the terminal not to use the RLC serial number in order to reduce the overhead. If the base station does not configure the above-described indication, the first operation may include operations of setting the SI field to 00 when configuring the RLC header and configuring the RLC header to which the SO field is not added.

The second operation may include setting the SI field to 01 when configuring the RLC header and configuring the RLC header to which the SO field is not added.

The third operation may include setting the SI field to 11 when configuring the RLC header and configuring the RLC header so that an offset can be indicated through addition of the SO field.

The fourth operation may include setting the SI field to 10 when configuring the RLC header and configuring the RLC header so that an offset can be indicated through addition of the SO field.

Alternatively, the disclosure provides a procedure and a method in which an RLC layer performs SO-based segmentation operations with respect to packets received from an upper layer. In this procedure an integrated segmentation operation, without dividing the segmentation operation, during an initial transmission and a retransmission. The RLC layer does not perform concatenation. Further, an SI field can be introduced into an RLC header to discriminate whether an RLC SDU that is a data part in the rear of the RLC header is a complete RLC SDU that has not been segmented, the foremost segmented RLC SDU segment, a middle segmented RLC SDU segment, or the last segmented RLC SDU segment. When an SO field is added to the middle segment and the last segment among the segmented RLC SDU segments, it may be selected whether to use the SO field having a short length or the SO field having a long length in consideration of the length that can be indicated by the SO field.

A method capable of further reducing the overhead through selection of whether to use a short SO field or a long SO field is provided; this method takes into account a length that can be indicated by the SO field when the SO field is added to the middle segment and the last segment among the segmented RLC SDU segments in addition to all the same operations as those of the (1-1)-th embodiment.

An SO length type (ST) field may be added. The ST field (SO length type field=ST field) is a field indicating selection of whether to use the short SO field or the long SO field in consideration of the length that can be indicated by the SO field when the SO field is added to the middle segment and the last segment among the segmented RLC SDU segments. For example, the SO field may have the short length of 7 or 8 bits, and the long length of 15 or 16 bits.

TABLE 3

| Value | Description |
|-------|-------------|
| 0 | Short SO field |
| 1 | Long SO field |

That is, the short SO and the long SO are defined, and the SO length type (ST) field is introduced into the RLC PDU header to indicate the short SO/long SO through in-band signaling. For example, if the RLC SDU is segmented into SDU segment 0, segment 1, . . . , segment n, the SO field lengths for the respective segments may differ from each other. For example, seg 0 may be applied as no SO, seg 1 to seg m may be applied as short SO, and seg m+1 to seg n may be applied as long SO.

When using the short SO and the long SO as described above, the receiving end should convert the received short SO into the long SO to read and apply the converted long SO through attachment of 0000 . . . to the front part of the short SO during reassembling. If it is assumed that the short SO is of 8 bits and the long SO is of 16 bits, the receiving end, even if the short SO of 0000 0100 is received, may analyze the received short SO as the long SO of 0000 0000 0000 0100 through attachment of 0000 0000 to the front part of the short SO of 0000 0100.

As described above, during the RLC SDU segment transmission, one of the short SO and the long SO is selectively used, whereas if the receiving end requests the RLC SDU segment retransmission, only the long SO is used. That is, one of the short SO and the long SO is selectively used in the RLC PDU header, and only the long SO is used for an RLC STATUS PDU RLC (status report) transmitted from the receiving end to the transmitting end. Even if the short SO is used during certain RLC SDU segment transmission, the long SO is used when retransmission of the corresponding RLC SDU segment is requested. In other words, when the RLC SDU is segmented into several segments to be transmitted, even if the short SO is applied during transmission of certain bytes belonging to the corresponding SDU, the long SO is applied when retransmission of the same bytes is requested.

During a terminal transmission operation in an uplink through segmentation and transmission of a certain SDU, if a distance between a first byte of a data field of the segmented and transmitted middle segment and last segment and a first byte of the original SDU data field or a first byte of a data field of the previous segment is less than or equal to specific n bytes, the short SO is used, whereas if the distance is greater than the n bytes, the long SO is used. The SI field may indicate the middle segment or the last segment, and the ST field may be set to 0 or 1. The specific n bytes may be determined as the length of the short SO. For example, the specific n bytes may be set to $n=2^{\wedge(length\ of\ short\ SO)}-1$.

During a terminal reception operation in a downlink, if the SI field indicates the existence of the SO, the short SO or the long SO may be analyzed based on the SO-length type field (ST field), and segment reassembly is performed to configure a complete RLC SDU.

Further, when the base station configures the terminal as illustrated in FIG. 1E, whether to use the short SO field or the long SO field for each bearer may be determined through an RRC message of at steps 1e-10, 1e-40, and 1e-75 of FIG. 1E. For example, only the long SO can be used at a high data rate, and the short SO field and the long SO field are mixedly used only for VoIP or VoLTE services.

Figure 1I:
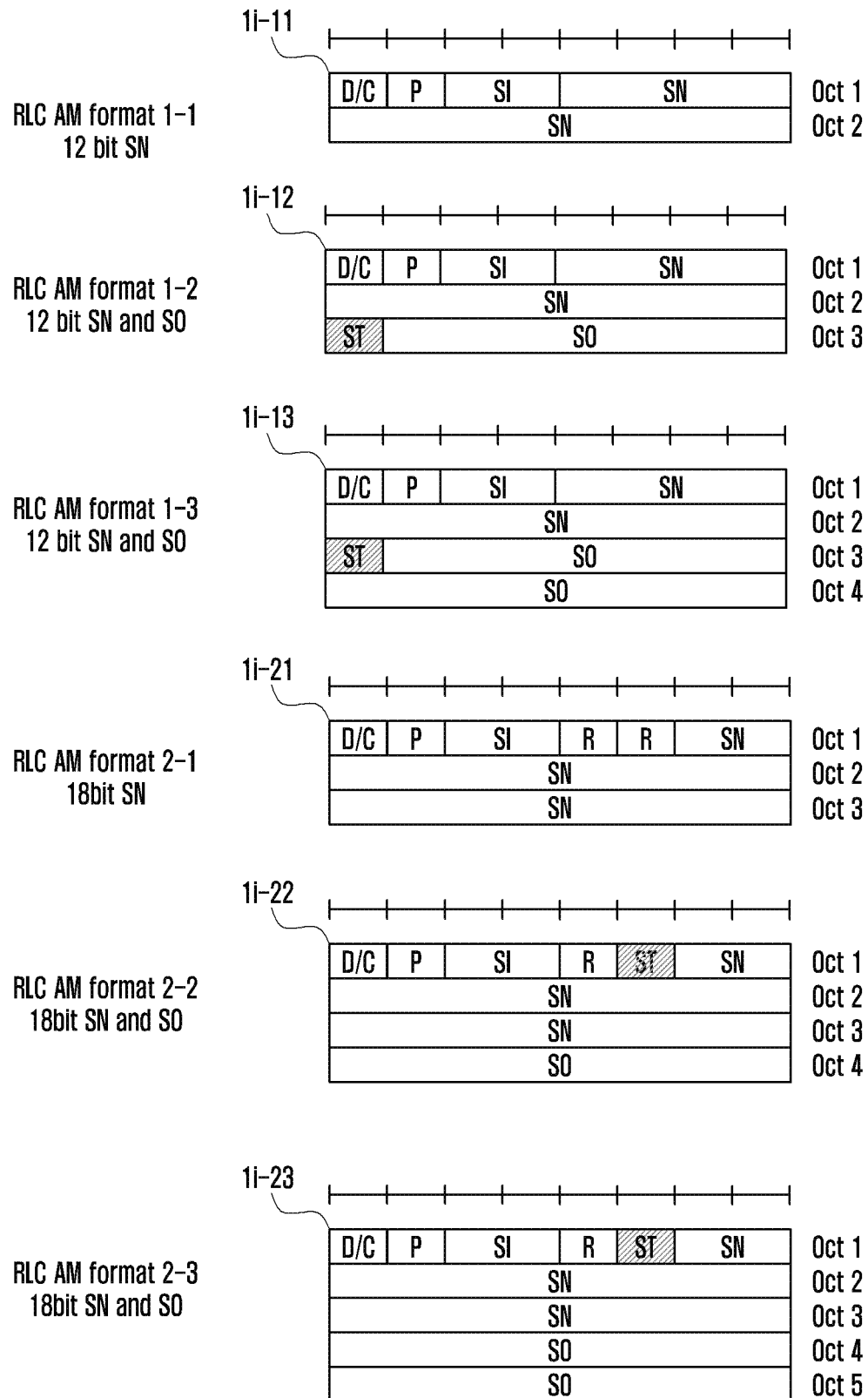
FIGS. 1IA and 1IB are diagrams of an RLC header applicable, according to an embodiment.
Figure 1I:
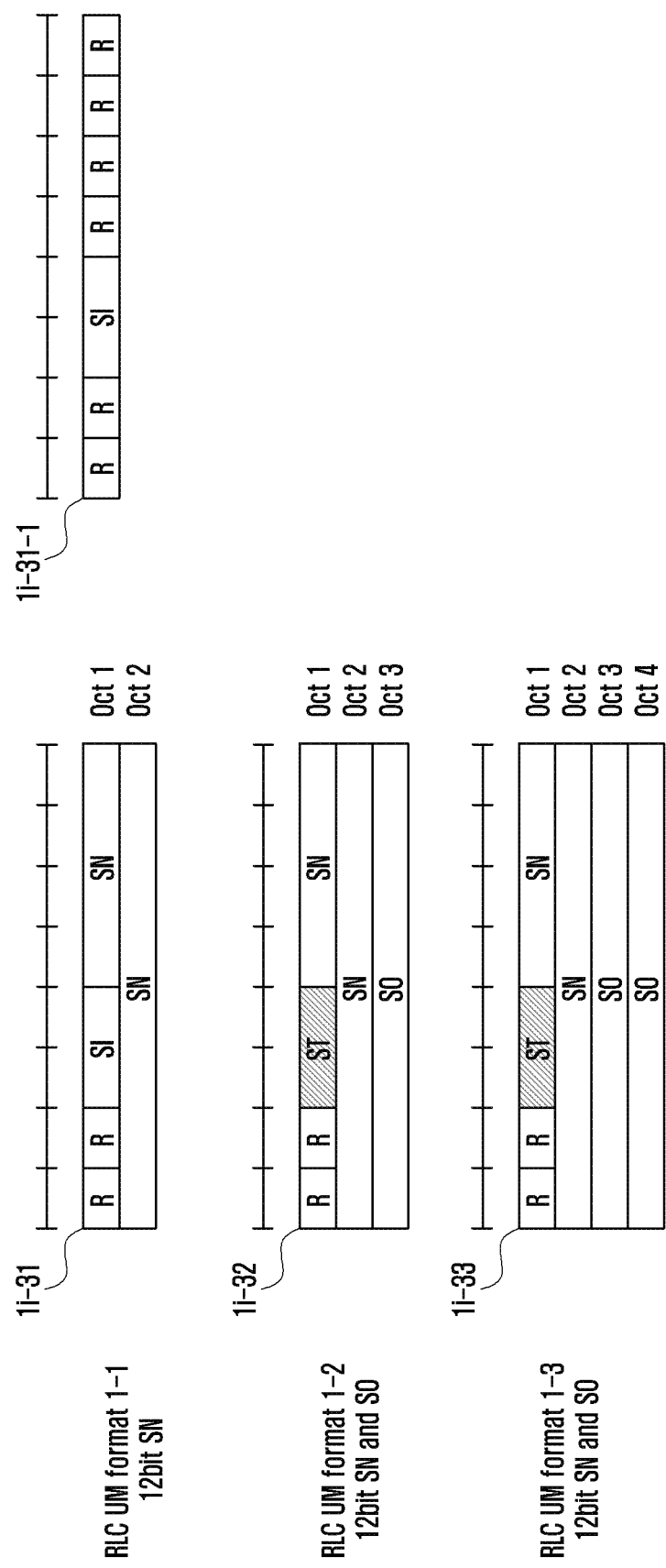

FIGS. 1IA and 1IB are diagrams of an RLC header, according to an embodiment.

FIG. 1IA illustrates an RLC header structure when of using an RLC AM mode (when supporting an ARQ). 1i-11 illustrates an RLC header structure f when using a serial number having a length of 12 bits in a segmentation operation based on the SO field and SI field as described above with reference to FIG. 1F. The RLC header structure may include parts of the fields as described above with reference to FIG. 1F or other new fields, and may have a different structure in accordance with lengths of the respective fields, such as different RLC serial number lengths or SO field lengths, and locations of the respective fields.

R is a reserved bit, and a P field is a field for requesting a status report from a corresponding RLC entity of a receiving end. If the P field is 0, the status report is not requested, whereas if the P field is 1, the status report is requested. The status report may include information on data received up to now. The RLC header structure does not to have an RF field, an FI field, or an E field. Further, the RLC header structure is featured to use an integrated header without dividing the RLC header into those in case of an initial transmission and a retransmission. As described above, the SI field serves to indicate the RLC SDU that has not been segmented, and the first, middle, and last segments that have been segmented as described above with reference to FIG. 1F. As described above with reference to FIG. 1F, since the SO field is not necessary with respect to the RLC SDU that has not been segmented and the first segment that has been segmented, the RLC header may be used in the format of 1$i$-11.

However, since the SO field should indicate the offset with respect to the middle and last segments that have been segmented, the RLC header format of 1$i$-12 may be used. During a terminal transmission operation in an uplink through segmentation and transmission of certain SDU, if a distance between a first byte of a data field of the segmented and transmitted middle segment and last segment and a first byte of the original SDU data field or a first byte of a data field of the previous segment is less than or equal to specific n bytes, the short SO is used. Conversely, if the distance is larger than the n bytes, the long SO is used. The SI field may indicate the middle segment or the last segment, and the ST field may be set to 0 (short SO indication) or 1 (long SO indication). Accordingly, the format of 1$i$-12 or 1$i$-13 may be used. The specific n bytes may be determined as the length of the short SO. For example, the specific n bytes may be set to $n=2^{\wedge(length\ of\ short\ SO)-1}$. During a terminal reception operation in a downlink, if the SI field indicates the existence of the SO, the short SO or the long SO may be analyzed based on the SO-length type field (ST field), and segment reassembly is performed to configure a complete RLC SDU.

When using an RLC AM mode (when supporting an ARQ) in FIG. 1IA, 1$i$-21 is an RLC header format using an RLC serial number having a length of 18 bits, and this format can be applied to the RLC SDU that has not been segmented and the first segment that has been segmented. Further, the format of 1$i$-22 is a format that can be applied to the middle and last segments generated through performing of the segmentation operation since the SO field should indicate an offset.

During the terminal transmission operation in an uplink through segmentation and transmission of certain SDU, if a distance between a first byte of a data field of the segmented and transmitted middle segment and last segment and a first byte of the original SDU data field or a first byte of a data field of the previous segment is less than or equal to specific n bytes, the short SO is used. Conversely, if the distance is larger than the n bytes, the long SO is used. The SI field may indicate the middle segment or the last segment, and the ST field may be set to 0 (short SO indication) or 1 (long SO indication). Accordingly, the format of 1$i$-22 or 1$i$-23 may be used. The specific n bytes may be determined as the length of the short SO. For example, the specific n bytes may be set to $n=2^{\wedge(length\ of\ short\ SO)-1}$. During the terminal reception operation in a downlink, if the SI field indicates the existence of the SO, the short SO or the long SO may be analyzed based on the SO-length type field (ST field), and segment reassembly is performed to configure a complete RLC SDU. Further, whether it is possible to selectively use the short SO field or the long SO field for each bearer may be determined by the terminal at steps 1$e$-10, 1$e$-40, and 1$e$-75 in FIG. 1E when the base station configures the terminal in accordance with the method of FIG. 1E. If the terminal is not configured, the format as illustrated in FIG. 1GA may be applied.

When using an RLC UM mode (when supporting no ARQ) in FIG. 1IB, 1$i$-31 is an RLC header format using an RLC serial number having a length of 12 bits, and this format can be applied to the RLC SDU that has not been segmented and the first segment that has been segmented. Further, the formats of 1$i$-32 and 1$i$-33 can be applied to the middle and last segments generated through the segmentation operation since the SO field should indicate an offset.

During the terminal transmission operation in an uplink through segmentation and transmission of certain SDU, if a distance between a first byte of a data field of the segmented and transmitted middle segment and last segment and a first byte of the original SDU data field or a first byte of a data field of the previous segment is less than or equal to specific n bytes, the short SO is used. Conversely, if the distance is greater than the n bytes, the long SO is used. The SI field may indicate the middle segment or the last segment, and the ST field may be set to 0 (short SO indication) or 1 (long SO indication). Accordingly, the format of 1$i$-22 or 1$i$-23 may be used. The specific n bytes may be determined as the length of the short SO. For example, the specific n bytes may be set to $n=2^{\wedge(length\ of\ short\ SO)-1}$. During the terminal reception operation in a downlink, if the SI field indicates the existence of the SO, the short SO or the long SO may be analyzed based on the SO-length type field (ST field), and segment reassembly is performed to configure a complete RLC SDU. When indicating the offset by the short SO field, the format of 1$i$-32 may be applied, whereas in case of indicating the offset by the long SO field, the format of 1$i$-33 may be applied. Further, whether it is possible to selectively use the short SO field or the long SO field for each bearer may be determined by the terminal at steps 1$e$-10, 1$e$-40, and 1$e$-75 of FIG. 1E when the base station configures the terminal in accordance with FIG. 1E. If the terminal is not configured in such a manner, the format as illustrated in FIG. 1GB may be applied.

On the other hand, the terminal may be configured not to use the RLC serial number in the RLC UM mode at steps 1$e$.10, 1$e$-40, and 1$e$-75 when the base station configures the terminal in accordance with FIG. 1E. The terminal is configured not to use the RLC serial number in the RLC UM mode to reduce an overhead, and since the RLC ARQ function is not necessary in the RLC UM mode, the operation can be performed even without the RLC serial number. That is, when the RLC serial number is not used, an RLC header is not attached to an RLC SDU that has not been segmented, and the RLC SDU may be transmitted to a lower layer. Further, 1-byte RLC header such as 1$i$-31-1 may be attached to the RLC SDU to be transmitted to the lower layer. However, if the RLC SDU has been segmented, even when the RLC serial number is not used to reduce the overhead, the RLC serial number should be added, and the SI field and the SO field as described above with reference to FIG. 1F should be used. The RLC header is configured by applying the RLC serial number, the SI field, and the SO field with respect to the segmented RLC SDU so that the receiving end can receive and reassemble the segmented RLC SDU segments to restore to a complete RLC SDU. Accordingly, if the segmentation operation has been performed, even in case of the configuration not to use the RLC serial number in the RLC UM mode, the RLC header, e.g., 1*i*-31, 1*i*-32, or 1*i*-33, should be applied in accordance with the SO field length. That is, the first segment may use the format of 1*i*-31, and the middle segments and the last segment may use the format of 1*i*-32 or 1*i*-33.

Figure 1J:
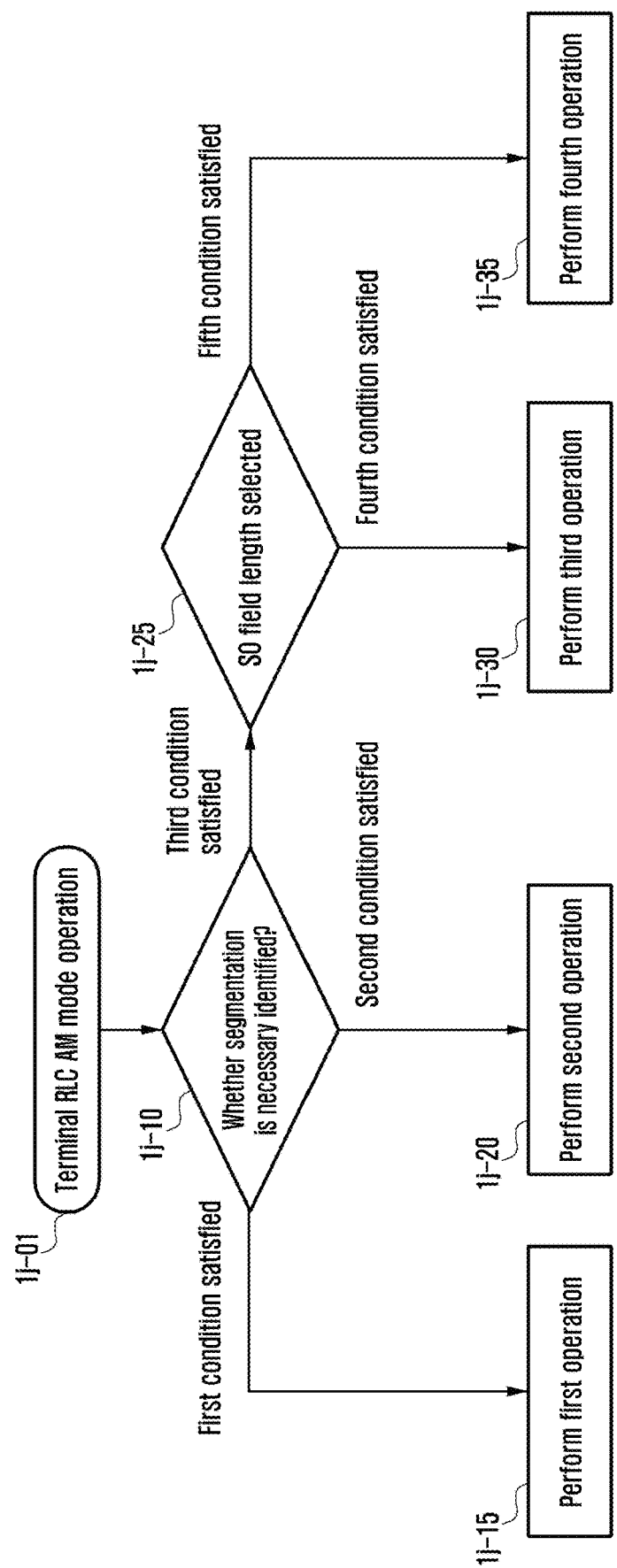
FIGS. 1JA and 1JB are flowcharts of a method in which a terminal configures an RLC header, according to an embodiment.
Figure 1J:
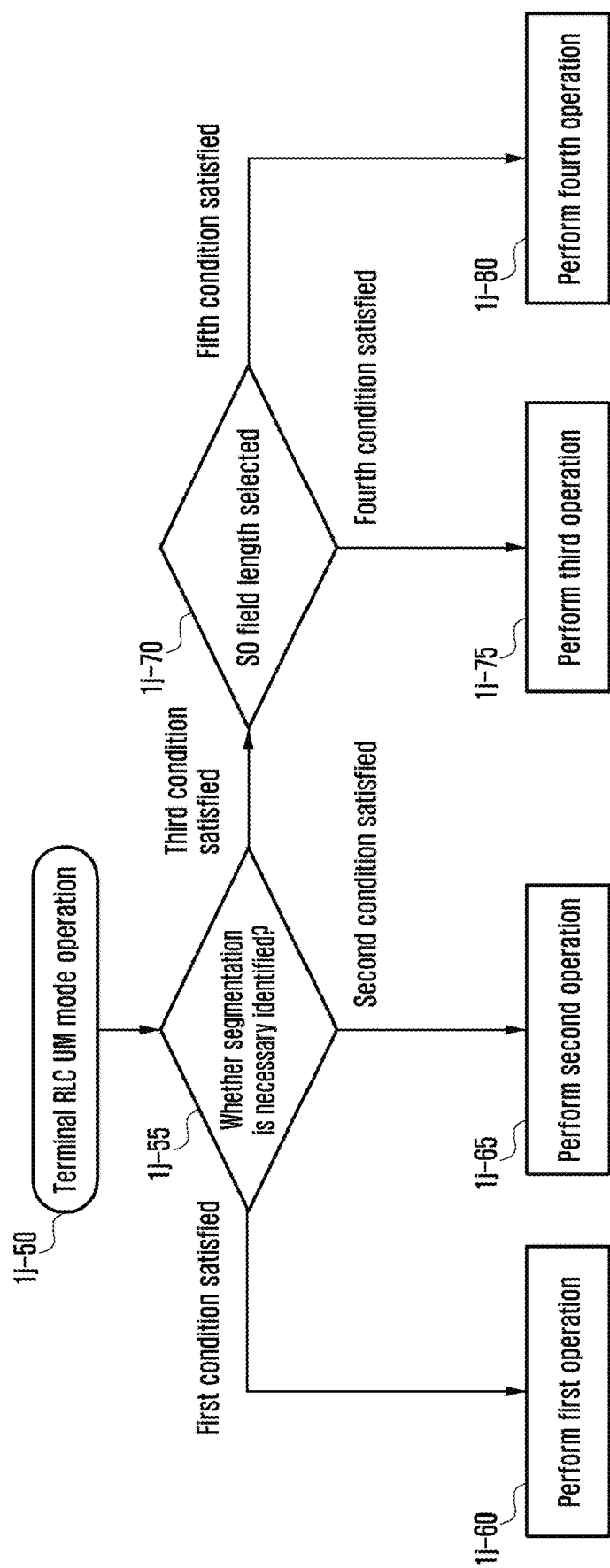

FIGS. 1JA and 1JB are flowcharts of a method in which a terminal configures an RLC header, according to an embodiment.

In an RLC AM mode (at step 1*j*-01), if it is necessary to perform a segmentation operation requested from a lower layer with respect to an RLC SDU (PDCP PDU) transferred from an upper layer, a terminal may perform the segmentation operation. Further, if a segmentation request comes from the lower layer, even in case where the RLC header has already been configured and the RLC PDU has been sent to the lower layer, the terminal may perform the segmentation operation, and may newly configure or update the RLC header to transfer the RLC PDU again to the lower layer. As described above, when configuring the RLC header for the RLC SDU, the terminal first identifies whether the segmentation operation is necessary (at step 1*j*-10).

If a first condition is satisfied, the terminal performs a first operation (at step 1*j*-15), if a second condition is satisfied, the terminal performs a second operation (at step 1*j*-20), if a third condition and a fourth condition are satisfied, the terminal performs a third operation (at steps 1*j*-25 and 1*j*-30), and if the third condition and a fifth condition are satisfied, the terminal performs a fourth operation (at steps 1*j*-25 and 1*j*-35).

The first condition corresponds to a case when the segmentation operation is not necessary with respect to the RLC SDU, and the segmentation operation is not performed, and the RLC header for a complete RLC SDU should be configured.

The second condition corresponds to a case when the segmentation operation is necessary with respect to the RLC SDU, and the segmentation operation is performed, and then the RLC header should be configured with respect to the first RLC SDU segment.

The third condition corresponds to a case when the segmentation operation is necessary with respect to the RLC SDU, and the segmentation operation is performed, and then the RLC header should be configured with respect to the middle and last RLC SDU segments that are not the first RLC SDU segment.

The fourth condition corresponds to a case when the short SO field is used since a distance between a first byte of a data field of the segmented and transmitted middle segment and last segment and a first byte of the original SDU data field or a first byte of a data field of the previous segment is less than or equal to specific n bytes during the SDU segmentation and transmission.

The fifth condition corresponds to a case when the long SO field is used since the distance between the first byte of the data field of the segmented and transmitted middle segment and last segment and the first byte of the original SDU data field or the first byte of the data field of the previous segment exceeds the specific n bytes during the SDU segmentation and transmission.

The first operation may include setting the SI field to 00 when configuring the RLC header and configuring the RLC header to which the SO field is not added.

The second operation may include setting the SI field to 01 when configuring the RLC header and configuring the RLC header to which the SO field is not added.

The third operation may include setting the SI field to 11 when configuring the RLC header, setting the ST field to 0 to indicate the use of the short SO field, and configuring the RLC header so that an offset can be indicated through addition of the SO field.

The fourth operation may include setting the SI field to 10 when configuring the RLC header, setting the ST field to 1 to indicate the use of the long SO field, and configuring the RLC header so that an offset can be indicated through addition of the SO field.

Accordingly, the receiving end can identify the SI field, the kind of segment, and then existence/nonexistence of the SO field. If the existence of the SO field is identified through the SI field, it is determined whether the SO field is the short SO or the long SO through the ST field to perform the reception processing.

In an RLC UM mode (at step 1*j*-50), if a necessity to perform a segmentation operation is requested from a lower layer with respect to an RLC SDU (PDCP PDU) transferred from an upper layer, a terminal may perform the segmentation operation. Further, if a segmentation request comes from the lower layer even in case when the RLC header has already been configured and the RLC PDU has been sent to the lower layer, the terminal may perform the segmentation operation, and may newly configure or update the RLC header to transfer the RLC PDU again to the lower layer. As described above, when configuring the RLC header for the RLC SDU, the terminal first identifies whether the segmentation operation is necessary (at step 1*j*-55).

If a first condition is satisfied, the terminal performs a first operation (at step 1*j*-60), if a second condition is satisfied, the terminal performs a second operation (at step 1*j*-65), if a third condition and a fourth condition are satisfied, the terminal performs a third operation (at steps 1*j*-70 and 1*j*-75), and if the third condition and a fifth condition are satisfied, the terminal performs a fourth operation (at steps 1*j*-70 and 1*j*-80).

The first condition corresponds to a case when the segmentation operation is not necessary with respect to the RLC SDU, and thus the segmentation operation is not performed.

The second condition corresponds to a case when since the segmentation operation is necessary with respect to the RLC SDU, and the segmentation operation is performed, and then the RLC header should be configured with respect to the first RLC SDU segment.

The third condition corresponds to a case when since the segmentation operation is necessary with respect to the RLC SDU, and the segmentation operation is performed, and then the RLC header should be configured with respect to the middle and last RLC SDU segments that are not the first segment.

The fourth condition corresponds to a case when the short SO field is used since a distance between a first byte of a data field of the segmented and transmitted middle segment and last segment and a first byte of the original SDU data field or a first byte of a data field of the previous segment is less than or equal to specific n bytes during the SDU segmentation and transmission.

The fifth condition corresponds to a case when the long SO field is used since the distance between the first byte of the data field of the segmented and transmitted middle segment and last segment and the first byte of the original SDU data field or the first byte of the data field of the previous segment exceeds the specific n bytes during the SDU segmentation and transmission.

When a base station configures a terminal not to use an RLC serial number in order to reduce an overhead, the first operation may include an operation of transferring the RLC SDU to the lower layer without attaching the RLC header thereto (1-bit indicator may be included at the head in order to indicate whether the segmentation operation has been performed) and an operation of transferring the RLC SDU to the lower layer through attaching of the 1-byte RLC header such as 1$i$-31-1 thereto (during configuring of the RLC header, the SI field is set to 00, and the RLC header to which the SO field is not added is configured). If the base station does not configure the above-described indication (nonuse of the serial number), the first operation may include operations of setting the SI field to 00 when configuring the RLC header and configuring the RLC header to which the SO field is not added.

The second operation may include operations of setting the SI field to 01 when configuring the RLC header and configuring the RLC header to which the SO field is not added.

The third operation may include setting the SI field to 11 when configuring the RLC header, setting the ST field to 0 to indicate the use of the short SO field, and configuring the RLC header so that an offset can be indicated through addition of the SO field.

The fourth operation may include setting the SI field to 10 when configuring the RLC header, setting the ST field to 1 to indicate the use of the long SO field, and configuring the RLC header so that an offset can be indicated through addition of the SO field.

The receiving end may receive the RLC SDU, and identify the SI field from the RLC header to determine whether the received RLC SDU is the RLC SDU that has not been segmented (complete RLC SDU) or the RLC SDU that has been segmented (segment). If the RLC SDU has not been segmented, the receiving end may discard the RLC header and may send the RLC SDU to an upper layer. If the RLC SDU has been segmented, the receiving end may identify whether the RLC SDU is the first, middle, or last segment based on the SI field, arrange the segments to match the RLC serial numbers in consideration of the respective fields, such as identifying the length of the SO field, if any, through the ST field, and if a reassembly function is triggered by a window or a timer, the receiving end may make a complete RLC SDU through reassembly of the segments to transfer the complete RLC SDU to the upper layer. If the reassembly of the segments is not possible, the RLC SDU is discarded.

In the RLC UM mode, the receiving end may operate based on the window or the timer.

When the operation is based on the window, the receiving end may operate an RLC reception window, and the window may be operated with a size corresponding to a half of the RLC serial number. When a lower edge of the window, a serial number through subtraction of the size of the RLC window from an upper edge may be configured, and the highest RLC serial number received from the receiving end RLC may be configured at the upper edge. Accordingly, if the received RLC serial number has a larger value than the values of the RLC serial numbers in the window, the window moves accordingly. If the received RLC PDU serial number has a smaller value than the value of the received window lower edge, the receiving end RLC layer may discard this, and may check whether a duplicate RLC PDU is received with respect to the RLC serial number existing in the window to discard the same.

Further, if an RLC PDU segment having an RLC serial number existing in the window arrives, the receiving end RLC layer may store this, and if the lower edge of the window passes the RLC serial number corresponding to the RLC PDU segment, the receiving end RLC layer may generate and send a complete RLC PDU through performing of a reassembling procedure. Conversely, if the complete RLC PDU is unable to be generated, the receiving end RLC layer may discard the RLC PDU segments. The receiving end RLC layer may identify the SI field or 1-bit indicator, and may directly send the RLC PDU that has not been segmented to the upper layer. Further, if the SI field or the 1-bit indicator indicates the RLC PDU that has been segmented, the receiving end RLC layer stores the RLC PDU segments, and if the reassembling procedure is triggered by the window as described above, it performs the reassembling procedure to send the reassembled RLC PDU to the upper layer or to discard the same.

When the operation is based on the timer, the receiving end RLC layer operates the timer in the RLC UM mode. The receiving end RLC layer may operate several timers or one timer.

When operating only one timer, the receiving end RLC layer identifies the SI field or 1-bit indicator, and directly sends the RLC PDU that has not been segmented to the upper layer. If the SI field or the 1-bit indicator indicates the RLC PDU that has been segmented, the receiving end RLC layer stores the RLC PDU segments, and operates the timer. That is, timer triggering is performed when the segmented RLC PDU segment arrives.

Thereafter, if the RLC PDUs are received, the above-described process is repeated, and if the RLC PDU segment has arrived again, the receiving end RLC layer identifies whether the timer is operated, and if the timer is not operated, the receiving end RLC layer restarts the timer. If the timer expires, the receiving end RLC layer reassembles the RLC PDU segments received up to now, and sends the reassembly-completed complete RLC PDUs to the upper layer while discarding the reassembly-failed RLC PDU segments.

When operating several timers, the receiving end RLC layer identifies the SI field or 1-bit indicator, and directly sends the RLC PDU that has not been segmented to the upper layer. If the SI field or the 1-bit indicator indicates the RLC PDU that has been segmented, the receiving end RLC layer stores the RLC PDU segments, and operates the timer with respect to the RLC serial numbers of the RLC PDU segments. That is, timer triggering is performed when the segmented RLC PDU segment corresponding to a specific RLC serial number arrives.

Thereafter, if the RLC PDUs are received, the above-described process is repeated, and if the RLC PDU segment has arrived again, the receiving end RLC layer identifies whether the timer corresponding to the RLC serial number of the received RLC PDU segment is operated, and if the timer is not operated, the receiving end RLC layer restarts the timer. If the timer corresponding to the RLC serial number is not operated, the receiving end RLC layer may operate a new timer with respect to the corresponding RLC serial number. Accordingly, whenever the RLC PDU segment arrives for each RLC serial number, the timer can be operated for each RLC serial number. If the timer for the specific RLC serial number expires, the receiving end RLC layer reassembles the RLC PDU segments having the RLC serial numbers corresponding to the timer received up to now, and sends the reassembly-completed complete RLC PDUs to the upper layer while discarding the reassembly-failed RLC PDU segments.

Figure 1K:
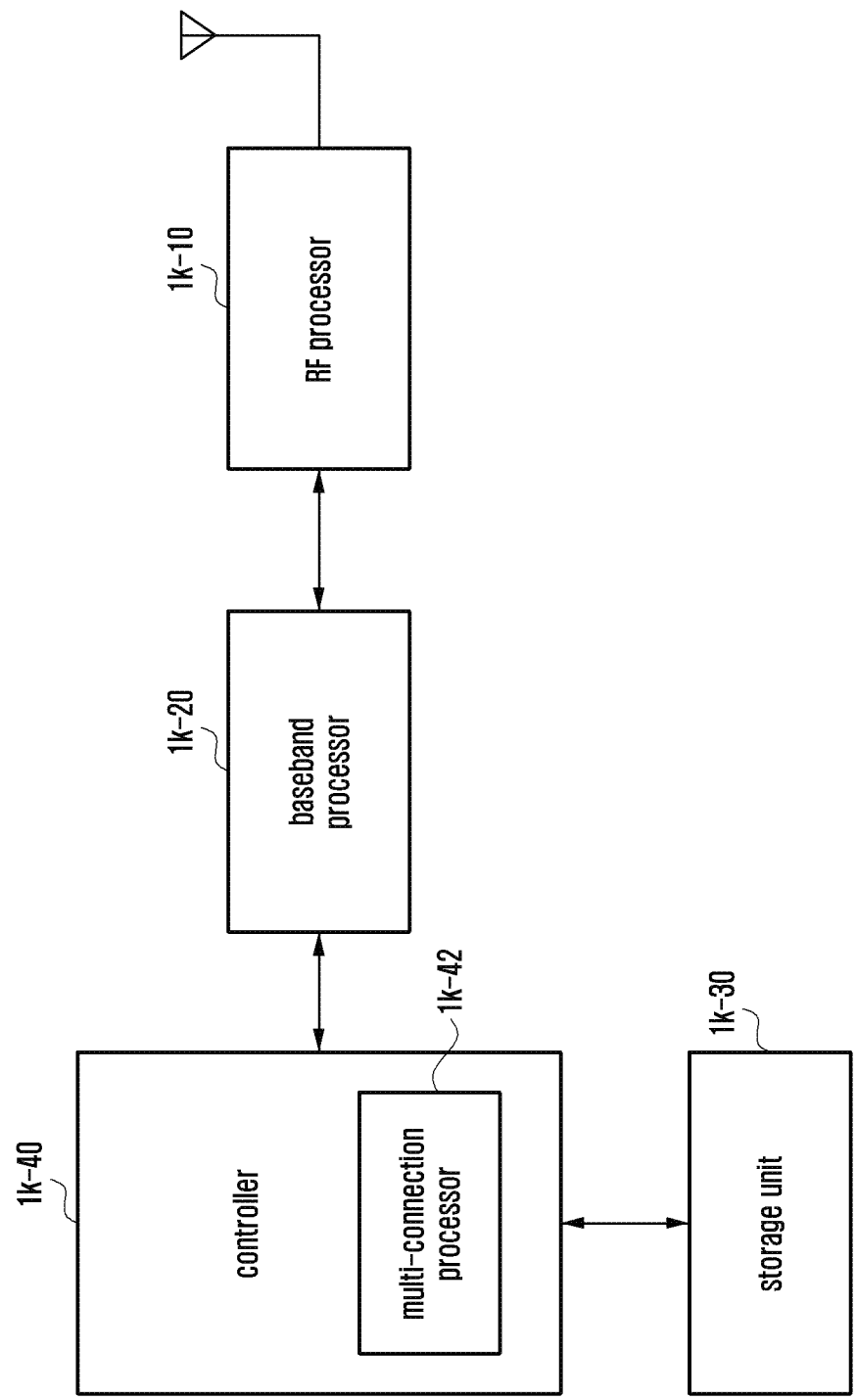
FIG. 1K is a diagram of a terminal, according to an embodiment.

FIG. 1K is a diagram of a terminal, according to an embodiment.

The terminal includes a radio frequency (RF) processor 1k-10, a baseband processor 1k-20, a storage unit 1k-30, and a controller 1k-40.

The RF processor 1k-10 transmits and receives a signal through a radio channel, such as signal band conversion and amplification. The RF processor 1k-10 performs up-conversion of a baseband signal provided from the baseband processor 1k-20 into an RF-band signal to transmit the converted signal to an antenna, and performs down-conversion of the RF-band signal received through the antenna into a baseband signal. The RF processor 1k-10 may include a transmission filter, a reception filter, an amplifier, a mixer, an oscillator, a digital-to-analog converter (DAC), and an analog-to-digital converter (ADC). Although only one antenna is illustrated, the terminal may be provided with a plurality of antennas. Further, the RF processor 1k-10 may include a plurality of RF chains. Further, the RF processor 1k-10 may perform beamforming. For the beamforming, the RF processor 1k-10 may adjust phases and sizes of signals transmitted or received through the plurality of antennas or antenna elements. Further, the RF processor may perform MIMO, and may receive several layers during performing of a MIMO operation. The RF processor 1k-10 may perform reception beam sweeping through proper configuration of the plurality of antennas or antenna elements under the control of the controller, or may control the direction and the beam width of the reception beam so that the reception beam is synchronized with the transmission beam.

The baseband processor 1k-20 performs conversion between a baseband signal and a bit string in accordance with the physical layer standard of the system. During data transmission, the baseband processor 1k-20 generates complex symbols by encoding and modulating a transmitted bit string. During data reception, the baseband processor 1k-20 restores a received bit string by demodulating and decoding the baseband signal provided from the RF processor 1k-10. For example, when following an OFDM method, during data transmission, the baseband processor 1k-20 generates complex symbols by encoding and modulating a transmitted bit string, performs mapping of the complex symbols on subcarriers, and then configures OFDM symbols through the inverse fast Fourier transform (IFFT) operation and cyclic prefix (CP) insertion. During data reception, the baseband processor 1k-20 divides the baseband signal provided from the RF processor 1k-10 in the unit of OFDM symbols, restores the signals mapped on the subcarriers through the fast Fourier (FFT) operation, and then restores the received bit string through demodulation and decoding.

The baseband processor 1k-20 and the RF processor 1k-10 transmit and receive the signals as described above. The baseband processor 1k-20 and the RF processor 1k-10 may be called a transmitter, a receiver, a transceiver, or a communication unit. In order to support different radio connection technologies, the baseband processor 1k-20 and/or the RF processor 1k-10 may include a plurality of communication modules. In order to process signals of different frequency bands, the baseband processor 1k-20 and/or the RF processor 1k-10 may include different communication modules. For example, the different radio connection technologies may include an LTE network and an NR network. Further, the different frequency bands may include super high frequency (SHF) (e.g., 2.5 GHz or 5 GHz) band and millimeter wave (mmWave) (e.g., 60 GHz) band.

The storage unit 1k-30 stores a basic program for an operation of the terminal, application programs, and data of setup information. The storage unit 1k-30 provides stored data in accordance with a request from the controller 1k-40.

The controller 1k-40 controls the operation of the terminal. For example, the controller 1k-40 transmits and receives signals through the baseband processor 1k-20 and the RF processor 1k-10. The controller 1k-40 records or reads data in or from the storage unit 1k-30. The controller 1k-40 may include at least one processor. For example, the controller 1k-40 may include a communication processor for controlling communication and an AP for controlling an upper layer, such as an application program. The controller 1k-40 may include a multi-connection processor 1k-42 for performing a process to operate in a multi-connection mode.

Figure 1L:
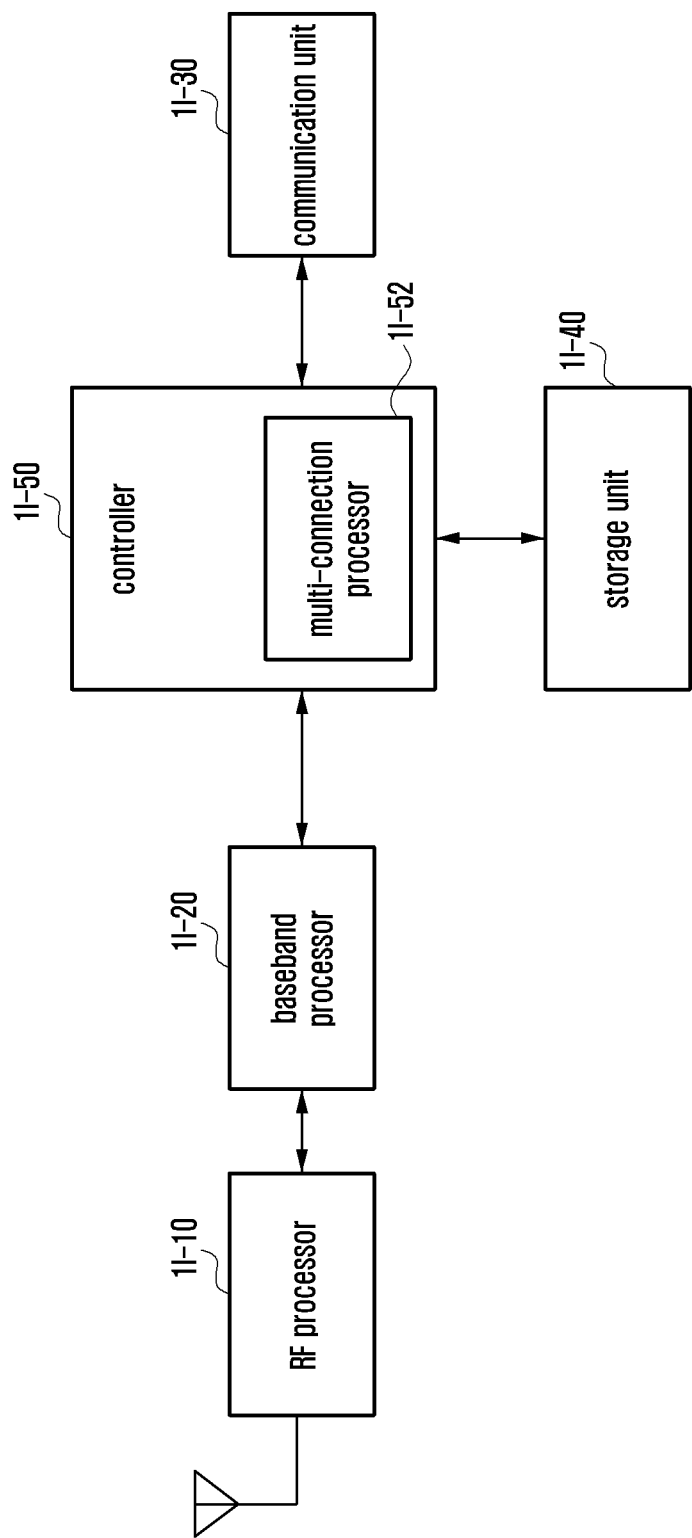
FIG. 1L is a diagram of a base station in a wireless communication system, according to an embodiment.

FIG. 1L is a diagram of a base station in a wireless communication system, according to an embodiment.

The base station includes an RF processor 1l-10, a baseband processor 1l-20, a backhaul communication unit 1l-30, a storage unit 1l-40, and a controller 1l-50.

The RF processor 1l-10 transmits and receives a signal through a radio channel, such as signal band conversion and amplification. The RF processor 1l-10 performs up-conversion of a baseband signal provided from the baseband processor 1l-20 into an RF-band signal to transmit the converted signal to an antenna, and performs down-conversion of the RF-band signal received through the antenna into a baseband signal. The RF processor 1l-10 may include a transmission filter, a reception filter, an amplifier, a mixer, an oscillator, a DAC, and an ADC. Although only one antenna is illustrated, the base station may be provided with a plurality of antennas. Further, the RF processor 1l-10 may include a plurality of RF chains. The RF processor 1l-10 may perform beamforming. For the beamforming, the RF processor 1l-10 may adjust phases and sizes of signals transmitted or received through the plurality of antennas or antenna elements. Further, the RF processor may perform down MIMO operation through transmission of one or more layers.

The baseband processor 1l-20 performs conversion between a baseband signal and a bit string in accordance with the physical layer standard of the first radio connection technology. During data transmission, the baseband processor 1l-20 generates complex symbols by encoding and modulating a transmitted bit string. During data reception, the baseband processor 1l-20 restores a received bit string by demodulating and decoding the baseband signal provided from the RF processor 1l-10. For example, when following an OFDM method, during data transmission, the baseband processor 1l-20 generates complex symbols by encoding and modulating a transmitted bit string, performs mapping of the complex symbols on subcarriers, and then configures OFDM symbols through the IFFT operation and CP insertion. During data reception, the baseband processor 1l-20 divides the baseband signal provided from the RF processor 1l-10 in the unit of OFDM symbols, restores the signals mapped on the subcarriers through the FFT operation, and then restores the received bit string through demodulation and decoding. The baseband processor 1l-20 and the RF processor 1l-10 transmit and receive the signals as described above. Accordingly, the baseband processor 1l-20 and the RF processor 1l-10 may be called a transmitter, a receiver, a transceiver, or a wireless communication unit. The communication unit 1l-30 provides an interface for communicating with other nodes in the network.

The storage unit 1l-40 stores a basic program for an operation of the main base station, application programs, and data of setup information. In particular, the storage unit 1l-40 may store information on a bearer allocated to the connected terminal and the measurement result reported from the connected terminal. The storage unit 1l-40 may store information that becomes a basis of determination whether to provide or suspend a multi-connection to the terminal. The storage unit 1l-40 provides stored data in accordance with a request from the controller 1l-50.

The controller 1l-50 controls the base station. The controller 1l-50 transmits and receives signals through the baseband processor 1l-20 and the RF processor 1l-10 or through the backhaul communication unit 1l-30. The controller 1l-50 records or reads data in or from the storage unit 1l-40. The controller 1l-50 may include at least one processor. The controller 1l-50 may include a multi-connection processor 1l-52 for performing a process to operate in a multi-connection mode.

Figure 2A:
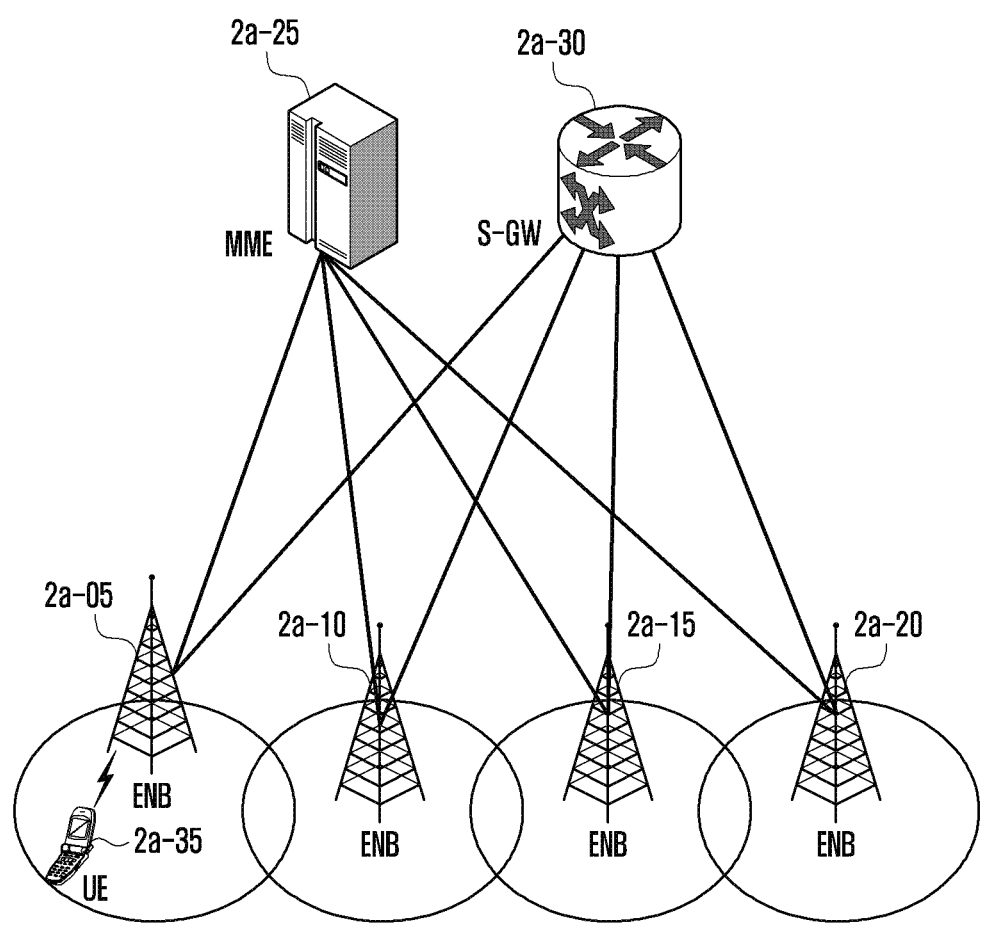
FIG. 2A is a diagram of an LTE system, according to an embodiment.

FIG. 2A is a diagram of an LTE system, according to an embodiment.

Referring to FIG. 2A, a RAN of an LTE system is composed of eNBs, node Bs, or base stations 2a-05, 2a-10, 2a-15, and 2a-20, an MME 2a-25, and as S-GW 2a-30. UE or terminal 2a-35 accesses to an external network through the eNBs 2a-05 to 2a-20 and the S-GW 2a-30.

In FIG. 2A, the eNBs 2a-05 to 2a-20 correspond to existing node Bs of a UMTS system. The eNBs are connected to the UE 2a-35 on a radio channel, and play a more complicated role than that of the existing node B. In the LTE system, since all user traffics including a real-time service, such as a VoIP through an internet protocol, are serviced on shared channels, devices performing scheduling through summarization of state information, such as a buffer state, an available transmission power state, and a channel state of each UE, are necessary, and the eNBs 2a-05 to 2a-20 control this. In general, one eNB controls a plurality of cells. In order to implement a transmission speed of 100 Mbps, the LTE system uses OFDM in a bandwidth of 20 MHz as a radio access technology (RAT). Further, the LTE system adopts an AMC scheme that determines a modulation scheme and a channel coding rate to match the channel state of the terminal. The S-GW 2a-30 provides a data bearer, and generates or removes the data bearer under the control of the MME 2a-25. The MME controls not only mobility management of the terminal but also various kinds of control functions, and is connected to the plurality of eNBs.

Figure 2B:
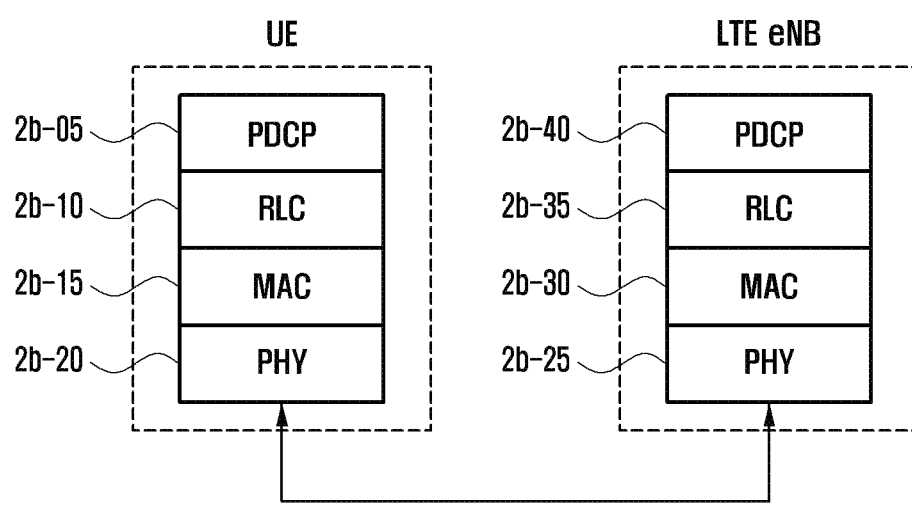
FIG. 2B is a diagram illustrating a radio protocol structure of an LTE system for reference in explaining the present disclosure.

FIG. 2B is a diagram of a radio protocol structure in an LTE system, according to an embodiment.

Referring to FIG. 2B, in UE or an eNB, a radio protocol of an LTE system is composed of a PDCP 2b-05 or 2b-40, an RLC 2b-10 or 2b-35, and a MAC 2b-15 or 2b-30. The PDCP 2b-05 or 2b-40 controls IP header compression/decompression operations. The main functions of the PDCP are summarized as follows:
  Header compression and decompression: ROHC only;
  Transfer of user data;
  In-sequence delivery of upper layer PDUs at a PDCP reestablishment procedure for an RLC AM;
  For split bearers in DC (only support for an RLC AM): PDCP PDU routing for transmission and PDCP PDU reordering for reception;
  Duplicate detection of lower layer SDUs at a PDCP reestablishment procedure for an RLC AM;
  Retransmission of PDCP SDUs at handover and, for split bearers in DC, of PDCP PDUs at a PDCP data-recovery procedure, for an RLC AM;
  Ciphering and deciphering;
  Timer-based SDU discard in an uplink; and The radio link control (RLC) 2b-10 or 2b-35 reconfigures a PDCP PDU with a proper size and performs an ARQ operation and the like.

The main functions of the RLC are summarized as follows:
  Transfer of upper layer PDUs;
  Error correction through an ARQ (only for AM data transfer);
  Concatenation, segmentation, and reassembly of RLC SDUs (only for UM and AM data transfer);
  Re-segmentation of RLC data PDUs (only for AM data transfer);
  Reordering of RLC data PDUs (only for UM and AM data transfer);
  Duplicate detection (only for UM and AM data transfer);
  Protocol error detection (only for AM data transfer);
  RLC SDU discard (only for UM and AM transfer); and
  RLC reestablishment.

The MAC 2b-15 or 2b-30 is connected to several RLC layer devices configured in one terminal, and performs multiplexing/demultiplexing of RLC PDUs into/from MAC PDU. The main functions of the MAC are summarized as follows:
  Mapping between logical channels and transport channels;
  Multiplexing/demultiplexing of MAC SDUs belonging to one or different logical channels into/from transport blocks (TB) delivered to/from the physical layer on transport channels;
  Scheduling information reporting;
  HARQ function (error correction through HARQ);
  Priority handling between logical channels of one UE;
  Priority handling between UEs by means of dynamic scheduling;
  MBMS service identification;
  Transport format selection; and
  Padding.

The physical layer 2b-20 or 2b-25 performs channel coding and modulation of upper layer data to configure and transmit OFDM symbols on a radio channel, or performs demodulation and channel decoding of the OFDM symbols received on the radio channel to transfer the demodulated and channel-decoded symbols to an upper layer.

Figure 2C:
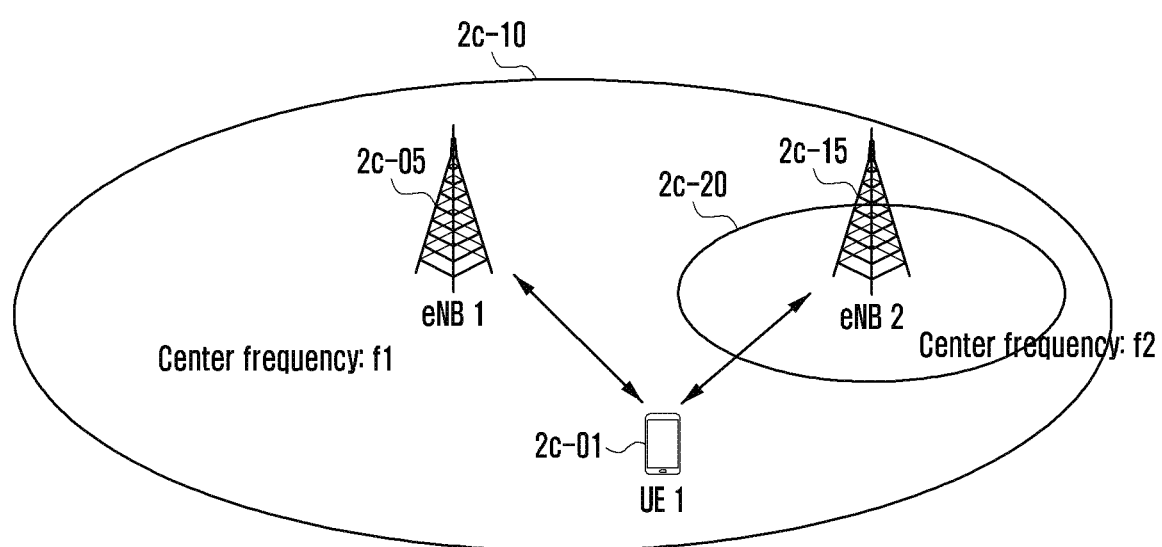
FIGS. 2CA and 2CB are diagrams illustrating multi-connection and carrier aggregation operations of an existing LTE system, according to an embodiment.
Figure 2C:
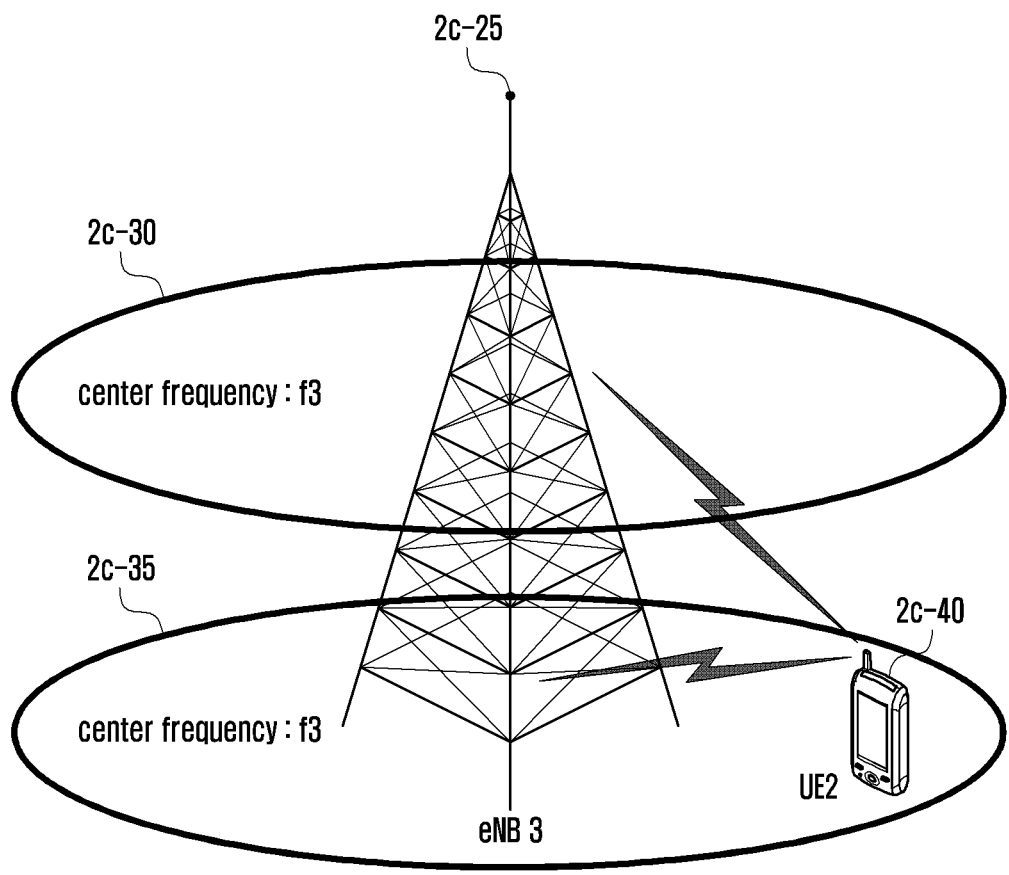

FIGS. 2CA and 2CB are diagrams of multi-connection and carrier aggregation operations of an existing LTE system, according to an embodiment. Referring to FIGS. 2CA and 2CB, when eNB 1 1c-05 transmits/receives a carrier having a center frequency of f1, and eNB 2 2c-15 transmits/receives a carrier having a center frequency of f2, one UE 1 2c-01 may perform transmission/reception with two or more eNBs through combination of a carrier having a forward center frequency of f1 and a carrier having a forward center frequency of f2. In an LTE system, the above-described operation is supported, and referred to as dual connectivity (DC).

Further, one eNB 3 can transmit and receive multi-carriers over several frequency bands. For example, if a carrier 2c-30 having a forward center frequency of f3 and a carrier 2c-35 having a forward center frequency of f4 are transmitted from eNB 3 2c-25, one UE 2 transmits/receives data using one of the two carriers. However, the UE 2 having a carrier aggregation capability can simultaneously transmit/receive data through several carriers. The eNB 3 2c-35 may allocate more carriers to the UE 2 2c-40 having the carrier aggregation capability according to circumstances to heighten the transmission speed of the UE 2 2c-40. Aggregation of forward carriers and backward carriers transmitted and received by one eNB is referred to as intra-eNB carrier aggregation (CA). Traditionally, if it is assumed that one forward carrier transmitted by one eNB and one backward carrier received by the eNB constitute one cell, it may be understood that the carrier aggregation is for the UE to transmit/receive data simultaneously through several cells. Through this, the maximum transmission speed is increased in proportion to the number of carriers being aggregated.

Hereinafter, reception of data by the UE through a certain forward carrier or transmission of data by the UE through a certain uplink carrier is the same as transmission/reception of data using a control channel and a data channel provided from a cell corresponding to the center frequency and the frequency band featuring the carrier. A set of serving cells being controlled by the same eNB is defined as a cell group (CG). The cell group is divided into a master cell group (MCG) and a secondary cell group (SCG). The MCG is a set of serving cells being controlled by the eNB (master eNB (MeNB)) controlling a primary cell (PCell), and the SCG is a set of serving cells being controlled by the eNB that is not the eNB controlling the PCell. That is, being controlled by the eNB (secondary eNB (SeNB)) controlling only secondary cells (SCells). The eNB notifies the UE whether a specific serving cell belongs to the MCG or the SCG in the process of configuring the corresponding serving cell.

The PCell and SCell represent the kind of serving cell configured in the UE. There are some differences between the PCell and SCell, for example, the PCell always maintains an active state, but the SCell repeats an active state and an inactive state in accordance with the indication of the eNB. The terminal mobility is controlled around the PCell, and it may be understood that the SCell is an additional serving cell for data transmission/reception. The PCell and the SCell are defined in the LTE standards 36.331 or 36.321, and these terms have the same meanings as those typically used in an LTE mobile communication system. The terms carrier, component carrier, and serving cell are used herein interchangeably.

Referring again to FIGS. 2CA and 2CB, if eNB 1 2c-05 is MeNB and eNB 2 2c-15 is SeNB, a serving cell 2c-10 having a center frequency of f1 is a serving cell belonging to the MCG, and a serving cell 2c-20 having a center frequency of f2 is a serving cell belonging to the SCG. Further, it may be difficult to transmit HARQ feedback of SCG SCells and channel state information (CSI) through a physical uplink control channel (PUCCH) of a PCell. The HARQ feedback should be transferred within an HARQ round trip time (RTT) (normally, 8 ms), and the transmission delay between the MeNB and the SeNB may be longer than the HARQ RTT. Thus, a PUCCH transmission resource is configured in one of the SCells belonging to the SCG, that is, in a primary SCell (PSCell), the HARQ feedback of the SCG SCells, and the CSI are transmitted through the PUCCH.

Further, in a CA in a normal eNB 3 2c-25, UE 2 2c-40 transmits through the PUCCH of the PCell not only the HARQ feedback of the PCell and the CSI, but also the HARQ feedback of the SCell and the CSI. This is to apply the CA operation evenly with respect to the UE, in which simultaneous uplink transmission is difficult or impossible. In LTE Rel-13 (Release-13) enhanced CA (eCA), an additional SCell having a PUCCH is defined, and up to 32 carriers can be concatenated.

Figure 2D:
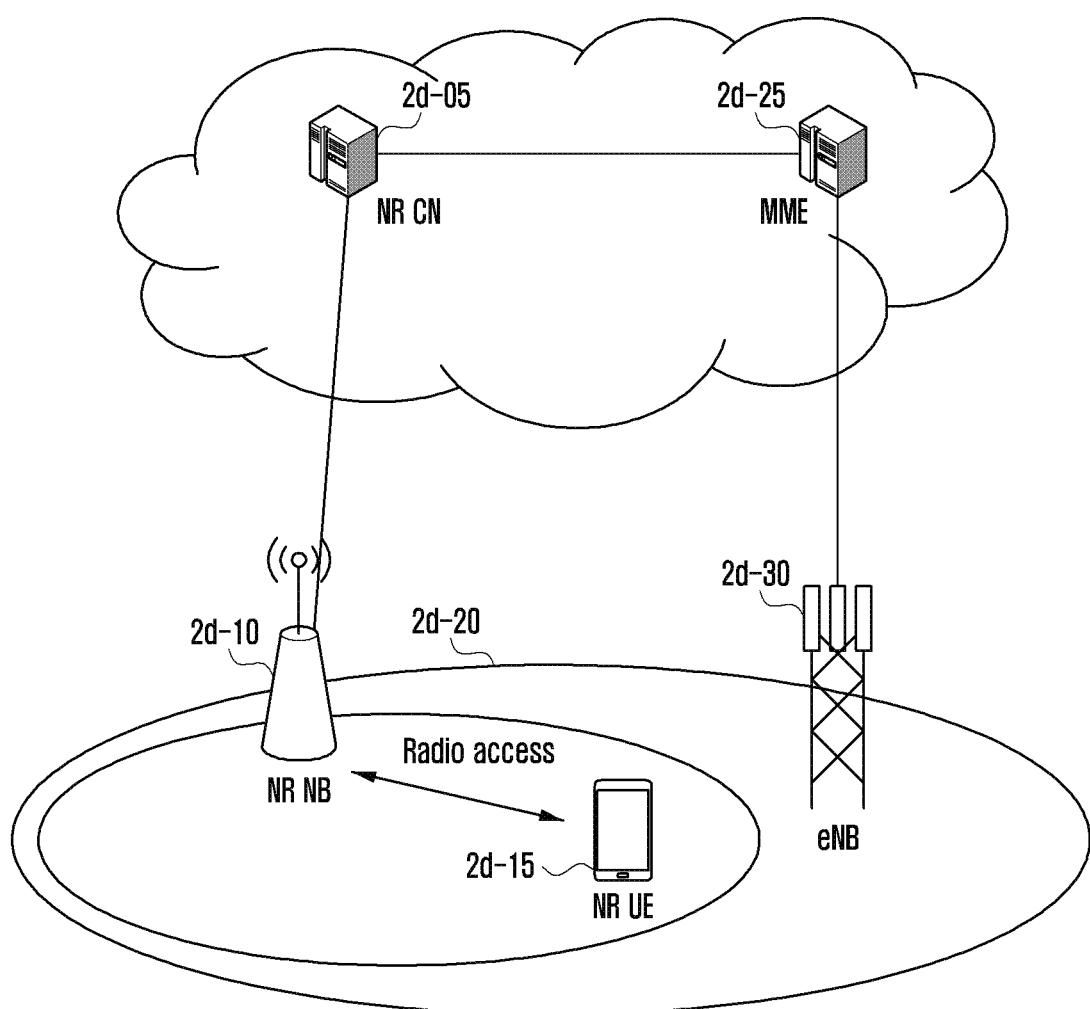
FIG. 2D is a diagram of a next-generation mobile communication system, according to an embodiment.

FIG. 2D is a diagram of a next-generation mobile communication system, according to an embodiment.

Referring to FIG. 2D, a RAN of a next-generation mobile communication system is composed of aNR NB 2d-10 and a new radio core network (NR CN) 2d-05. New radio user equipment (NR UE or terminal) 2d-15 accesses to an external network through the NR NB 2d-10 and the NR CN 2d-05.

In FIG. 2D, the NR NB 2d-10 corresponds to an eNB of the existing LTE system. The NR NB is connected to the NR UE 2d-15 on a radio channel, and thus it can provide a superior service than the service of the existing node B. Since all user traffics are serviced on shared channels in the next-generation mobile communication system, a device that performs scheduling through consolidation of status information, such as a buffer state of UEs, an available transmission power state, and a channel state, is required, and the NR NB 2d-10 controls this operation.

One NR NB generally controls a plurality of cells. In order to implement ultrahigh-speed data transmission as compared with the existing LTE, the NR NB may have a bandwidth that is greater than or equal to the existing maximum bandwidth, and a beamforming technology may be additionally grafted in consideration of OFDM as a RAT. Further, an AMC scheme determining a modulation scheme and a channel coding rate to match the channel state of the UE is applied. The NR CN 2d-05 performs functions of mobility support, bearer setup, and QoS configuration. The NR CN is a device that controls not only a mobility management function of the UE but also various kinds of control functions, and is connected to a plurality of eNBs. Further, the next-generation mobile communication system may interlock with the existing LTE system, and the NR CN is connected to an MME 2d-25 through a network interface. The MME is connected to an eNB 2d-30 that is the existing eNB.

Figure 2E:
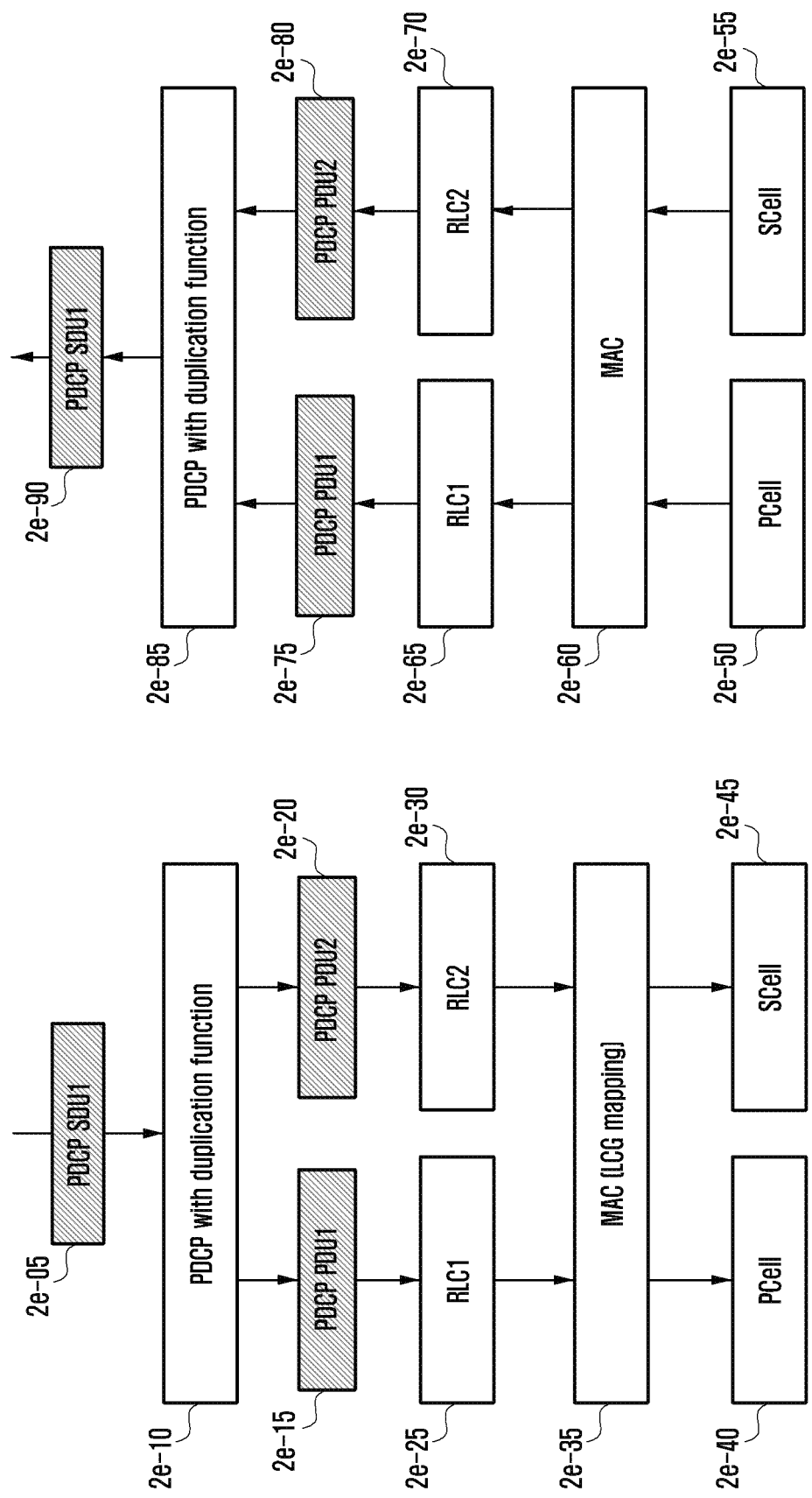
FIG. 2E is a diagram of a data transmission operation through packet duplication, according to an embodiment.

FIG. 2E is a diagram of data transmission operation through packet duplication, according to an embodiment.

A method for transmitting duplicated data in different paths or on different time resources when UE performs packet duplication to support ultra-reliable low latency communication (URLLC) in a next-generation mobile communication system is described herein. If the duplicated data is allocated to the same MAC PDU, duplicate transmission becomes impossible. In case of the packet duplication, DC or CA may be used. That is, the UE should be in a state where the SgNB or SCell has been configured so that the terminal can support the DC or CA. It is assumed that the CA has been configured, and various methods for supporting packet duplicate transmission will be described through various examples.

Referring again to FIG. 2E, the eNB or the UE receives a data packet for the URLLC, that is, PDCP SDU1, from an upper layer (at step 2e-05), and transfers this to a PDCP layer. At step 2e-10, the PDCP determines whether to duplicate the corresponding data packet, and if the duplicate is necessary, it generates the original PDCP PDU1 and duplicated PDCP PDU2 (at steps 2e-15 and 2e-20) to transfer them to RLC layers at steps 2e-25 and 2e-30. RLC1 and RLC2 of each serving cell transfer the received data packet to a MAC layer of the MgNB or the UE. At step 2e-35, the MAC layer generates a MAC PDU after mapping the received packet data to a proper logical channel group (LCG), and transfers the MAC PDU to physical layers at steps 2e-40 and 2e-45 of the corresponding serving cell. Thereafter, the physical layer transmits the MAC PDU transferred on the corresponding carrier aggregation or time resources.

A receiving process is in reverse to the transmitting process. That is, the physical layer receives the data packet (MAC PDU) through the corresponding serving cells (at steps 2e-50 and 2e-55), and transfers the received data packet to the MAC layer of the UE or the MgNB (at step 2e-60). Thereafter, the PDCP PDU1 at step 2e-75 and the PDCP PDU2 at step 2e-80 through the RLC1 and RLC2 at steps 2e-65 and 2e-70 are gathered to the PDCP of the UE or the MgNB, and the PDCP at step 2e-85 identifies SNs of the received original packet and the duplicated packet, and if the same packets arrive, it discards one of them to transfer the other to the upper layer (at step 2e-90).

Figure 2F:
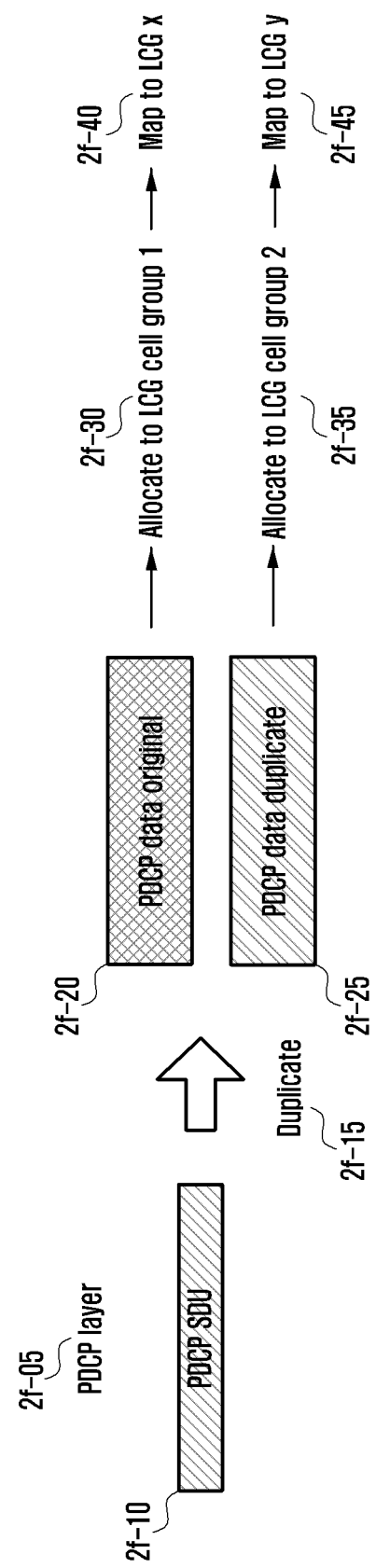
FIG. 2F is a diagram of a first data packet duplicate transmission operation, according to an embodiment.

FIG. 2F is a diagram of a first data packet duplicate transmission operation, according to an embodiment.

A PDCP layer at step 2f-05 determines whether to duplicate a corresponding data packet (PDCP SDU) at steps 2f-10 (2f-15), and if the duplicate is necessary, it configures the original (PDCP PDU1) at step 2f-20 and a duplicate (PDCP PDU2) at step 2f-25 with respect to the corresponding data packet to transfer them to a lower layer. As described above, since a resource should not be allocated so that all data are transmitted from one MAC PDU, the duplicated data packet should be transmitted from the MAC PDU on different carriers or on different time resources.

The first data packet duplicate transmission operation is a method to map the PDCP data to be duplicated to different LCGs from the original PDCP data packet (one PDCP entity is mapped to two LCGs). That is, if the PDCP data duplication is applied, a set of cells to which initially transmitted data and duplicated data can be transmitted is newly defined and applied. As the set of the cells, LCG cell group 1 at step 2f-30 and LCG cell group 2 at step 2f-35 are used. That is, if initial transmission of a certain PDCP PDU is performed through the LCG cell group 1, the transmission of the duplicated PDCP PDU is performed through the LCG cell group 2. The LCG cell groups may be respectively mapped to specific LCG x at step 2f-40 and LDB y at step 2f-45. The greatest feature of the first data packet duplicate transmission operation is to map the original to LCG x and to map the duplicate to LCG y even in case of one piece of PDCP data.

Figure 2G:
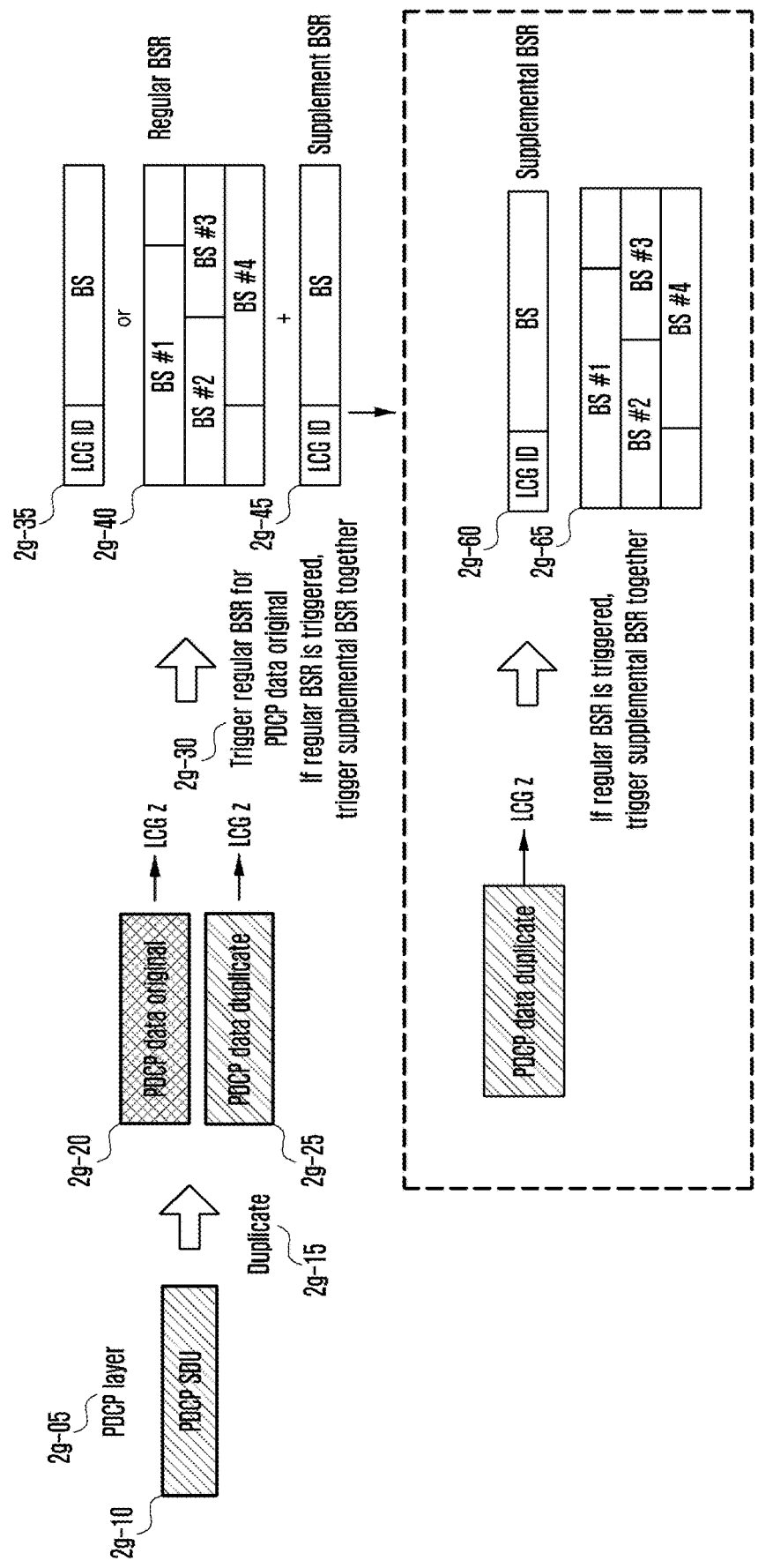
FIG. 2G is a diagram of a first data packet duplicate transmission operation, according to an embodiment.

FIG. 2G is a diagram of a second data packet duplicate transmission operation proposed, according to an embodiment.

A PDCP layer at step 2g-05 determines whether to duplicate a corresponding data packet (PDCP SDU) at step 2g-10 (and/or at step 2g-15), and if the duplicate is necessary, it configures the original (PDCP PDU1) at step 2g-20 and a duplicate (PDCP PDU2) at step 2g-25 with respect to the corresponding data packet to transfer them to a lower layer. As described above, since a resource should not be allocated so that all data are transmitted from one MAC PDU, the duplicated data packet should be transmitted from the MAC PDU on different carriers or on different time resources.

If a PDCP entity to which duplication is to be applied is mapped to one LCG, that is, if the original PDCP data and the duplicated PDCP data are mapped to the same LCG, the resources should be allocated differently so as to be transmitted from different MAC PDUs. If a duplicated PDCP PDU (PDCP PDU of which duplicate transmission has not yet started, but duplicate transmission should be performed) exists when regular buffer status reports (BSRs) at steps 2g-35 and 2g-40 for the original PDCP data are triggered, a supplemental BSR that is a new BSR is triggered together (at step 2g-30). The supplemental BSR is to report the amount of PDCP data only to be duplicated and transmitted, and is composed of an LCG ID and a buffer size (BS) (at step 2g-45). The supplemental BSR may have formats of the existing short regular BSR and long regular BSR (at steps 2g-60 and 2g-65). Further, if the supplemental BSR is included in the MAC PDU, the corresponding indicator is included in a MAC subheader. For example, the following situations shown in Table 4 below may be considered.

TABLE 4

| | Situation | Operation |
|---|---|---|
| Situation 1 | Original and duplicate data packets are mapped to LCG 1. Original packet: SRB 1 Duplicate packet: SRB 1 (same packet duplication) | Supplemental BSR having the same format and size as those of short regular BSR is generated. |
| Situation 2 | Original and duplicate data packets are mapped to LCG 1. Original packet: SRB 1, SRB 2 Duplicate packet: SRB 2 (partial packet duplication) | Supplemental BSR including SRB 2 size information is generated. |
| Situation 3 | Original and duplicate data packets are mapped to LCG 1. Original packet: SRB1, SRB 2, SRB 3 Duplicate packet: SRB 1, SRB 2, SRB 3 (whole packet duplication) | Supplemental BSR having the same format and size as those of long regular BSR is generated. |

Figure 2H:
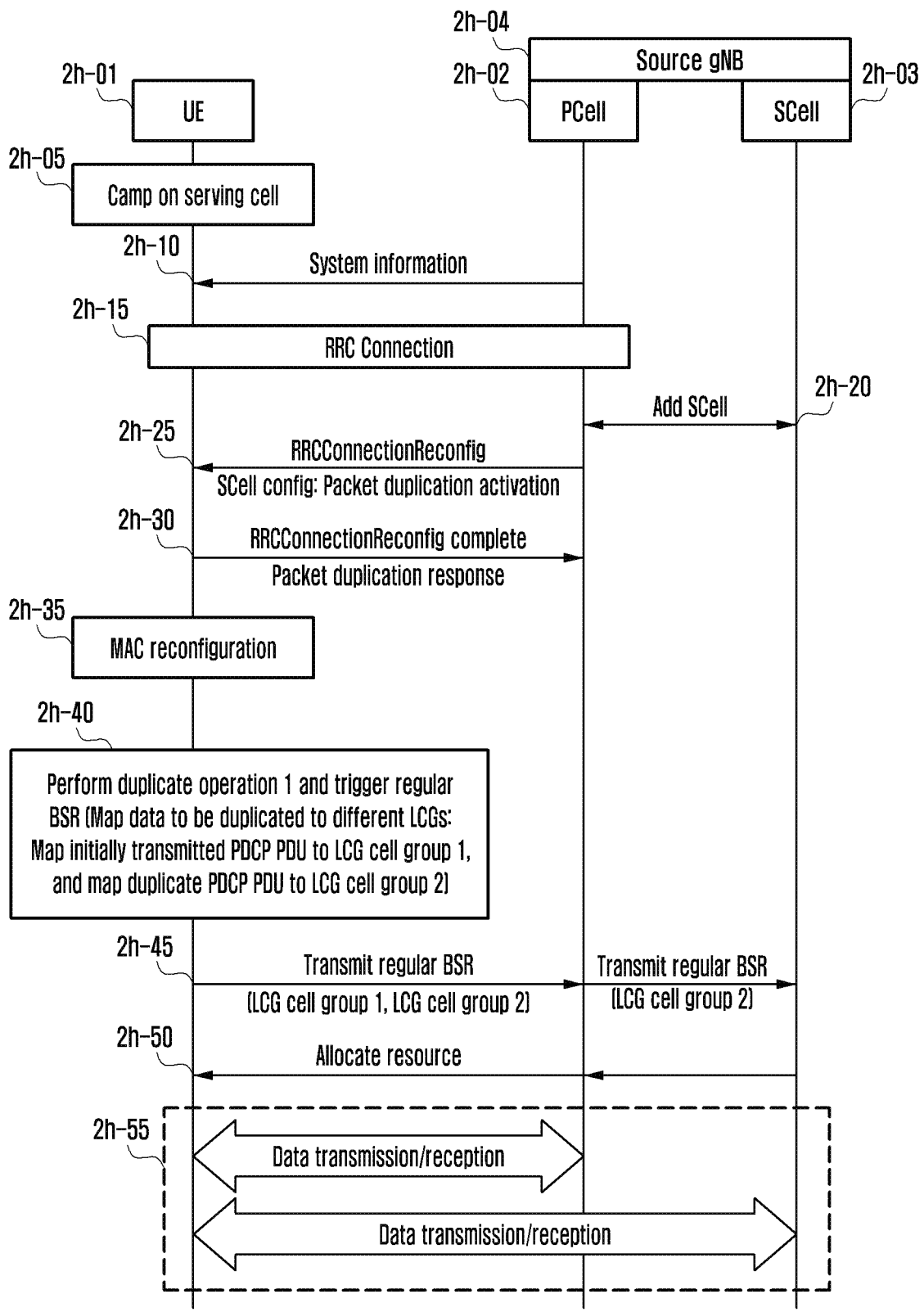
FIG. 2H is flowchart of a method to which a first data packet duplicate transmission operation is applied, according to an embodiment.

FIG. 2H is a diagram of an operation to which a first data packet duplicate transmission operation is applied, according to an embodiment.

UE 2h-01 in an idle mode (RRC IDLE) searches for a suitable cell and camps on a corresponding serving cell 2h-02 (at step 2h-05), and receives system information from the serving cell 2h-02 (at step 2h-10). In the idle mode, the UE 2h-01 is not connected to a network for power saving, and thus is unable to transmit data. For data transmission, the UE 2h-01 is required to be shifted to a connected mode (RRC CONNECTED) (at step 2h-15). Further, the term camps on is defined as the UE staying in the corresponding cell to receive a paging message in order to determine whether data comes on a downlink.

PCell 2h-02 of the serving eNB 2h-04 adds SCell 2h-03 (at step 2h-20), and transfers to the UE 2h-01 an RRCConnectionReconfiguration message containing bearer configuration information on the SCell 2h-03 and packet duplicate activation information (at step 2h-25). Although is omitted in the drawing, the method for the serving eNB 2h-04 to add the SCell 2h-03 becomes possible depending on whether URLLC data is generated (capability or URLLC request) from the UE 2h-01. Further, the UE 2h-01 may report a measurement value of a downlink signal strength of a neighbor cell to the PCell 2h-02 of the serving eNB 2h-04. The SCell 2h-03 is a bearer configured for the URLLC transmission, and is generated by configuring an additional LCG cell group and a corresponding serving cell through the RRCConnectionReconfiguration message. The UE 2h-01 transmits an RRC ConnectionReconfigurationComplete message containing an identification message with respect to the SCell 2h-03 configuration for the URLLC (at step 2h-30), and reconfigures the MAC through addition of the SCell 2h-03 for the URLLC in accordance with the configured value (at step 2h-35).

If data is generated in the URLLC mode, the first data packet duplicate transmission operation as described above with reference to FIG. 2F is performed. That is, the data to be duplicated is mapped to different LCGs (the initially transmitted PDCP PDU is mapped to LCG cell group 1, and the duplicate PDCP PDU is mapped to LCG cell group 2).

At the above-described operation, the MAC makes the original data packet and the duplicated data packet mapped to different LCGs, and thereafter, triggers the regular BSR in accordance with the respective LCGs (at step 2h-40). At step 2h-45, the UE 2h-01 transfers the regular BSR mapped to the different LCGs to the serving eNB 2h-04. For example, the BSR signals may be transmitted through the PCell 2h-02, or may be respectively transmitted through the PCell 2h-02 and the SCell 2h-03.

The serving eNB 2h-04 allocates resources based on the regular BSR received from the UE 2h-01, and the UE 2h-01 transmits or receives data through the allocated resources (at step 2h-55). The serving eNB 2h-04 can know the original data and the duplicated data through an LCG ID included in the regular BSR, and through this information, it can allocate independent resources to the UE 2h-01 through the respective carrier aggregations with respect to the original and the duplicate data.

Figure 2I:
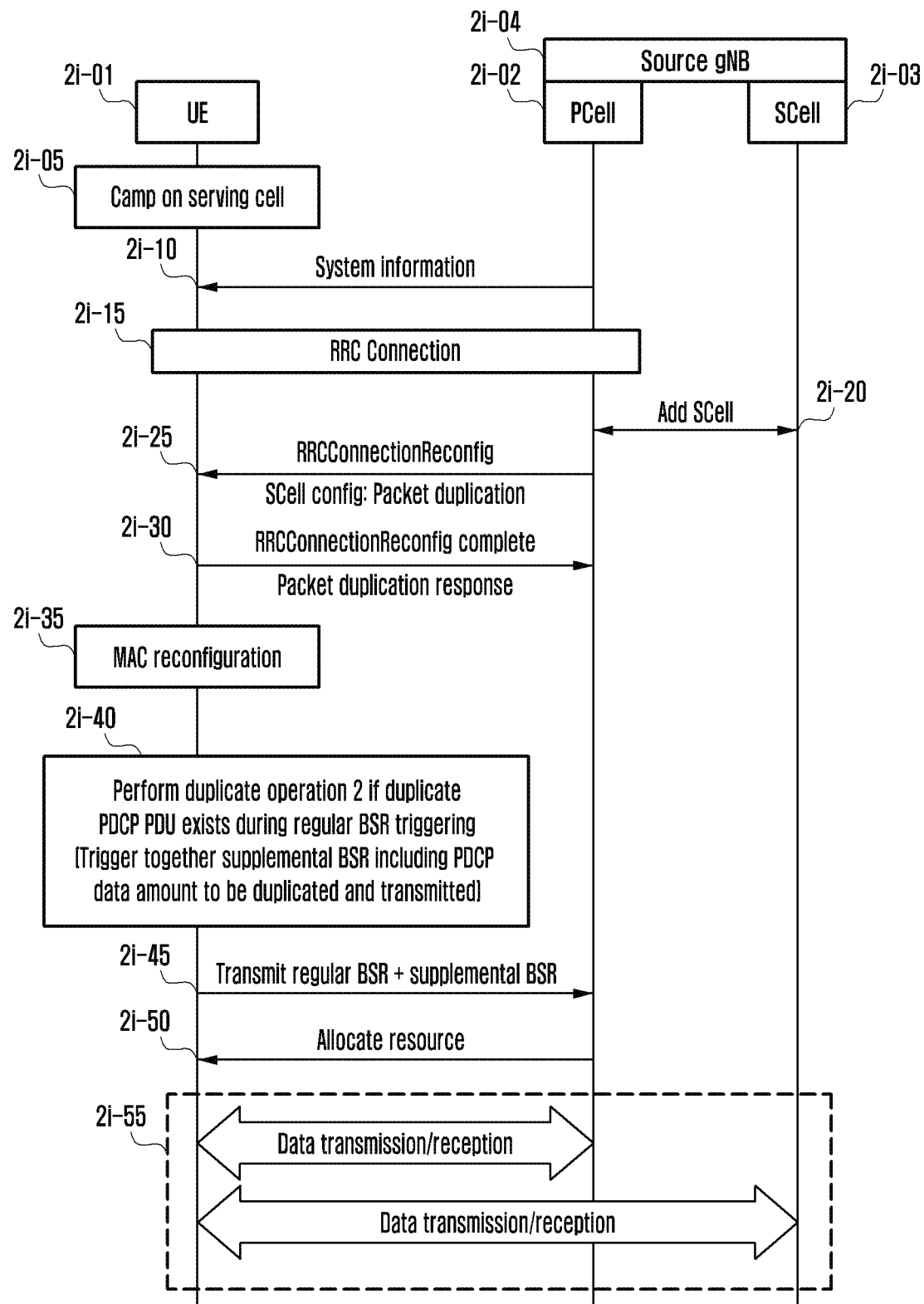
FIG. 2I is a flowchart of a method which a second data packet duplicate transmission operation, according to an embodiment.

FIG. 2I is a diagram of an overall operation to which a second data packet duplicate transmission operation is applied, according to an embodiment.

UE 2i-01 in an idle mode (RRC_IDLE) searches for a suitable cell and camps on a corresponding serving cell 2i-02 (at step 2i-05), and receives system information from the serving cell 2i-02 (at step 2i-10). In the idle mode, the UE 2i-01 is not connected to a network for power saving, and thus is unable to transmit data. For data transmission, the UE 2i-01 is required to be shifted to a connected mode (RRC CONNECTED) (2i-15).

PCell 2i-02 of the serving eNB 2i-04 adds SCell 2i-03 (at step 2i-20), and transfers to the UE 2i-01 an RRCConnectionReconfiguration message containing bearer configuration information on the SCell 2i-03 and packet duplicate activation information (at step 2i-25). It is noted that the method for the serving eNB 2i-04 to add the SCell 2i-03 becomes possible depending on whether URLLC data is generated (capability or URLLC request) from the UE 2i-01. Further, the UE 2i-01 may report a measurement value of a downlink signal strength of a neighbor cell to the PCell 2i-02 of the serving eNB 2i-04. The SCell 2i-03 is a bearer configured for the URLLC transmission, and is generated by configuring an additional LCG cell group and a corresponding serving cell through the RRCConnectionReconfiguration message. The UE transmits an RRCConnectionReconfigurationComplete message containing an identification message with respect to the SCell 2i-03 configuration for the URLLC and packet duplicate activation information (at step 2i-30), and reconfigures the MAC through addition of the SCell 2i-03 for the URLLC in accordance with the configured value (at step 2i-35).

If data is generated in the URLLC mode, the regular BSR is triggered, and if a duplicated PDCP PDU (PDCP PDU of which duplicate transmission has not yet started, but duplicate transmission should be performed) exists when the regular BSR for the original PDCP data is triggered, a supplemental BSR that is a new BSR is triggered together. The second data packet duplicate transmission operation as described above with reference to FIG. 2G is performed. At the above-described operation, the MAC triggers together the supplemental BSR including the amount of PDCP data to be duplicated and transmitted (at step 2i-40).

At step 2i-45, the UE 2i-01 transfers the generated regular BSR and supplemental BSR to the corresponding serving eNB 2i-04. For example, the BSR signals may be transmitted through the PCell 2i-02, or may be respectively transmitted through the PCell 2i-02 and the SCell 2i-03. The serving eNB 2i-04 allocates resources based on the regular BSR and the supplemental BSR received from the UE 2i-01, and the UE 2i-01 transmits or receives data through the allocated resources (at step 2i-55). The serving eNB 2i-04 can know what data is the original data or the duplicated data through reception of the regular BSR and the supplemental BSR, and through this information, it can allocate independent resources to the UE 2i-01 through the respective carrier aggregations with respect to the original and the duplicate data.

Figure 2J:
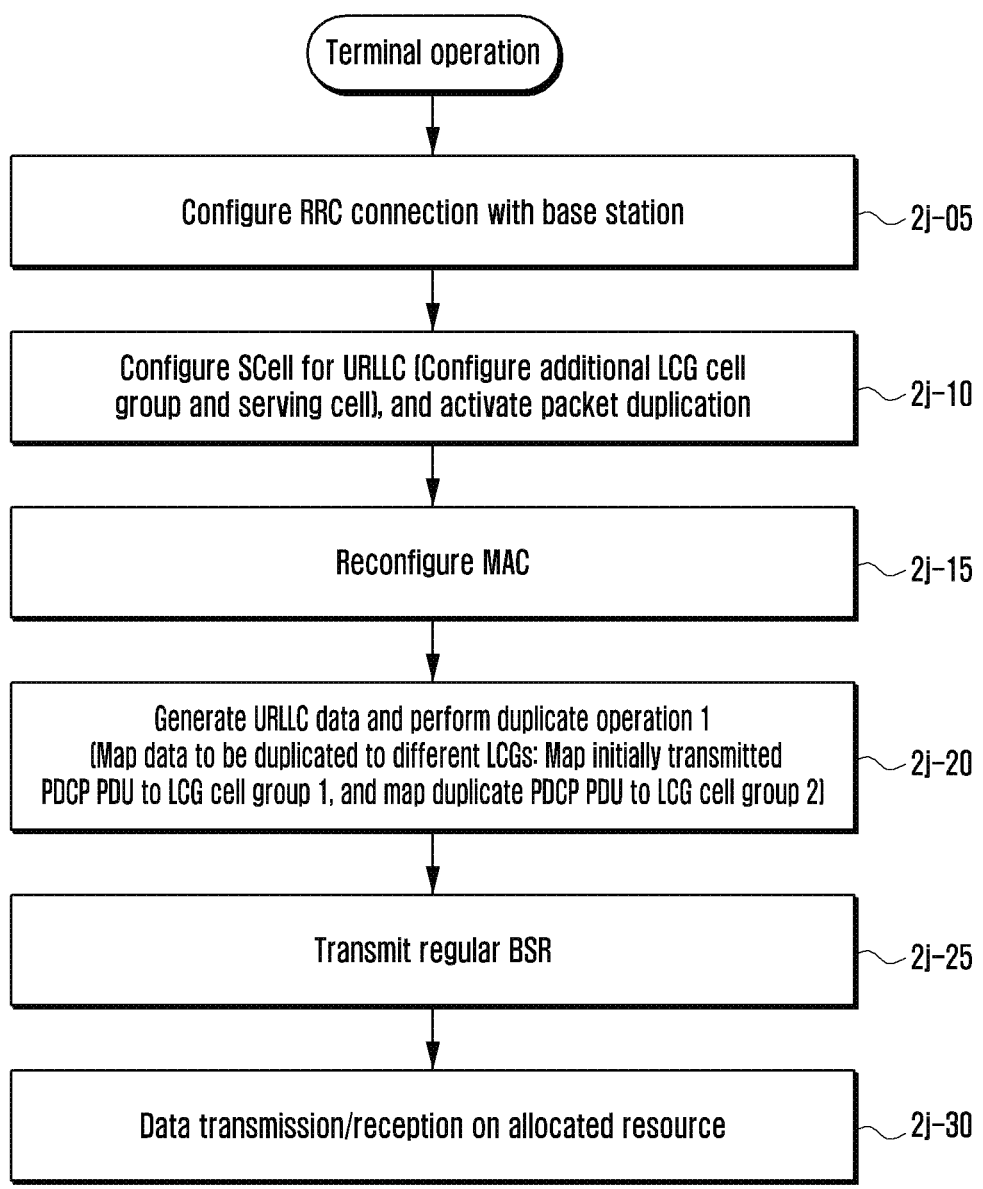
FIG. 2J is a flowchart of a method a first data packet duplicate transmission operation of a terminal, according to an embodiment.

FIG. 2J is a diagram of a first data packet duplicate transmission operation of a terminal, according to an embodiment.

A UE configures a connection with an eNB for data transmission/reception (at step 2j-05), and receives an RRC message containing SCell configuration for URLLC from the eNB. The SCell bearer is a bearer configured for the URLLC transmission, and an additional LCG cell group and a corresponding serving cell may be configured by the RRC message (at step 2j-10). Further, the UE receives indication information on packet duplicate function activation from the eNB. The UE having received the configuration from the eNB reconfigures the MAC in accordance with the configuration value (at step 2j-15), and performs URLLC data generation and a first data packet duplicate transmission operation. That is, the data to be duplicated is mapped to different LCGs (the initially transmitted PDCP PDU is mapped to LCG cell group 1, and the duplicate PDCP PDU is mapped to LCG cell group 2). At the above-described operation, the MAC makes the original data packet and the duplicated data packet mapped to different LCGs, and thereafter, triggers the regular BSR in accordance with the respective LCGs (at step 2j-20). Thereafter, the UE transfers the generated regular BSR to the eNB (at step 2j-25), and performs data transmission/reception through carrier aggregation with the resource allocated from the eNB (at step 2j-30). At the above-described operation, the UE may transmit the original data packet and the duplicate data packet through different carrier components (e.g., PCell and SCell). The serving eNB knows what data is the original data or the duplicated data through an LCG ID included in the regular BSR, and through the LCG ID, it can allocate independent resources to the UE through the respective carrier aggregations with respect to the original and the duplicate data.

Figure 2K:
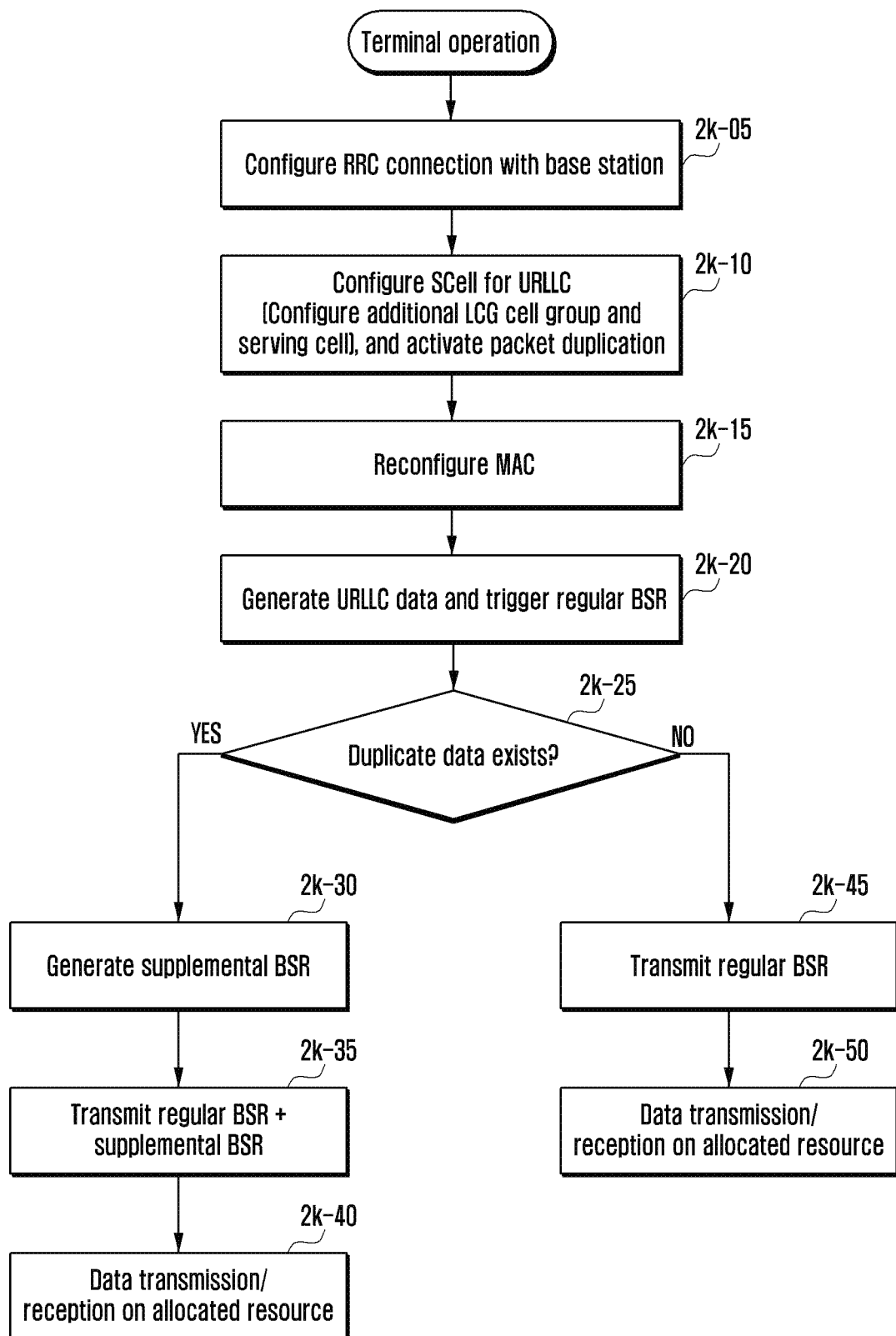
FIG. 2K is a flowchart of a method of a second data packet duplicate transmission operation of a terminal, according to an embodiment.

FIG. 2K is a diagram of a second data packet duplicate transmission operation of a terminal, according to an embodiment.

A UE configures a connection with an eNB for data transmission/reception (at step 2k-05), and receives an RRC message containing SCell configuration for URLLC from the eNB. The SCell bearer is a bearer configured for the URLLC transmission, and an additional LCG cell group and a corresponding serving cell may be configured by the RRC message (at step 2k-10). Further, the UE receives indication information on packet duplicate function activation from the eNB. The UE having received the configuration from the eNB reconfigures the MAC in accordance with the configuration value (at step 2k-15), generates URLLC data, and triggers regular BSR (at step 2k-20). That is, if data is generated in the URLLC mode, the regular BSR is triggered, and it is identified whether a duplicated PDCP PDU (PDCP PDU of which duplicate transmission has not yet started, but duplicate transmission should be performed) exists when the regular BSR for the original PDCP data is triggered (at step 2k-25).

If the duplicated PDCP PDU exists when the regular BSR for the original PDCP data is triggered, a supplemental BSR for the BSR of the duplicated data packet is generated and triggered together (at step 2k-30). Thereafter, the UE transmits the regular BSR and the supplemental BSR to the serving eNB together (at step 2k-35), and is allocated with the corresponding resource. The serving eNB knows what data is the original data or the duplicated data and what sizes are necessary through reception of the regular BSR and the supplemental BSR, and through this information, it can allocate independent resources to the UE through the respective carrier aggregations with respect to the original and the duplicate data. The terminal transmits the original data packet and the duplicate data packet through different carrier components (e.g., PCell and SCell) through the allocated resources.

If the duplicated PDCP PDU does not exist when the regular BSR for the original PDCP data is triggered, the packet duplication is not used, and in this case, the regular BSR for the original data packet is transferred to the eNB, and the corresponding resource is allocated (at step 2k-45). The terminal transmits the original data packet through the PCell through the allocated resource (at step 2k-50).

Figure 2L:
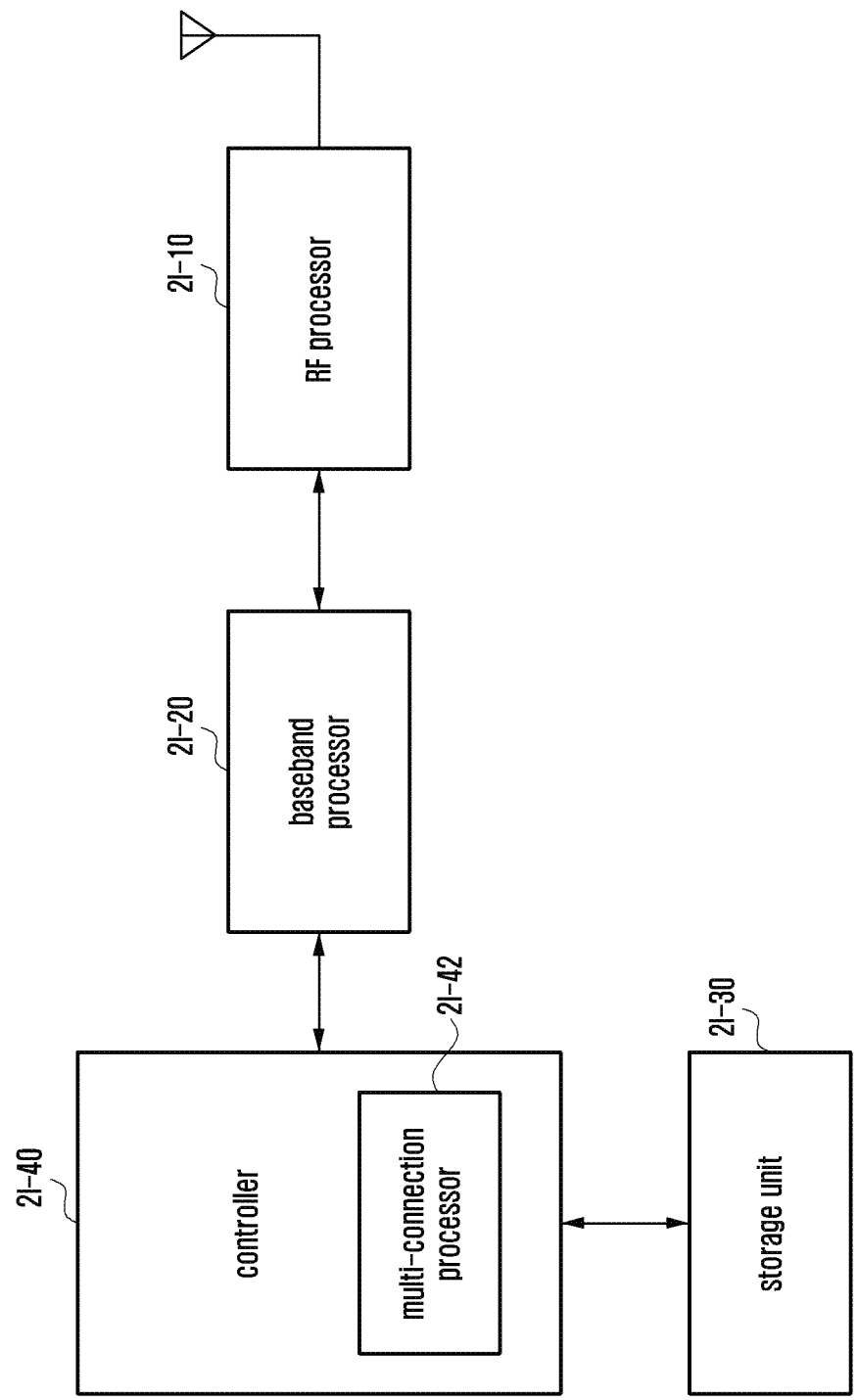
FIG. 2L is a diagram of a terminal, according to an embodiment.

FIG. 2L is a diagram of a terminal, according to an embodiment.

The terminal includes an RF processor 2l-10, a baseband processor 2l-20, a storage unit 2l-30, and a controller 2l-40.

The RF processor 2l-10 transmits and receives a signal through a radio channel, such as signal band conversion and amplification. The RF processor 2l-10 performs up-conversion of a baseband signal provided from the baseband processor 2l-20 into an RF-band signal to transmit the converted signal to an antenna, and performs down-conversion of the RF-band signal received through the antenna into a baseband signal. The RF processor 2l-10 may include a transmission filter, a reception filter, an amplifier, a mixer, an oscillator, a DAC, and an ADC. Although only one antenna is illustrated, the terminal may be provided with a plurality of antennas. The RF processor 2l-10 may include a plurality of RF chains. Further, the RF processor 2l-10 may perform beamforming. For the beamforming, the RF processor 2l-10 may adjust phases and sizes of signals transmitted or received through the plurality of antennas or antenna elements. Further, the RF processor may perform MIMO, and may receive several layers during performing of a MIMO operation.

The baseband processor 2l-20 performs conversion between a baseband signal and a bit string in accordance with the physical layer standard of the system. During data transmission, the baseband processor 2l-20 generates complex symbols by encoding and modulating a transmitted bit string. During data reception, the baseband processor 2l-20 restores a received bit string by demodulating and decoding the baseband signal provided from the RF processor 2l-10. For example, when following an OFDM method, during data transmission, the baseband processor 2l-20 generates complex symbols by encoding and modulating a transmitted bit string, performs mapping of the complex symbols on subcarriers, and then configures OFDM symbols through the IFFT operation and CP insertion. During data reception, the baseband processor 2l-20 divides the baseband signal provided from the RF processor 2l-10 in the unit of OFDM symbols, restores the signals mapped on the subcarriers through the FFT operation, and then restores the received bit string through demodulation and decoding.

The baseband processor 2l-20 and the RF processor 2l-10 transmit and receive the signals as described above. The baseband processor 2l-20 and the RF processor 2l-10 may be called a transmitter, a receiver, a transceiver, or a communication unit. In order to support different radio connection technologies, at least one of the baseband processor 2l-20 and the RF processor 2l-10 may include a plurality of communication modules. In order to process signals of different frequency bands, at least one of the baseband processor 2l-20 and the RF processor 2l-10 may include different communication modules. For example, the different radio connection technologies may include a wireless LAN (e.g., IEEE 802.11) and a cellular network (e.g., LTE). Further, the different frequency bands may include SHF (e.g., 2. NRHz or NRHz) band and millimeter wave (mm-Wave) (e.g., 60 GHz) band.

The storage unit 2l-30 stores a basic program for an operation of the terminal, application programs, and data of setup information. In particular, the storage unit 2l-30 may store information related to a connection node for performing wireless communication using a second wireless connection technology. The storage unit 2l-30 provides stored data in accordance with a request from the controller 2l-40.

The controller 2l-40 controls the operation of the terminal. For example, the controller 2l-40 transmits and receives signals through the baseband processor 2l-20 and the RF processor 2l-10. The controller 2l-40 records or reads data in or from the storage unit 2l-30. The controller 2l-40 may include at least one processor. The controller 2l-40 may include a communication processor performing a control for communication and an AP controlling an upper layer, such as an application program. The controller 2l-40 may include a multi-connection processor 2l-42 for performing a process to operate in a multi-connection mode.

Figure 2M:
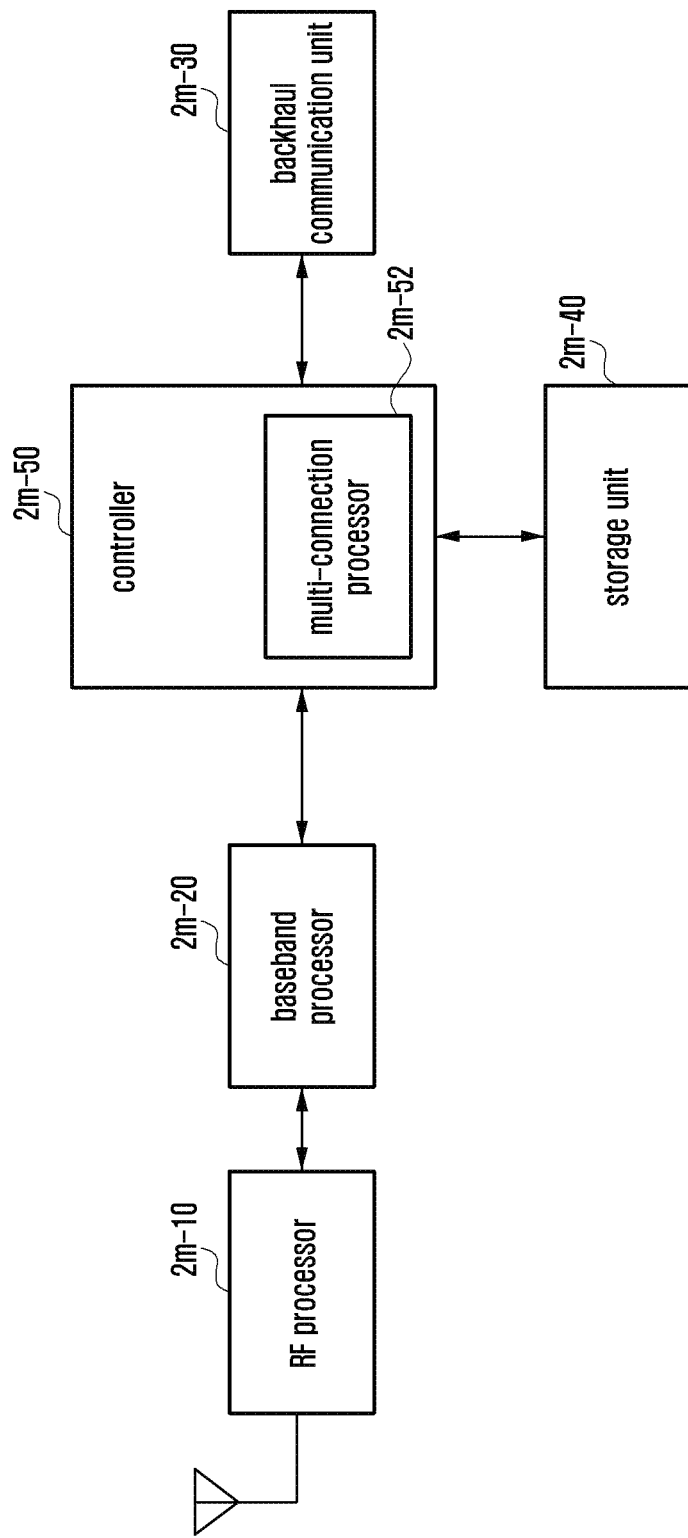
FIG. 2M is a diagram of a base station, according to an embodiment.

FIG. 2M is a block diagram of a base station, according to an embodiment.

The base station includes an RF processor 2m-10, a baseband processor 2m-20, a backhaul communication unit 2m-30, a storage unit 2m-40, and a controller 2m-50.

The RF processor 2m-10 transmits and receives a signal through a radio channel, such as signal band conversion and amplification. The RF processor 2m-10 performs up-conversion of a baseband signal provided from the baseband processor 2m-20 into an RF-band signal to transmit the converted signal to an antenna, and performs down-conversion of the RF-band signal received through the antenna into a baseband signal. The RF processor 2m-10 may include a transmission filter, a reception filter, an amplifier, a mixer, an oscillator, a DAC, and an ADC. Although only one antenna is illustrated, the base station may be provided with a plurality of antennas. The RF processor 2m-10 may include a plurality of RF chains. The RF processor 2m-10 may perform beamforming. For the beamforming, the RF processor 2m-10 may adjust phases and sizes of signals transmitted or received through the plurality of antennas or antenna elements. The RF processor may perform down MIMO operation through transmission of one or more layers.

The baseband processor 2m-20 performs conversion between a baseband signal and a bit string in accordance with the physical layer standard of the first radio connection technology. During data transmission, the baseband processor 2m-20 generates complex symbols by encoding and modulating a transmitted bit string. During data reception, the baseband processor 2m-20 restores a received bit string by demodulating and decoding the baseband signal provided from the RF processor 2m-10. For example, when following an OFDM method, during data transmission, the baseband processor 2m-20 generates complex symbols by encoding and modulating a transmitted bit string, performs mapping of the complex symbols on subcarriers, and then configures OFDM symbols through the IFFT operation and CP insertion. During data reception, the baseband processor 2m-20 divides the baseband signal provided from the RF processor 2m-10 in the unit of OFDM symbols, restores the signals mapped on the subcarriers through the FFT operation, and then restores the received bit string through demodulation and decoding. The baseband processor 2m-20 and the RF processor 2m-10 transmit and receive the signals as described above. Accordingly, the baseband processor 2m-20 and the RF processor 2m-10 may be called a transmitter, a receiver, a transceiver, or a wireless communication unit. The backhaul communication unit 2m-30 provides an interface for performing communication with other nodes in the network. The backhaul communication unit 2m-30 converts a bit string transmitted from the eNB to another node, for example, an auxiliary base station or a core network, into a physical signal, and converts a physical signal received from another node into a bit string.

The storage unit 2m-40 stores a basic program for an operation of the main base station, application programs, and data of setup information. In particular, the storage unit 2m-40 may store information on a bearer allocated to the connected terminal and the measurement result reported from the connected terminal. The storage unit 2m-40 may store information that becomes a basis of determination whether to provide or suspend a multi-connection to the terminal. The storage unit 2m-40 provides stored data in accordance with a request from the controller 2m-50. The controller 2m-50 controls the operation of the base station. For example, the controller 2m-50 transmits and receives signals through the baseband processor 2m-20 and the RF processor 2m-10 or through the backhaul communication unit 2m-30. The controller 2m-50 records or reads data in or from the storage unit 2m-40. The controller 2m-50 may include at least one processor. According to an embodiment, the controller 2m-50 may include a multi-connection processor 2m-52 for performing a process to operate in a multi-connection mode.

Figure 3A:
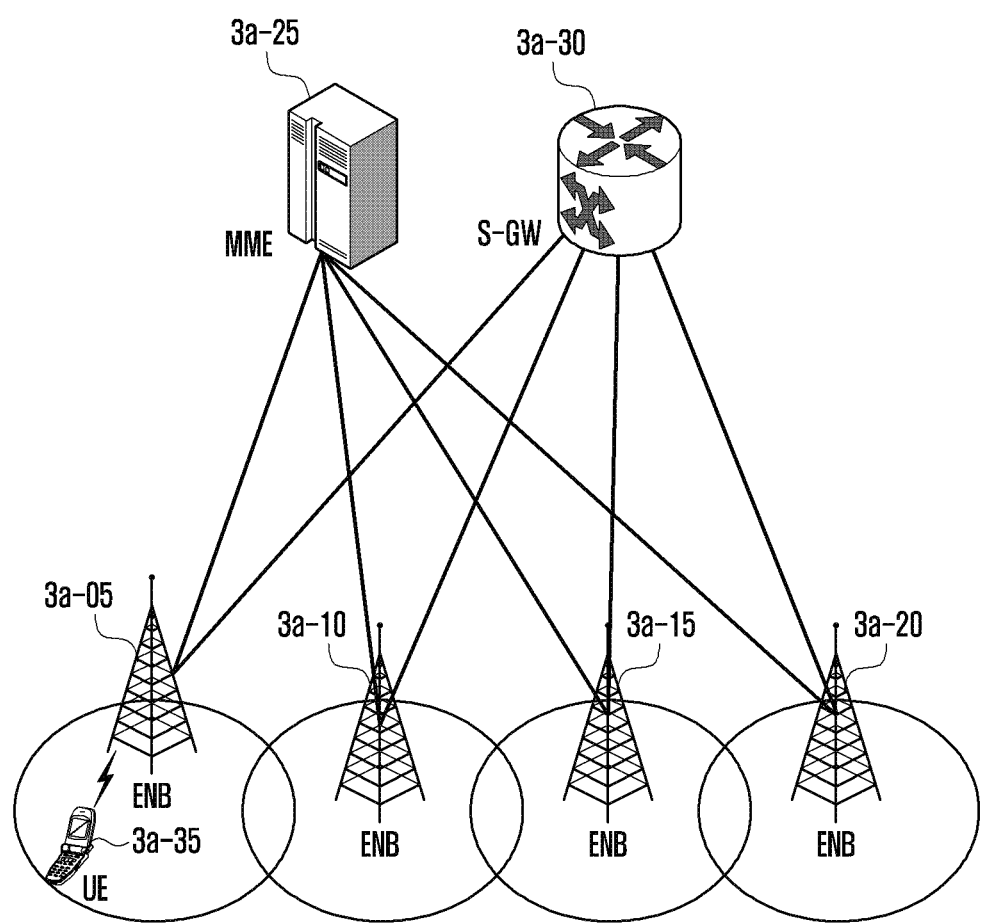
FIG. 3A is a diagram of an LTE system, according to an embodiment.

FIG. 3A is a diagram of an LTE system, according to an embodiment.

Referring to FIG. 3A, a RAT of an LTE system is composed of eNBs, node Bs, or base stations) 3a-05, 3a-10, 3a-15, and 3a-20, a MME 3a-25, and an S-GW 3a-30. UE or terminal 3a-35 accesses to an external network through the eNBs 3a-05 to 3a-20 and the S-GW 3a-30.

In FIG. 3A, the eNBs 3a-05 to 3a-20 correspond to existing node Bs of a UMTS system. The eNBs are connected to the UE 3a-35 on a radio channel, and play a more complicated role than that of the existing node B. In the LTE system, since all user traffics including a real-time service, such as a VoIP through an internet protocol, are serviced on shared channels, devices performing scheduling through summarization of state information, such as a buffer state, an available transmission power state, and a channel state of each UE, are necessary, and the eNBs 3a-05 to 3a-20 take charge of this. In general, one eNB controls a plurality of cells. For example, in order to implement a transmission speed of 100 Mbps, the LTE system uses, for example, OFDM in a bandwidth of 20 MHz as a RAT. Further, the LTE system adopts an AMC scheme that determines a modulation scheme and a channel coding rate to match the channel state of the terminal. The S-GW 3a-30 is a device that provides a data bearer, and generates or removes the data bearer under the control of the MME 3a-25. The MME is a device that controls not only mobility management of the terminal but also various kinds of control functions, and is connected to the plurality of eNBs.

Figure 3B:
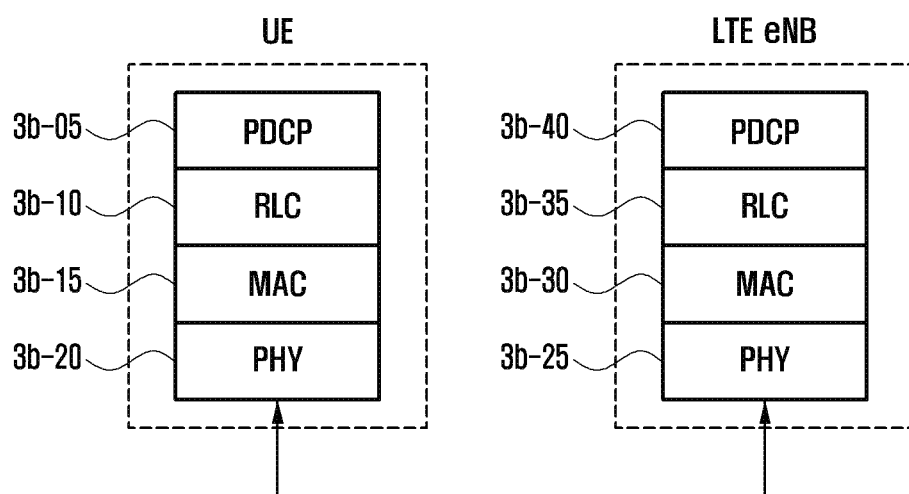
FIG. 3B is a diagram of a radio protocol structure of an LTE system, according to an embodiment.

FIG. 3B is a diagram of a radio protocol structure in an LTE system, according to an embodiment.

Referring to FIG. 3B, in a UE or an eNB, a radio protocol of an LTE system is composed of a PDCP 3b-05 or 3b-40, a RLC 3b-10 or 3b-35, and a MAC 3b-15 or 3b-30. The PDCP 3b-05 or 3b-40 controls IP header compression/decompression operations. The main functions of the PDCP are summarized as follows:

Header compression and decompression: ROHC only;
Transfer of user data;
In-sequence delivery of upper layer PDUs at a PDCP reestablishment procedure for an RLC AM;
For split bearers in DC (only support for an RLC AM): PDCP PDU routing for transmission and PDCP PDU reordering for reception;
Duplicate detection of lower layer SDUs at a PDCP reestablishment procedure for an RLC AM;
Retransmission of PDCP SDUs at handover and, for split bearers in DC, of PDCP PDUs at a PDCP data-recovery procedure, for an RLC AM;
Ciphering and deciphering; and
Timer-based SDU discard in an uplink.

The RLC 3b-10 or 3b-35 reconfigures a PDCP PDU with a proper size and performs an ARQ operation and the like. The main functions of the RLC are summarized as follows:

Transfer of upper layer PDUs;
Error correction through an ARQ (only for AM data transfer);
Concatenation, segmentation, and reassembly of RLC SDUs (only for UM and AM data transfer);
Re-segmentation of RLC data PDUs (only for AM data transfer);
Reordering of RLC data PDUs (only for UM and AM data transfer);
Duplicate detection (only for UM and AM data transfer);
Protocol error detection (only for AM data transfer);
RLC SDU discard (only for UM and AM transfer); and
RLC reestablishment.

The MAC 3b-15 or 3b-30 is connected to several RLC layer devices configured in one terminal, and performs multiplexing/demultiplexing of RLC PDUs into/from MAC PDU. The main functions of the MAC are summarized as follows:

Mapping between logical channels and transport channels;
Multiplexing/demultiplexing of MAC SDUs belonging to one or different logical channels into/from transport blocks (TB) delivered to/from the physical layer on transport channels;
Scheduling information reporting;
HARQ function (error correction through HARQ);
Priority handling between logical channels of one UE;
Priority handling between UEs by means of dynamic scheduling;
MBMS service identification;
Transport format selection; and
Padding.

The physical layer 3b-20 or 3b-25 performs channel coding and modulation of upper layer data to configure and transmit OFDM symbols on a radio channel, or performs demodulation and channel decoding of the OFDM symbols received on the radio channel to transfer the demodulated and channel-decoded symbols to an upper layer.

Figure 3C:
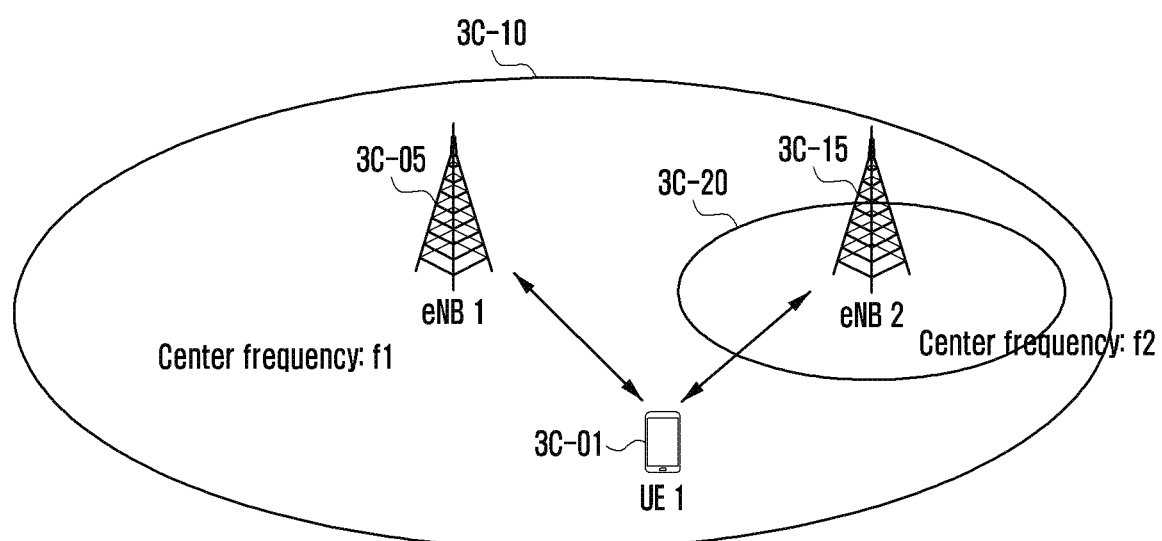
FIGS. 3CA and 3CB are diagrams of multi-connection and carrier aggregation operations of an existing LTE system, according to an embodiment.
Figure 3C:
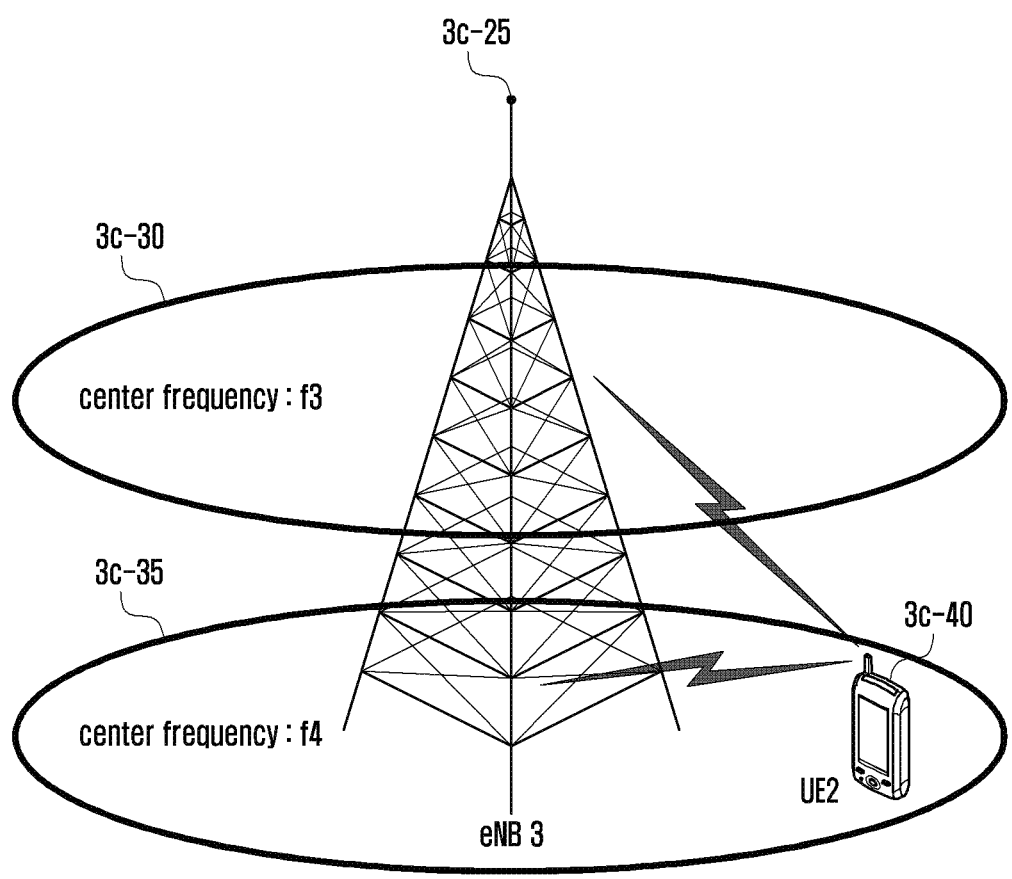

FIGS. 3CA and 3CB are diagrams of multi-connection and carrier aggregation operations of an existing LTE system, according to an embodiment.

Referring to FIGS. 3CA and 3CB, when eNB 1 3c-05 transmits/receives a carrier having a center frequency of f1, and eNB 2 3c-15 transmits/receives a carrier having a center frequency of f2, one UE 3c-01 may perform transmission/reception with two or more eNBs through combination of a carrier having a forward center frequency of f1 and a carrier having a forward center frequency of f2. In an LTE system, the above-described operation is supported, and is referred to as DC.

The one eNB can transmit and receive multi-carriers over several frequency bands. For example, if a carrier 3c-30 having a forward center frequency of f3 and a carrier 3c-35 having a forward center frequency of f4 are transmitted from eNB 3 3c-25, in the related art, one UE 2 3c-40 transmits/receives data using one of the two carriers. However, the UE 2 having a CA capability can simultaneously transmit/receive data through several carriers. The eNB 3 3c-35 may allocate more carriers to the UE 2 3c-40 having the CA capability according to circumstances to heighten the transmission speed of the UE 2 3c-40. As described above, aggregation of forward carriers and backward carriers transmitted and received by one eNB is referred to as intra-eNB CA. Traditionally, if it is assumed that one forward carrier transmitted by one eNB and one backward carrier received by the eNB constitute one cell, it may be understood that the CA is for the UE to transmit/receive data simultaneously through several cells. Through this, the maximum transmission speed is increased in proportion to the number of carriers being aggregated.

Reception of data by the UE through a certain forward carrier or transmission of data by the UE through a certain uplink carrier has the same meaning as transmission/reception of data using a control channel and a data channel provided from a cell corresponding to the center frequency and the frequency band featuring the carrier. A set of serving cells being controlled by the same eNB is defined as a CG. The cell group is divided into a MCG and a SCG. The MCG includes a set of serving cells being controlled by the eNB (master eNB (MeNB)) controlling a primary cell (PCell), and the SCG includes a set of serving cells being controlled by the eNB that is not the eNB controlling the PCell, in other words, being controlled by the eNB (secondary eNB (SeNB)) controlling only secondary cells (SCells). The eNB notifies the UE whether a specific serving cell belongs to the MCG or the SCG in the process of configuring the corresponding serving cell.

The PCell and SCell are terms representing the kind of serving cell configured in the UE. There are differences between the PCell and SCell, and for example, the PCell always maintains an active state, but the SCell repeats an active state and an inactive state in accordance with the indication of the eNB. The terminal mobility is controlled around the PCell, and it may be understood that the SCell is an additional serving cell for data transmission/reception. The PCell and the SCell are defined in the LTE standards 36.331 or 36.321. The terms have the same meanings as those used in an LTE mobile communication system. The terms carrier, component carrier, and serving cell are used interchangeably.

Referring again to FIGS. 3CA and 3CB, if eNB 1 3c-05 is MeNB and eNB 2 3c-15 is SeNB, a serving cell 3c-10 having a center frequency of f1 is a serving cell belonging to the MCG, and a serving cell 3c-20 having a center frequency of f2 is a serving cell belonging to the SCG. It may be difficult to transmit HARQ feedback of SCG SCells and CSI through a physical uplink control channel (PUCCH) of a PCell. The HARQ feedback should be transferred within an HARQ RTT (normally, 8 ms), and this is because the transmission delay between the MeNB and the SeNB may be longer than the HARQ RTT. Thus, a PUCCH transmission resource is configured in one of SCells belonging to the SCG, that is, in a primary SCell (PSCell), the HARQ feedback of the SCG SCells and the CSI are transmitted through the PUCCH.

In a CA in a normal eNB 3 3c-25, UE 2 3c-40 transmits through the PUCCH of the PCell not only the HARQ feedback of the PCell and the CSI but also the HARQ feedback of the SCell and the CSI. This is to apply the CA operation even with respect to the UE in which simultaneous uplink transmission is impossible. In LTE Rel-13 eCA, an additional SCell having a PUCCH is defined, and up to 32 carriers can be concatenated.

Figure 3D:
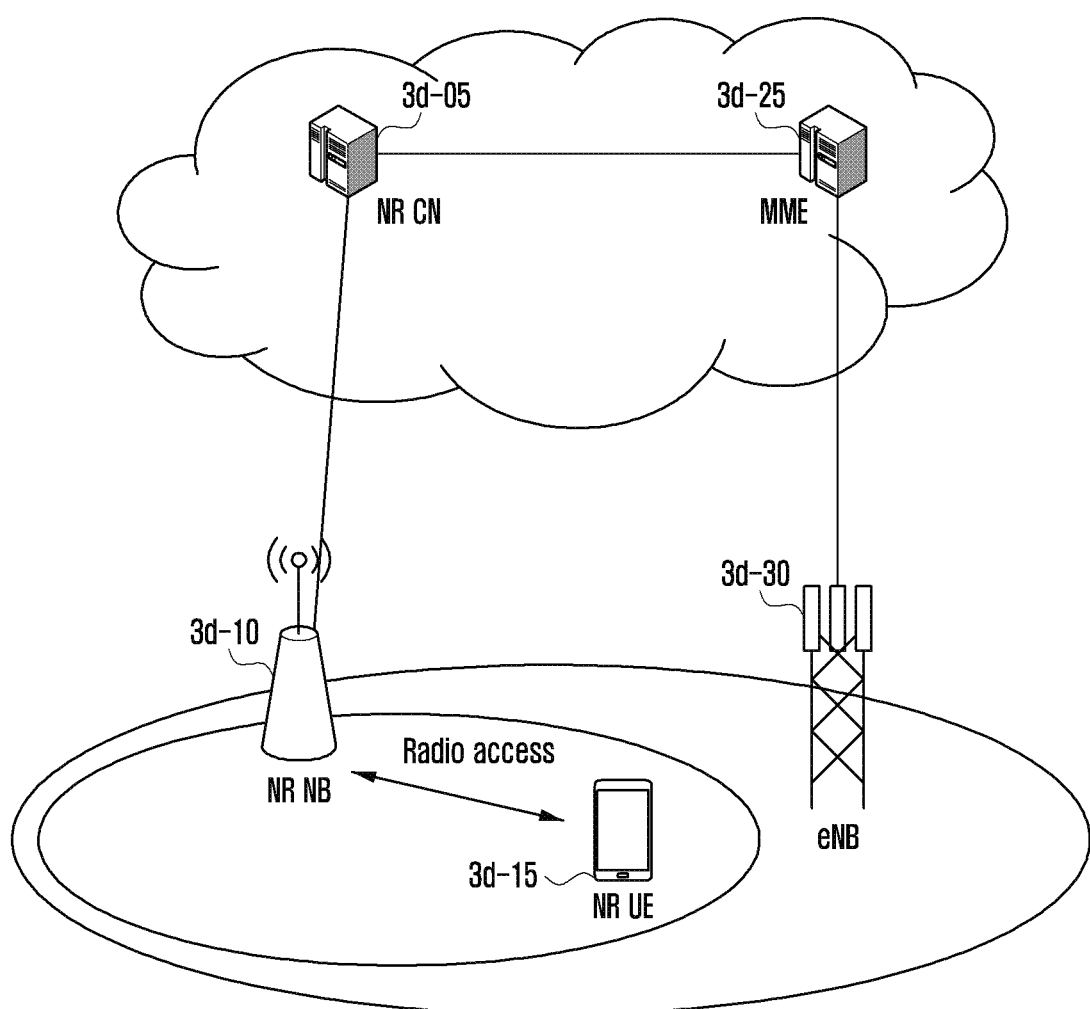
FIG. 3D is a diagram of a next-generation mobile communication system, according to an embodiment.

FIG. 3D is a diagram of a next-generation mobile communication system, according to an embodiment.

Referring to FIG. 3D, a RAN of a next-generation mobile communication system is composed of an NR NB 3d-10 and an NR CN 3d-05. NR UE or terminal 3d-15 accesses to an external network through the NR NB 3d-10 and the NR CN 3d-05.

In FIG. 3D, the NR NB 3d-10 corresponds to an eNB of the existing LTE system. The NR NB is connected to the NR UE 3d-15 on a radio channel, and thus it can provide a superior service than the service of the existing node B. Since all user traffics are serviced on shared channels in the next-generation mobile communication system, a device that performs scheduling through consolidation of status information, such as a buffer state of UEs, an available transmission power state, and a channel state, is required, and the NR NB 3d-10 controls this operation.

One NR NB generally controls a plurality of cells. In order to implement ultrahigh-speed data transmission as compared with the existing LTE, the NR NB may have a bandwidth that is greater than or equal to the existing maximum bandwidth, and a beamforming technology may be additionally grafted in consideration of OFDM as a RAT. An AMC scheme determining a modulation scheme and a channel coding rate to match the channel state of the UE is applied. The NR CN 3d-05 performs functions of mobility support, bearer setup, and QoS configuration. The NR CN is a device that controls not only a mobility management function of the UE but also various kinds of control functions, and is connected to a plurality of eNBs. The next-generation mobile communication system may interlock with the existing LTE system, and the NR CN is connected to an MME 3d-25 through a network interface. The MME is connected to an eNB 3d-30 that is the existing eNB.

A method for selectively performing path selection and packet duplication in accordance with the channel situations when UE performs packet duplication to support ultra-reliable low latency communication (URLLC) in a next-generation mobile communication system is provided. The packet duplication is used in the URLLC so that data reception reliability can be heightened by duplicating and transmitting data or a control signal through two different paths to obtain high-reliability data transmission and by acquiring transmission diversity through this. With respect to the packet duplication, DC or CA may be used. That is, the UE should be in a state where the SgNB or SCell has been configured so that the terminal can support the DC or CA.

Figure 3E:
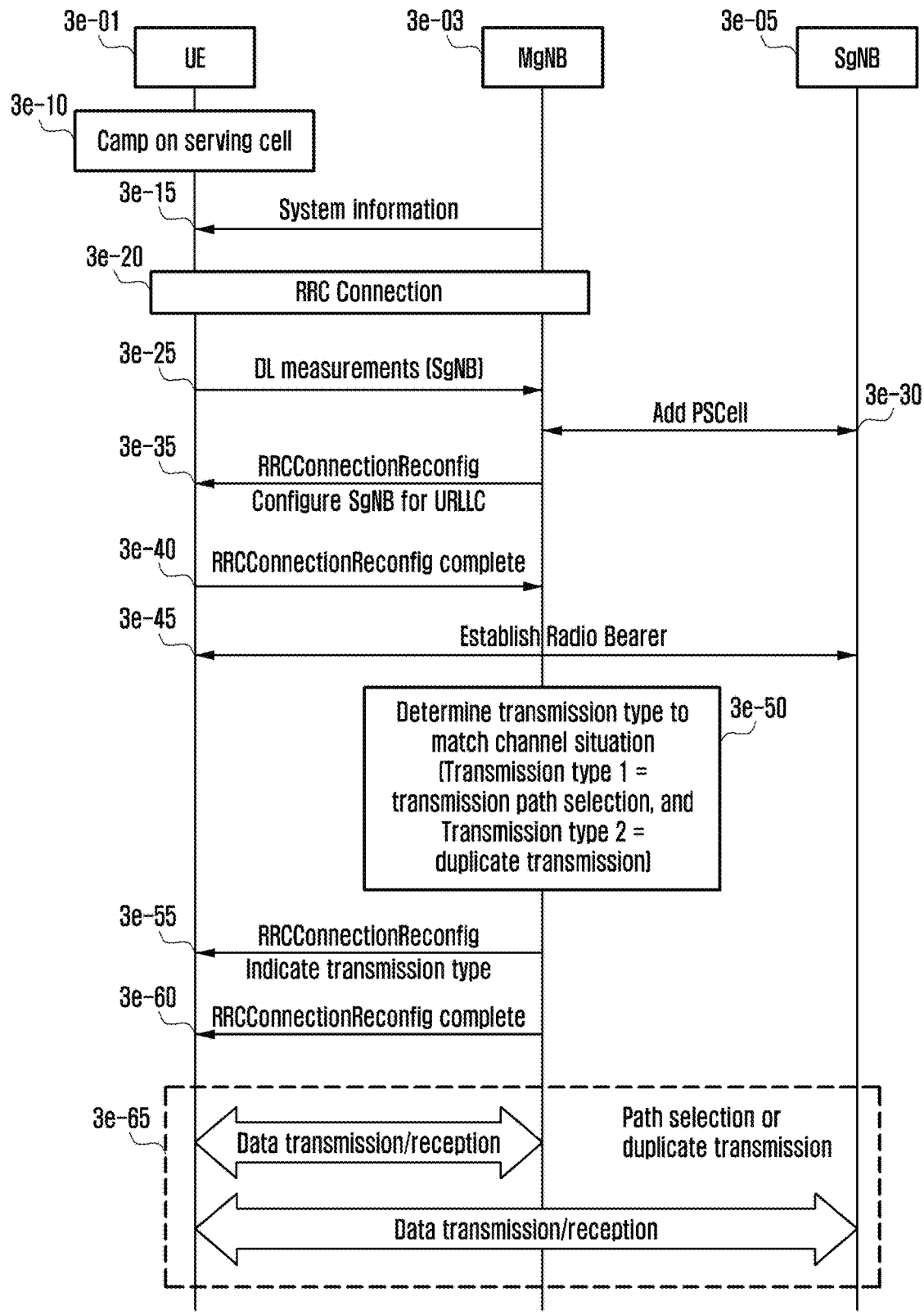
FIG. 3E is a flowchart of a method of a first operation in which a base station determines path selection and duplicate transmission type, according to an embodiment.

FIG. 3E is a diagram of a first operation in which an eNB performs path selection and determination of duplicate transmission types, according to an embodiment.

UE 3e-01 in an idle mode (RRC IDLE) searches for a suitable cell and camps on a corresponding eNB or MgNB 3e-03 (at step 3e-10), and receives system information from the eNB 3e-03 (at step 3e-15). In the idle mode, the UE 3e-01 is not connected to a network for power saving, and thus is unable to transmit data. For data transmission, the UE 3e-01 is required to be shifted to a connected mode (RRC_CONNECTED) (at step 3e-20). Thereafter, the UE 3e-01 may report a measurement value of a downlink signal strength of a neighbor cell or a cell belonging to a neighbor eNB to the eNB 3e-03 (at step 3e-25). The eNB 3e-03 adds a secondary gNB (SgNB) 3e-05 or a corresponding serving cell to the PSCell (at step 3e-30), and transfers an RRCConnectionReconfiguration message containing bearer configuration information for the SgNB 3e-05 to the UE 3e-01 (at step 3e-35). The SgNB 3e-05 bearer is a bearer configured for URLLC transmission, or additional LCG cell group and serving cell may be configured. The above-described configuration differs depending on whether the duplicate transmission is the duplicate transmission using multi-connection or the duplicate transmission using carrier aggregation.

The UE 3e-01 transmits an RRC ConnectionReconfigurationComplete message including an identification message to the SgNB 3e-05 for URLLC or serving cell configuration (at step 3e-40), and adds the SgNB 3e-05 for the URLLC or serving cell in accordance with the configuration value (at step 3e-45). The eNB 3e-03 determines what transmission type the UE performs data transmission/reception based on the channel measurement value received from the UE 3e-01 (at step 3e-50). The eNB 3e-03 can arrange channel situations between the UE 3e-01 and the eNB 3e-03 or serving cells in Table 5 below. The eNB 3e-03 can use the channel measurement value received from the UE 3e-01 in accordance with Table 5 below.

TABLE 5

| | Channel Situation | Operation |
| --- | --- | --- |
| Situation 1 | Channel situation > Two paths exceeding threshold (two paths are good) | Transmission through a preferred path (predesignated by eNB) or pre-transmittable path |
| Situation 2 | Channel situation > One path exceeding threshold (only one path is good) | Transmission through a path having good situation |
| Situation 3 | Channel situation > No path exceeding threshold (two paths are not good) | Duplicate transmission applied |

With respect to Situation 1 and Situation 2 in the above Table, the eNB 3e-03 determines and indicates the transmission path to the UE, and with respect to Situation 3, the eNB 3e-03 grasps the URLLC mode, and indicates to use both the two paths by applying the packet duplicate transmission (at step 3e-55). The UE 3e-01 having received this transmits an identification message through an RRC ConnectionReconfigurationComplete message (at step 3e-60), and performs data transmission/reception in accordance with the received transmission type (at step 3e-65). That is, the UE 3e-01 performs data transmission/reception through one configured path of eNB 3e-03 or SgNB 3e-05, or performs packet duplicate transmission using both the two paths if the packet duplication is determined.

Figure 3F:
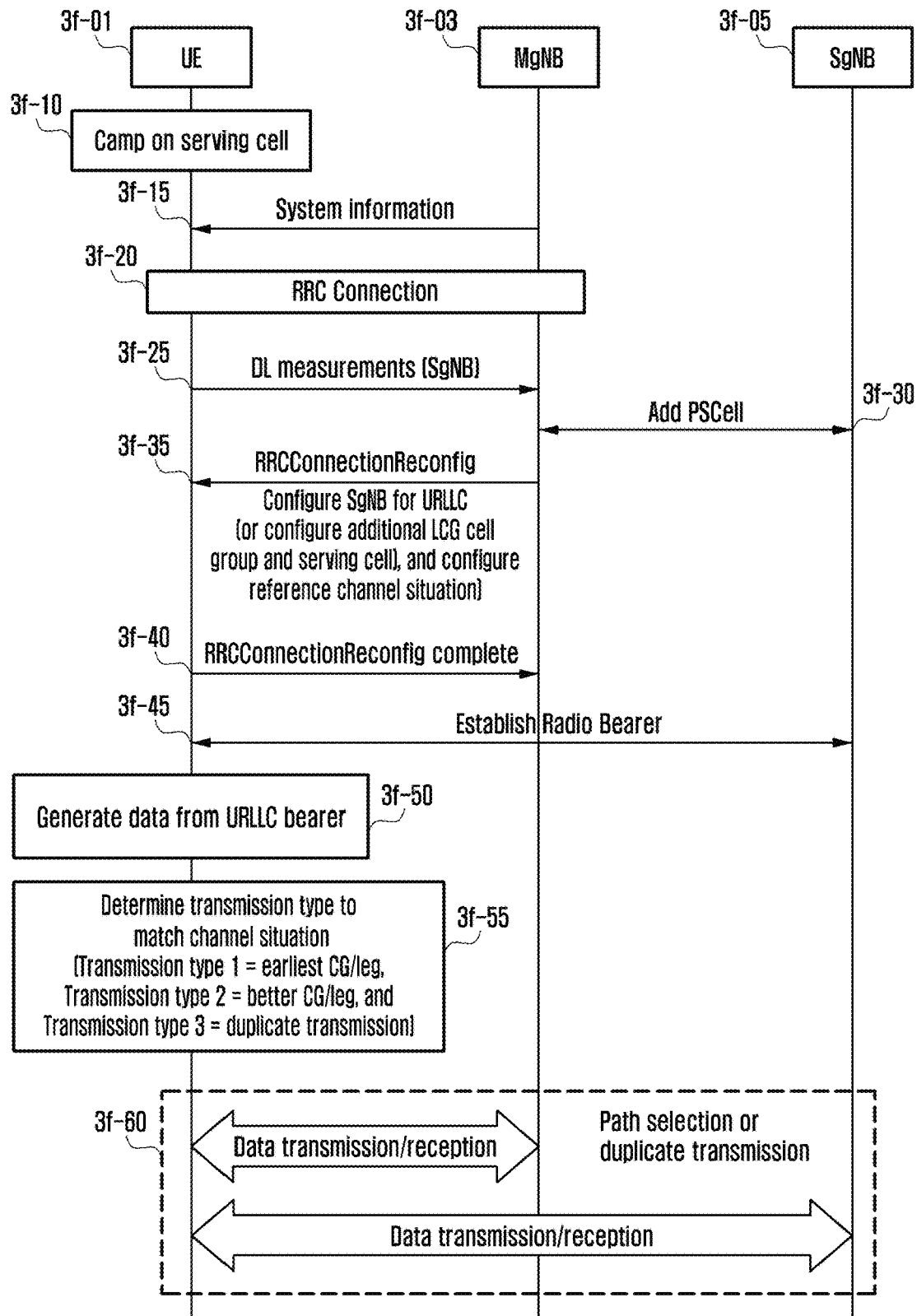
FIG. 3F is a flowchart of a method of a second operation in which a terminal determines path selection and duplicate transmission type, according to an embodiment.

FIG. 3F is a diagram of a second operation in which UE performs path selection and duplicate transmission type according, according to an embodiment.

UE 3f-01 in an idle mode (RRC_IDLE) searches for a suitable cell and camps on a corresponding eNB or MgNB 3f-03 (at step 3f-10), and receives system information from the eNB 3f-03 (at step 3f-15). In the idle mode, the UE 3f-01 is not connected to a network for power saving, and thus is unable to transmit data. For data transmission, the UE 3f-01 is required to be shifted to a connected mode (RRC CONNECTED) (at step 3f-20). Thereafter, the UE 3f-01 may report a measurement value of a downlink signal strength of a neighbor cell or a cell belonging to a neighbor eNB to the eNB 3f-03 (at step 3f-25). The eNB 3f-03 adds a secondary gNB (SgNB) 3e-05 for URLLC or a corresponding serving cell to the PSCell (at step 3f-30), and transfers an RRCConnectionReconfiguration message containing bearer configuration information for the SgNB 3e-05 to the UE 3f-01 (at step 3f-35). The SgNB 3e-05 bearer is a bearer configured for URLLC transmission, or additional LCG cell group and serving cell may be configured. The above-described configuration differs depending on whether the duplicate transmission is the duplicate transmission using multi-connection or the duplicate transmission using carrier aggregation. In the RRC message, a reference channel situation required for the UE 3f-01 to determine the transmission method may be configured. The eNB 3f-03 can arrange channel situations between the UE 3f-01 and the eNB 3f-03 or serving cells in Table 6 below, and can transfer information indicating this to the UE 3f-01. That is, the RRC message includes a preferred path for Situation 1 and threshold information for determining the channel situation, as shown in Table 6 below.

TABLE 6

| | Channel Situation | Operation |
| --- | --- | --- |
| Situation 1 | Channel situation > Two paths exceeding threshold (two paths are good) | Transmission through a preferred path (predesignated by eNB) or pre-transmittable path |
| Situation 2 | Channel situation > One path exceeding threshold (only one path is good) | Transmission through a path having good situation |
| Situation 3 | Channel situation > No path exceeding threshold (two paths are not good) | Duplicate transmission applied |

The UE 3f-01 transmits an RRCConnectionReconfigurationComplete message containing an identification message with respect to the SgNB 3e-05 for URLLC or serving cell configuration (at step 3f-40), and adds the SgNB 3e-05 for the URLLC or serving cell in accordance with the configuration value (at step 3f-45). If data is generated in the URLLC bearer (at step 3f-50), the UE 3f-01 determines what transmission type it performs data transmission/reception based on the channel measurement value for determining the transmission method received from the eNB 3f-03 and the current channel situation (at step 3f-55). That is, the UE 3f-01 determines the operation method in accordance with the situation in the Table as described above. Whether to generate the URLLC data is determined by an upper layer (application), and the upper layer indicates the UE 3f-01 whether to use the URLLC bearer.

If the channel situation is Situation 1, the UE 3f-01 performs transmission through a preferred path pre-received from the eNB 3f-03 or a pre-transmittable path. Further, in case of Situation 2, the UE 3f-01 determines one transmission path having good channel situation for data transmission/reception, and in case of Situation 3, the UE 3*f*-01 grasps that it is in the URLLC mode, and uses both the two paths through applying of the packet duplicate transmission. That is, at step 3*f*-60, the UE 3*f*-01 performs data transmission/reception through one configured path of eNB 3*f*-03 or SgNB 3*e*-05, or performs packet duplicate transmission using both the two paths if the packet duplication is determined.

Figure 3G:
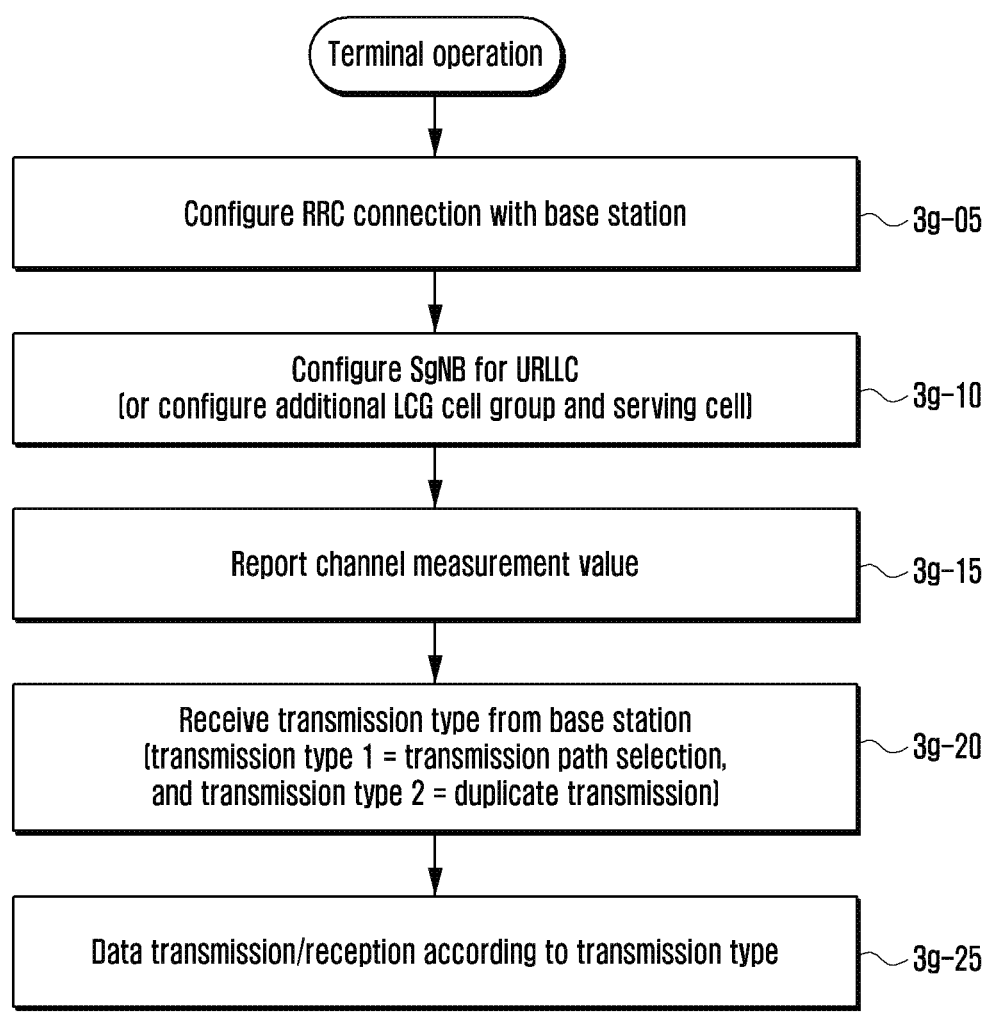
FIG. 3G is a flowchart of a method of a first operation of a terminal, according to an embodiment.

FIG. 3G is a diagram of a first operation of UE, according to an embodiment.

A UE configures a connection with an eNB for data transmission/reception (at step 3*g*-05), and receives an RRC message containing SgNB configuration for URLLC from the eNB. The SgNB bearer is a bearer configured for the URLLC transmission, and an additional LCG cell group and a serving cell may be configured. The configuration may differ depending on whether the duplicate transmission is the duplicate transmission using the multi-connection or the duplicate transmission using the carrier aggregation. Further, in accordance with the configuration value, the SgNB for the URLLC or serving cell is added and configured (at step 3*g*-10). The UE may report the measurement value of the downlink signal strength of serving cells to the eNB (at step 3*g*-15).

Thereafter, the UE receives a message including information for configuring a reference channel situation required to determine the transmission method from the eNB (at step 3*g*-20). The message may include a preferred path for Situation 1 and threshold information for determining the channel situation in Table 5. Through the message, the eNB may clearly indicate transmission type 1 indicating what path data transmission/reception should be performed, or may indicate to use both the two paths through packet duplication in the URLLC mode since the transmission channel state is not good. At step 3*g*-25, the UE performs data transmission/reception through one configured path of eNB/MgNB or SgNB in accordance with the indicated transmission type, or performs packet duplicate transmission using both the two paths if the packet duplication is determined.

Figure 3H:
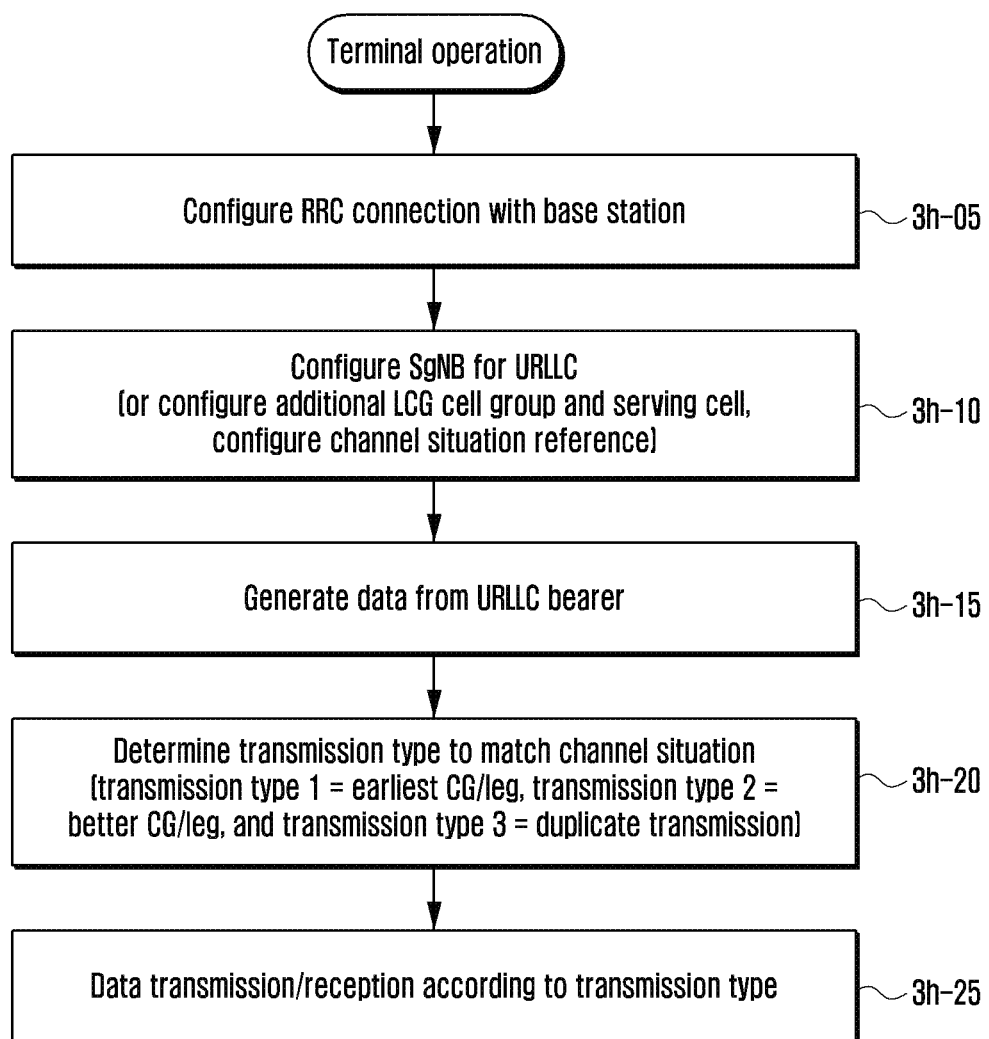
FIG. 3H is a flowchart of a method of a second operation of a terminal, according to an embodiment.

FIG. 3H is a diagram of a second operation of UE, according to an embodiment.

A UE configures a connection with an eNB for data transmission/reception (at step 3*h*-05), and receives an RRC message containing SgNB configuration for URLLC from the eNB. The SgNB bearer is a bearer configured for the URLLC transmission, and an additional LCG cell group and a serving cell may be configured. The configuration may differ depending on whether the duplicate transmission is the duplicate transmission using the multi-connection or the duplicate transmission using the carrier aggregation. In accordance with the configuration value, the UE adds and configures the SgNB for the URLLC or serving cell or channel situation reference (at step 3*h*-10).

If data is generated in the URLLC bearer (at step 3*h*-15), the UE determines what transmission type it performs data transmission/reception based on the channel measurement value for determining the transmission method received from the eNB and the current channel situation (at step 3*h*-20). That is, the UE determines the operation method in accordance with the situation in the Table 6 as described above. Whether to generate the URLLC data is determined by an upper layer (application), and the upper layer indicates the UE whether to use the URLLC bearer. At step 3*h*-25, the UE may perform data transmission/reception through one configured path of the eNB/MgNB or SgNB in accordance with the determined transmission type, or may perform packet duplicate transmission using both the two paths if the packet duplication is determined.

Figure 3I:
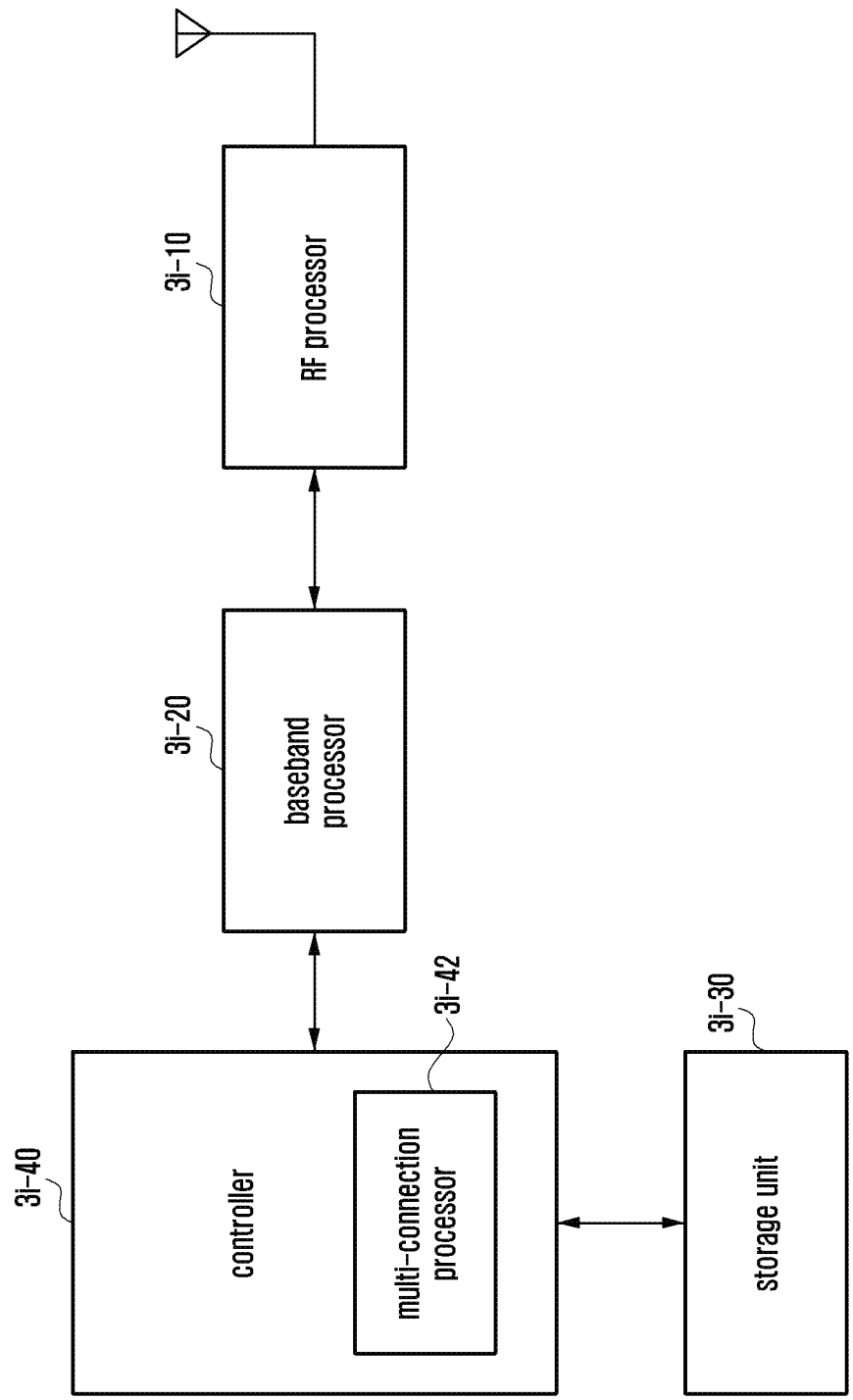
FIG. 3I is a block of a terminal, according to an embodiment.

FIG. 3I is a diagram of a terminal, according to an embodiment.

The terminal includes a RF processor 3*i*-10, a baseband processor 3*i*-20, a storage unit 3*i*-30, and a controller 3*i*-40.

The RF processor 3*i*-10 transmits and receives a signal through a radio channel, such as signal band conversion and amplification. The RF processor 3*i*-10 performs up-conversion of a baseband signal provided from the baseband processor 3*i*-20 into an RF-band signal to transmit the converted signal to an antenna, and performs down-conversion of the RF-band signal received through the antenna into a baseband signal. The RF processor 3*i*-10 may include a transmission filter, a reception filter, an amplifier, a mixer, an oscillator, a DAC, and an ADC. Although only one antenna is illustrated, the terminal may be provided with a plurality of antennas. The RF processor 3*i*-10 may include a plurality of RF chains. The RF processor 3*i*-10 may perform beamforming. For the beamforming, the RF processor 3*i*-10 may adjust phases and sizes of signals transmitted or received through the plurality of antennas or antenna elements. The RF processor may perform MIMO, and may receive several layers during performing of a MIMO operation.

The baseband processor 3*i*-20 performs conversion between a baseband signal and a bit string in accordance with the physical layer standard of the system. During data transmission, the baseband processor 3*i*-20 generates complex symbols by encoding and modulating a transmitted bit string. During data reception, the baseband processor 3*i*-20 restores a received bit string by demodulating and decoding the baseband signal provided from the RF processor 3*i*-10. When following an OFDM method, during data transmission, the baseband processor 3*i*-20 generates complex symbols by encoding and modulating a transmitted bit string, performs mapping of the complex symbols on subcarriers, and then configures OFDM symbols through the IFFT operation and CP insertion. During data reception, the baseband processor 3*i*-20 divides the baseband signal provided from the RF processor 3*i*-10 in the unit of OFDM symbols, restores the signals mapped on the subcarriers through the FFT operation, and then restores the received bit string through demodulation and decoding.

The baseband processor 3*i*-20 and the RF processor 3*i*-10 transmit and receive the signals as described above. The baseband processor 3*i*-20 and the RF processor 3*i*-10 may be called a transmitter, a receiver, a transceiver, or a communication unit. In order to support different radio connection technologies, at least one of the baseband processor 3*i*-20 and the RF processor 3*i*-10 may include a plurality of communication modules. In order to process signals of different frequency bands, at least one of the baseband processor 3*i*-20 and the RF processor 3*i*-10 may include different communication modules. The different radio connection technologies may include a wireless LAN (e.g., IEEE 802.11) and a cellular network (e.g., LTE). Further, the different frequency bands may include SHF (e.g., 2. NRHz or NRHz) band and millimeter wave (mmWave) (e.g., 60 GHz) band.

The storage unit 3*i*-30 stores a basic program for an operation of the terminal, application programs, and data of setup information. In particular, the storage unit 3*i*-30 may store information related to a connection node for performing wireless communication using a second wireless connection technology. Further, the storage unit 3*i*-30 provides stored data in accordance with a request from the controller 3*i*-40.

The controller 3*i*-40 controls the operation of the terminal. The controller 3*i*-40 transmits and receives signals through the baseband processor 3*i*-20 and the RF processor 3*i*-10. The controller 3*i*-40 records or reads data in or from the storage unit 3*i*-30. The controller 3*i*-40 may include at least one processor. The controller 3*i*-40 may include a communication processor performing a control for communication and an AP controlling an upper layer, such as an application program. The controller 3*i*-40 may include a multi-connection processor 3*i*-42 for performing a process to operate in a multi-connection mode.

Figure 3J:
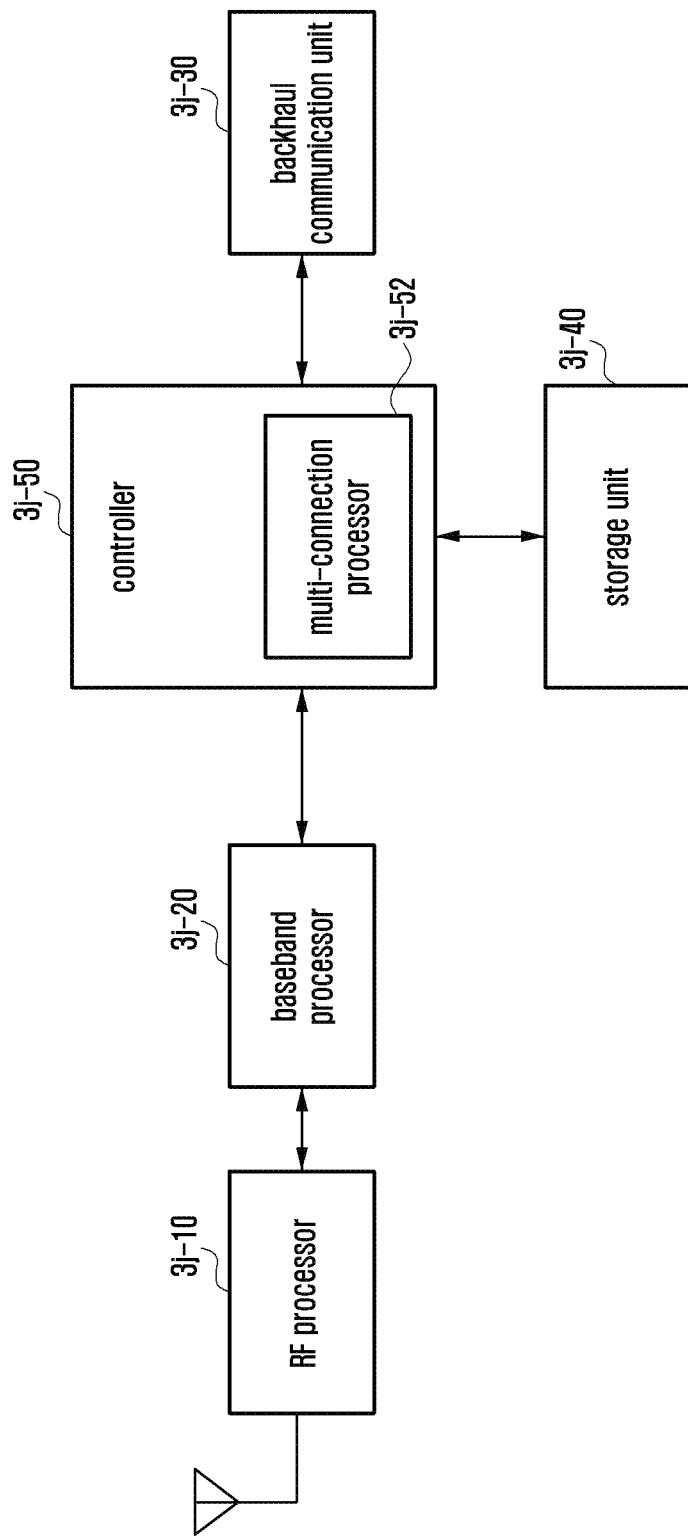
FIG. 3J is a diagram of a base station, according to an embodiment.

FIG. 3J is a diagram of a base station, according to an embodiment.

The base station includes an RF processor 3*j*-10, a baseband processor 3*j*-20, a backhaul communication unit 3*j*-30, a storage unit 3*j*-40, and a controller 3*j*-50.

The RF processor 3*j*-10 transmits and receives a signal through a radio channel, such as signal band conversion and amplification. That is, the RF processor 3*j*-10 performs up-conversion of a baseband signal provided from the baseband processor 3*j*-20 into an RF-band signal to transmit the converted signal to an antenna, and performs down-conversion of the RF-band signal received through the antenna into a baseband signal. The RF processor 3*j*-10 may include a transmission filter, a reception filter, an amplifier, a mixer, an oscillator, a DAC, and an ADC. Although only one antenna is illustrated, the base station may be provided with a plurality of antennas. The RF processor 3*j*-10 may include a plurality of RF chains. The RF processor 3*j*-10 may perform beamforming. For the beamforming, the RF processor 3*j*-10 may adjust phases and sizes of signals transmitted or received through the plurality of antennas or antenna elements. Further, the RF processor may perform down MIMO operation through transmission of one or more layers.

The baseband processor 3*j*-20 performs conversion between a baseband signal and a bit string in accordance with the physical layer standard of the first radio connection technology. During data transmission, the baseband processor 3*j*-20 generates complex symbols by encoding and modulating a transmitted bit string. During data reception, the baseband processor 3*j*-20 restores a received bit string by demodulating and decoding the baseband signal provided from the RF processor 3*j*-10. For example, when following an OFDM method, during data transmission, the baseband processor 3*j*-20 generates complex symbols by encoding and modulating a transmitted bit string, performs mapping of the complex symbols on subcarriers, and then configures OFDM symbols through the IFFT operation and CP insertion. During data reception, the baseband processor 3*j*-20 divides the baseband signal provided from the RF processor 3*j*-10 in the unit of OFDM symbols, restores the signals mapped on the subcarriers through the FFT operation, and then restores the received bit string through demodulation and decoding. The baseband processor 3*j*-20 and the RF processor 3*j*-10 transmit and receive the signals as described above. Accordingly, the baseband processor 3*j*-20 and the RF processor 3*j*-10 may be called a transmitter, a receiver, a transceiver, or a wireless communication unit.

The backhaul communication unit 3*j*-30 provides an interface for performing communication with other nodes in the network. That is, the backhaul communication unit 3*j*-30 converts a bit string transmitted from the eNB to another node, for example, an auxiliary base station or a core network, into a physical signal, and converts a physical signal received from another node into a bit string.

The storage unit 3*j*-40 stores a basic program for an operation of the main base station, application programs, and data of setup information. The storage unit 3*j*-40 may store information on a bearer allocated to the connected terminal and the measurement result reported from the connected terminal. Further, the storage unit 3*j*-40 may store information that becomes a basis of determination whether to provide or suspend a multi-connection to the terminal. Further, the storage unit 3*j*-40 provides stored data in accordance with a request from the controller 3*j*-50. The controller 3*j*-50 controls the operation of the base station. For example, the controller 3*j*-50 transmits and receives signals through the baseband processor 3*j*-20 and the RF processor 3*j*-10 or through the backhaul communication unit 3*j*-30. The controller 3*j*-50 records or reads data in or from the storage unit 3*j*-40. The controller 3*j*-50 may include at least one processor. The controller 3*j*-50 may include a multi-connection processor 3*j*-52 for performing a process to operate in a multi-connection mode.

Figure 4A:
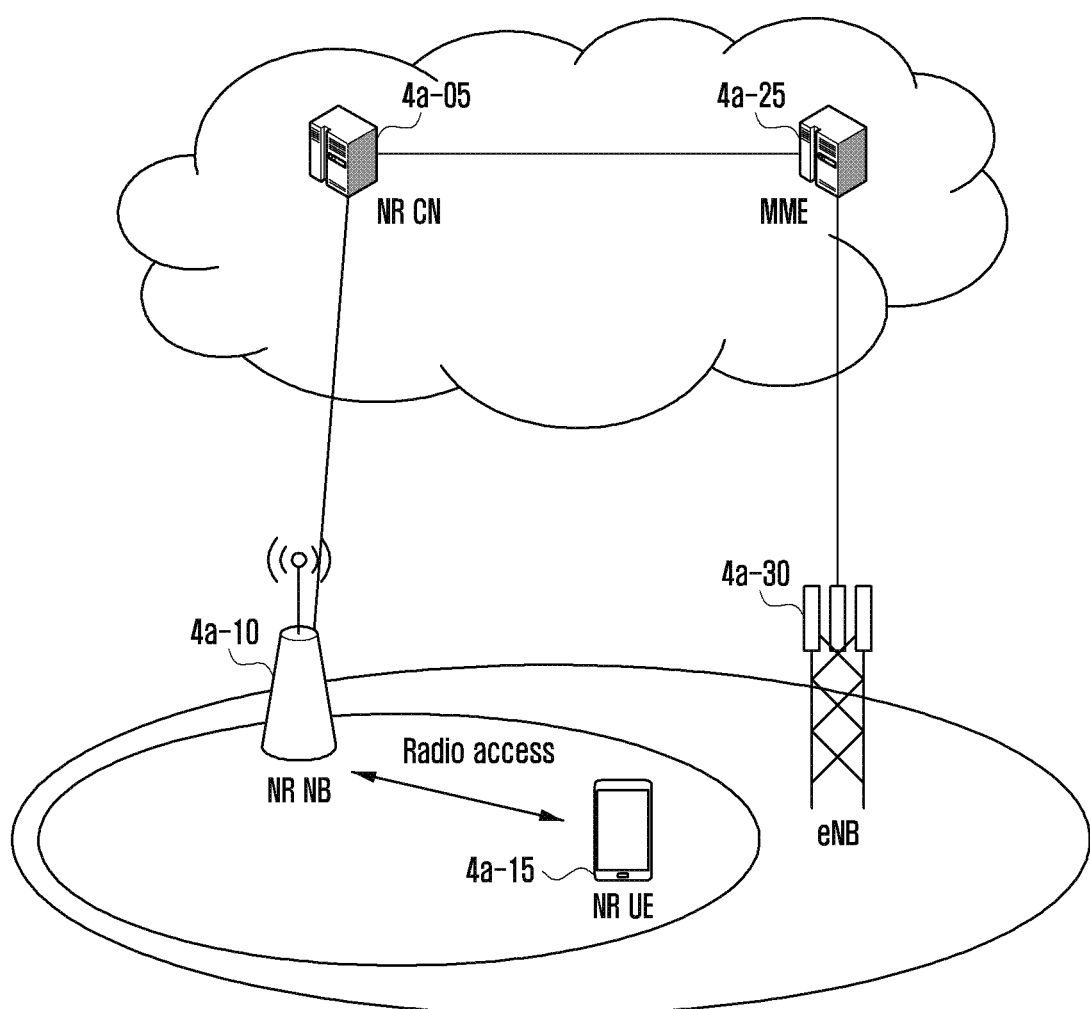
FIG. 4A is a diagram of a next-generation mobile communication system, according to an embodiment.

FIG. 4A is a diagram of a next-generation mobile communication system, according to an embodiment.

Referring to FIG. 4A, a RAN of a next-generation mobile communication system is composed of an NR NB 4*a*-10 and an NR CN 4*a*-05. NR UE or terminal 4*a*-15 accesses to an external network through the NR NB 4*a*-10 and the NR CN 4*a*-05.

In FIG. 4A, the NR NB 4*a*-10 corresponds to an eNB of the existing LTE system. The NR NB is connected to the NR UE 4*a*-15 on a radio channel, and thus it can provide a superior service than the service of the existing node B. Since all user traffics are serviced on shared channels in the next-generation mobile communication system, a device that performs scheduling through consolidation of status information, such as a buffer state of UEs, an available transmission power state, and a channel state, is required, and the NR NB 4*a*-10 controls this operation.

One NR NB generally controls a plurality of cells. In order to implement ultrahigh-speed data transmission as compared with the existing LTE, the NR NB may have a bandwidth that is greater than or equal to the existing maximum bandwidth, and a beamforming technology may be additionally grafted in consideration of OFDM as a RAT. Further, an AMC scheme determining a modulation scheme and a channel coding rate to match the channel state of the UE is applied. The NR CN 4*a*-05 performs functions of mobility support, bearer setup, and QoS configuration. The NR CN is a device that controls not only a mobility management function of the UE but also various kinds of control functions, and is connected to a plurality of eNBs. Further, the next-generation mobile communication system may interlock with the existing LTE system, and the NR CN is connected to an MME 4*a*-25 through a network interface. The MME is connected to an eNB 4*a*-30 that is the existing eNB.

Figure 4B:
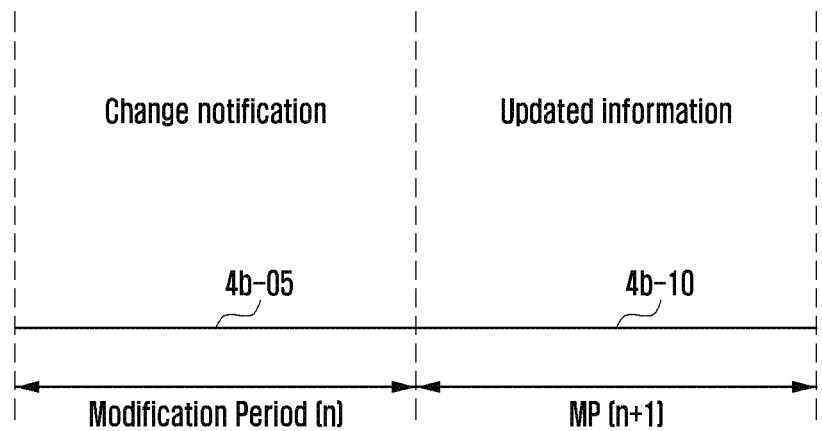
FIG. 4B is a diagram of changing system information in an LTE technology, according to an embodiment.

FIG. 4B is a diagram of a process of changing system information in an LTE technology, according to an embodiment.

System information broadcast by a base station is modified based on a modification period. In an LTE technology, the maximum value of the modification period is 10.24 sec. Excluding partial system information, newly changed system information may be broadcast from a time when each modification period starts. Further, in the previous modification period before the newly changed system information is broadcast, terminals are notified that the modified system information will be broadcast in a next modification period. If the modified system information is broadcast from the (n+1)-th modification period 4b-10, the terminals are notified the fact that the system information is to be modified just in the previous n-th modification period 4b-05. The base station notifies this using a paging message, and the terminal should receive the paging at least once in the modification period.

If systemInfoModification IE is included in the paging message, the newly updated system information is to be transmitted in a period next to the modification period in which the paging is transmitted. If the system information is modified, excluding the partial system information, a systemInfoValueTag value included in system information block (SIB) 1 is increased one by one. This may be used when the terminal camping on again in out-of coverage determines whether the system information stored therein is equal to the system information being currently broadcast. The terminal may determine whether the system information is modified using the paging message or the systemInfoValueTag of the SIB1. For reduction of power consumption, if a DRX period is extended longer than the maximum value of the modification period, the terminal may not receive the paging within the period. Further, when using an iterative transmission technique to extend a service area, a longer time than the maximum value of the modification period may be necessary to successfully decode the paging. It is not possible to identify whether the system information is newly updated. Accordingly, a solution for identifying whether the system information is newly updated solving this is necessary. In the LTE technology, if a very long DRX period is applied, or an iterative transmission technique is applied, a separate modification period is applied as shown in Table 7 below.

TABLE 7

| Use cases | Modification Period |
| --- | --- |
| (1) Normal case | SFN mod m = 0 |
| (2) For BL UEs and UEs in CE | (H-SFN * 1024 + SFN) mod m = 0 |
| (3) For UE in eDRX | H-SFN mod 256 = 0 (called eDRX acquisition period) |
| (4) For NB-IoT UE in eDRX | H-SFN mod 1024 = 0 (i.e. eDRX acquisition period for NB-IoT) |

When applying a very long DRX period or an iterative transmission technique, the modification period used to update the system information may have a very long length, and securing that the terminal can successfully decode the paging in the modification period. The specific modification period is applied in accordance with specific features applied by the terminal, that is, eMTC technology is used to extend the service area (second use case in the above Table) or eDRX technology is used to provide a very long DRX period (third and fourth use cases in the above Table). The length of the modification period applied to the eMTC technology can be configured, but the modification period applied to the eDRX technology is unable to be configured and uses a fixed value. The lengths of all the modification periods are cell-specific values, and all the terminals applying the specific features apply the modification period having the same size.

Figure 4C:
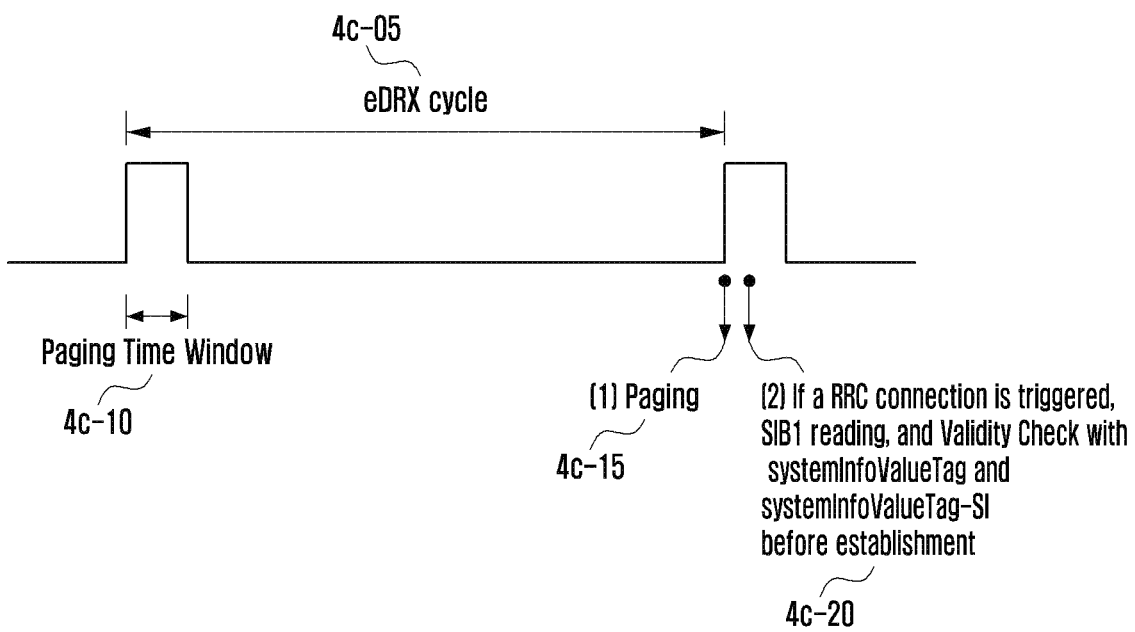
FIG. 4C is a diagram of a method for performing segmentation information (SI) validity check before RRC connection establishment in case of applying an eDRX technology in an LTE technology, according to an embodiment.

FIG. 4C is a diagram of a method for performing SI validity check before RRC connection establishment when applying an eDRX technology in an LTE technology, according to an embodiment.

If the eDRX period is longer than the modification period being applied, the terminal may perform the method of FIG. 4C. The terminal receives paging for a paging time window (PTW) time period 4c-10 configured for each eDRX period at step 4c-05. After receiving the paging at step 4c-15 for the PTW period, if a paging record of the terminal is included in the paging message, the terminal receives SIB1 being broadcast from the cell. The terminal identifies a value tag value included in the system information, and determines whether the value tag value is equal to a pre-stored value tag value. This operation is called SI validity check. If the values are different from each other, the terminal receives the system information being broadcast from the cell before an RRC connection establishment (at step 4c-20). If the paging record of the terminal is not included in the paging message, the terminal may not perform the SI validity check through reading of the SIB1. The paging message should be successfully decoded, and if the paging configuration information provided as the system information is modified, the terminal may not properly operate.

Figure 4D:
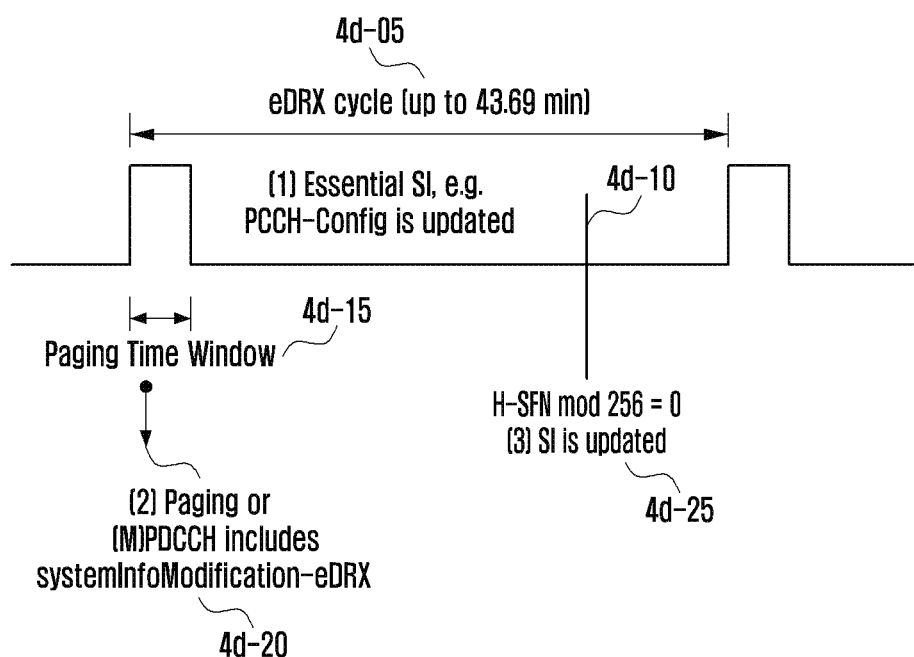
FIG. 4D is a diagram of a method for indicating whether an SI update is necessary by transmitting a paging in an extended modification period in case of applying an eDRX technology in an LTE technology, according to an embodiment.

FIG. 4D is a diagram of a method for indicating whether an SI update is necessary by transmitting a paging in an extended modification period in case of applying an eDRX technology in an LTE technology, according to an embodiment.

If the eDRX period is longer than the modification period being applied, the terminal may perform the method of FIG. 4D. The terminal receives paging for a PTW time period at step 4d-15 configured for each eDRX period at step 4d-05. If a systemInfoModification-eDRX indicator is included in the paging message, the terminal performs SI updating operation from a specific time (at step 4d-20). The indicator indicates that the updated SI is transmitted from the specific time. The time satisfies H-SFN mod 256=0 (at step 4d-10). Accordingly, the terminal performs SI update from the time (at step 4d-25). Through the reception, it can be determined that the time exists at a constant interval, that is, every 256*10.24 sec, and at a newly extended modification period. At the constant interval, the terminal has an opportunity to receive the paging message at least once in the PTW. Since the base station transmits the paging message including the indicator for the extended modification period.

A method capable of minimizing unnecessary signaling overhead when updating the SI using the paging message in the long modification period is provided.

FIG. 4E is a diagram of a plurality of modification periods, according to an embodiment. One or a plurality of network-configurable modification periods can be determined. There exists an individual systemInfoModification IE corresponding to each modification period. Further, an SI update notification method corresponding to each modification period can be signaled. For example, in a first modification period, a method using a paging message introduced in FIG. 4D can be applied, and in a second modification period, both a method for identifying a value tag before configuring the establishment introduced in FIGS. 4C and 4D and a method using a paging message can be applied.

The length and boundary of the plurality of modification periods are indicated based on a system frame number (SFN) at step 4e-05. That is, SFN mod m=0, where m denotes the length of the modification period, and the unit is one of a frame, subframe, TTI, and slot composed of one or more OFDM symbols. The configuration information on the plurality of modification periods at steps 4e-10, 4e-15, 4e-20, and 4e-25 is broadcast by a network using the system information. The lengths at steps 4e-30, 4e-35, 4e-40, and 4e-45 of the plurality of modification periods has a common multiple relationship with each other. In the LTE technology in the related art, the terminal determines a used modification period among the above-described modification periods in accordance with eMTC or eDRX. However, in the present disclosure, even if a specific feature is applied, it is featured that the terminal selects and applies one of the plurality of designated modification periods. The network broadcasts as the system information configuration information of one or more modification periods that can be selected by a specific terminal, a terminal group, or a terminal applying a specific feature. The terminal selects and applies one of modification periods in the configuration information that the terminal can select in accordance with a specific rule.

The specific rule considers a DRX period applied by the terminal, a feature applied by the terminal, or the kind of the terminal. In consideration of the features applied by the terminal, the first modification period at step 4e-10 and the second modification period at step 4e-15 are modification periods that can be selected by a general terminal, and the third modification at step period 4e-20 and the fourth modification period at step 4e-25 are modification periods that can be selected by a terminal applying the technology to extend a very long DRX period or a service area.

When selecting the modification period, the terminal selects one of a plurality of existing selectable modification periods in accordance with a specific rule. As one of specific rules, proposed is a method for selecting the shortest one of modification periods that are longer/greater than the applied DRX period among one or more modification periods selectable by the terminal. A 5G base station can be provided with DRX period information of terminals existing in a tracking area from a next-generation core network (NGC). Based on the DRX period information, the 5G base station can grasp the shortest modification period in which all terminals in the cell can receive the paging. The base station transmits the paging indicating SI update for the shortest modification period. This method can reduce the downlink signaling overhead in comparison to the method for transmitting paging indicating SI update for the maximum eDRX period in the LTE technology in the related art.

FIG. 4F is a diagram of updating system information based on a plurality of modification periods, according to an embodiment.

A base station 4f-10 broadcasts one or more pieces of modification period configuration information and an SI update notification method corresponding to each modification period using system information (at step 4f-15). The modification period configuration information indicates whether only a specific terminal, a terminal group, or a terminal applying a specific feature can use them. The specific feature may include a technology to apply a very long DRX period or an iterative transmission technology for extending a service area. The terminal 4f-05, base station 4f-10, and an NGC 4f-13 interlock with each other to determine a DRX period applied to the terminal (at step 4f-20).

The terminal 4f-05 grasps one or more modification periods that can be selected by the terminal 4f-05 itself among one or more modification periods. The terminal 4f-05 selects the shortest modification period among modification periods that are longer than the DRX period applied by the terminal 4f-05 itself (at step 4f-25). The base station 4f-10 determines updating of the system information (at step 4f-26). The base station 4f-10 requests the maximum DRX period value with respect to terminals existing in the tracking area from the NGC 4f-13 (at step 4f-27). The NGC 4f-13 provides the maximum DRX period value (at step 4f-28).

The base station 4f-10 determines the modification period in which all terminals in the cell can receive the paging using the maximum DRX period information. The base station 4f-10 transmits the paging message indicating the SI update during the determined modification period (at step 4f-29). The paging message includes a systemInfoModification IE corresponding to the determined modification period. The base station 4f-10 broadcasts the SI updated in the coming modification period (at step 4f-40). All terminals in the cell determine an accurate SI updating time by deriving the modification period corresponding to the systemInfoModification (at step 4f-30). In the coming modification period, the terminal 4f-05 starts SI updating (at step 4f-45). An SI update notification method corresponding to the modification period is applied. For example, if a value tag has been configured, the terminal 4f-05 grasps whether the SI is the latest SI by identifying the value tag before establishment (at step 4f-50).

Figure 4G:
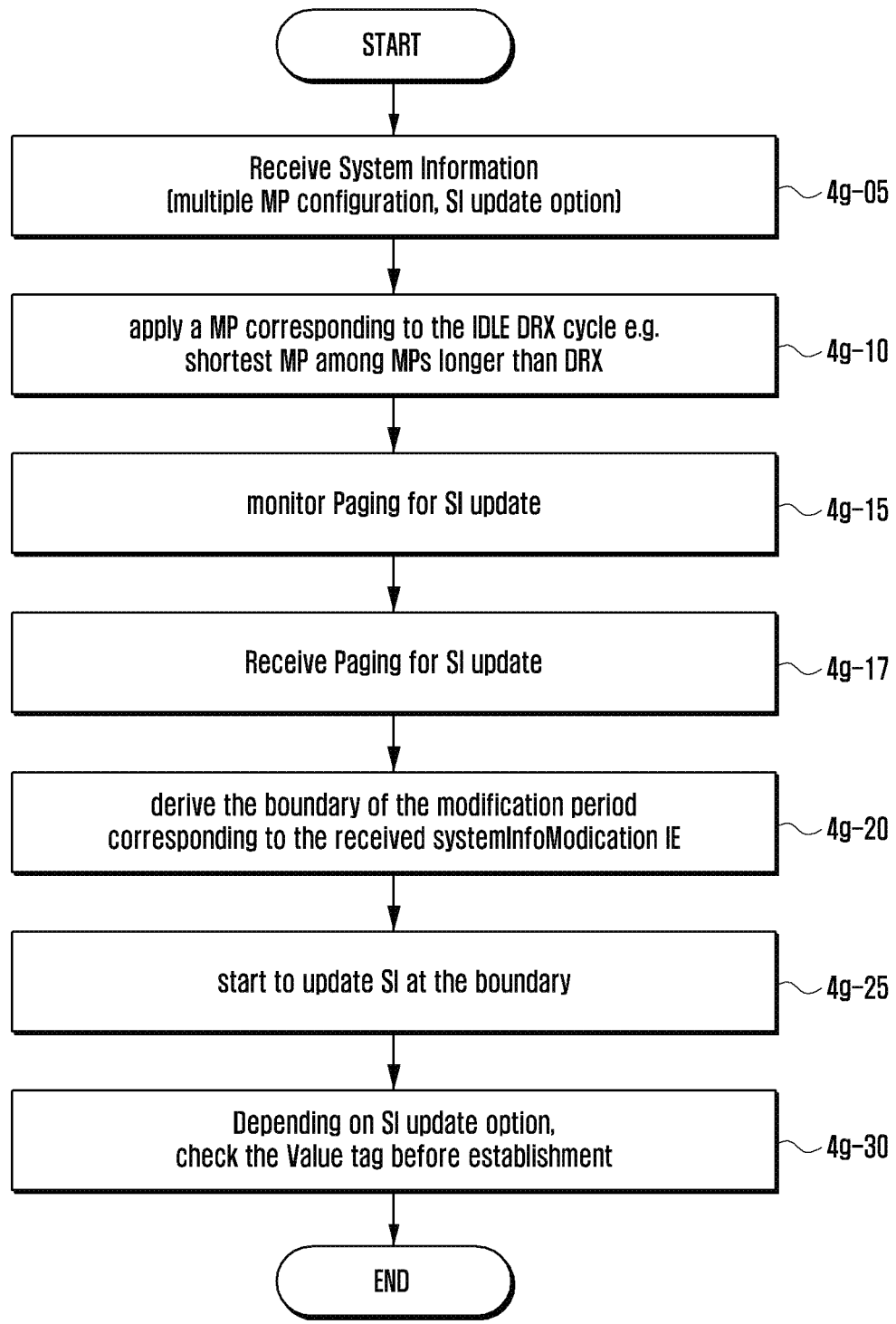
FIG. 4G is a flowchart of a method of an operation of a terminal, according to an embodiment.

FIG. 4G is a flowchart of a method of an operation of a terminal, according to an embodiment.

At step 4g-05, a terminal receives from a base station one or more pieces of modification period configuration information and an SI update notification method corresponding to each modification period. At step 4g-10, the terminal selects a first modification period that is shortest among modification periods that are longer than a DRX period applied by the terminal itself. At step 4g-15, the terminal determines whether a paging message is transmitted in the selected first modification period. At step 4g-17, the terminal receives the paging message indicating SI update. At step 4g-20, the terminal grasps a boundary of the second modification period corresponding to a systemInfoModification IE included in the paging message. At step 4g-25, the terminal updates the system information at the coming boundary. At step 4g-30, the terminal applies an SI update notification method corresponding to the first modification period.

Figure 4H:
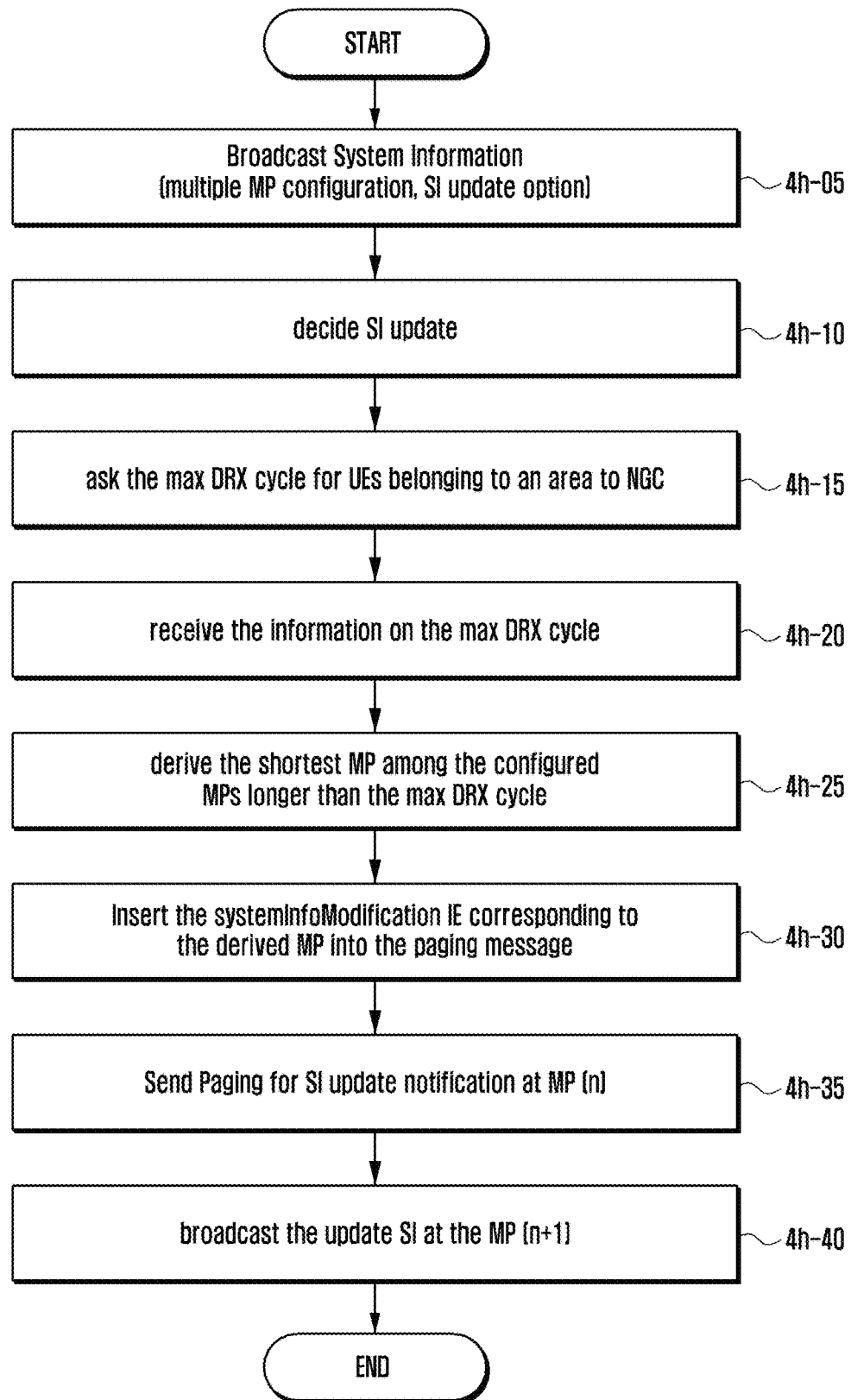
FIG. 4H is a flowchart of a method of an operation of a base station, according to an embodiment.

FIG. 4H is a flowchart of an operation of a base station, according to an embodiment.

At step 4h-05, a base station broadcasts one or more pieces of modification period configuration information and an SI update notification method corresponding to each modification period using system information. At step 4h-10, the base station determines updating of the system information. At step 4h-15, the base station requests the maximum DRX period value among DRXs applied to terminals belonging to a specific area, such as a tracking area, from an NGC. At step 4h-20, the base station receives the maximum DRX period value from the NGC. At step 4h-25, the base station selects the shortest second modification period among modification periods that are longer than the maximum DRX period value. At step 4h-30, the base station includes the systemInfoModification IE corresponding to the second modification period in the paging message indicating the SI update. At step 4h-35, the base station repeatedly transmits the paging in the n-th second modification period. At step 4h-40, the base station transmits the updated system information from the (n+1)-th second modification period.

Figure 4I:
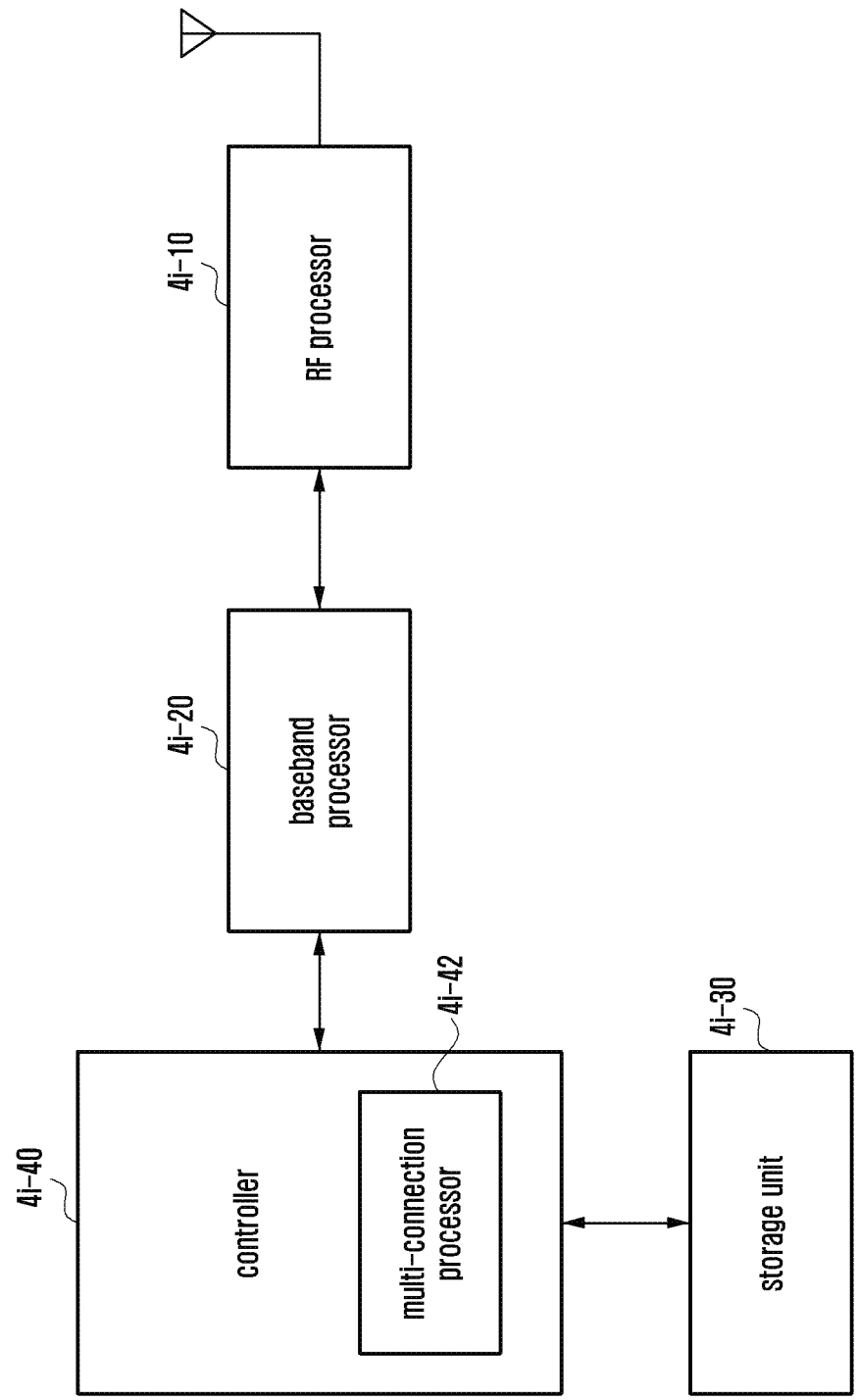
FIG. 4I is a diagram of a terminal, according to an embodiment.

FIG. 4I is a diagram of a terminal, according to an embodiment.

The terminal includes an RF processor 4i-10, a baseband processor 4i-20, a storage unit 4i-30, and a controller 4i-40.

The RF processor 4i-10 transmits and receives a signal through a radio channel, such as signal band conversion and amplification. The RF processor 4i-10 performs up-conversion of a baseband signal provided from the baseband processor 4i-20 into an RF-band signal to transmit the converted signal to an antenna, and performs down-conversion of the RF-band signal received through the antenna into a baseband signal. The RF processor 4i-10 may include a transmission filter, a reception filter, an amplifier, a mixer, an oscillator, a DAC, and an ADC. Although only one antenna is illustrated, the terminal may be provided with a plurality of antennas. The RF processor 4i-10 may include a plurality of RF chains. The RF processor 4i-10 may perform beamforming. For the beamforming, the RF processor 4i-10 may adjust phases and sizes of signals transmitted or received through the plurality of antennas or antenna elements. The RF processor may perform MIMO, and may receive several layers during performing of a MIMO operation.

The baseband processor 4i-20 performs conversion between a baseband signal and a bit string in accordance with the physical layer standard of the system. During data transmission, the baseband processor 4i-20 generates complex symbols by encoding and modulating a transmitted bit string. During data reception, the baseband processor 4i-20 restores a received bit string by demodulating and decoding the baseband signal provided from the RF processor 4i-10. For example, when following OFDM method, during data transmission, the baseband processor 4i-20 generates complex symbols by encoding and modulating a transmitted bit string, performs mapping of the complex symbols on subcarriers, and then configures OFDM symbols through the IFFT operation and CP insertion. During data reception, the baseband processor 4i-20 divides the baseband signal provided from the RF processor 4i-10 in the unit of OFDM symbols, restores the signals mapped on the subcarriers through the FFT operation, and then restores the received bit string through demodulation and decoding.

The baseband processor 4i-20 and the RF processor 4i-10 transmit and receive the signals as described above. The baseband processor 4i-20 and the RF processor 4i-10 may be called a transmitter, a receiver, a transceiver, or a communication unit. In order to support different radio connection technologies, at least one of the baseband processor 4i-20 and the RF processor 4i-10 may include a plurality of communication modules. In order to process signals of different frequency bands, at least one of the baseband processor 4i-20 and the RF processor 4i-10 may include different communication modules. The different radio connection technologies may include a wireless LAN (e.g., IEEE 802.11) and a cellular network (e.g., LTE). The different frequency bands may include SHF (e.g., 2. NRHz or NRHz) band and millimeter wave (mmWave) (e.g., 60 GHz) band.

The storage unit 4i-30 stores a basic program for an operation of the terminal, application programs, and data of setup information. The storage unit 4i-30 may store information related to a connection node for performing wireless communication using a second wireless connection technology. The storage unit 4i-30 provides stored data in accordance with a request from the controller 4i-40.

The controller 4i-40 controls the operation of the terminal. The controller 4i-40 transmits and receives signals through the baseband processor 4i-20 and the RF processor 4i-10. The controller 4i-40 records or reads data in or from the storage unit 4i-30. The controller 4i-40 may include at least one processor. The controller 4i-40 may include a communication processor performing a control for communication and an AP controlling an upper layer, such as an application program. The controller 4i-40 may include a multi-connection processor 4i-42 for performing a process to operate in a multi-connection mode.

Figure 4J:
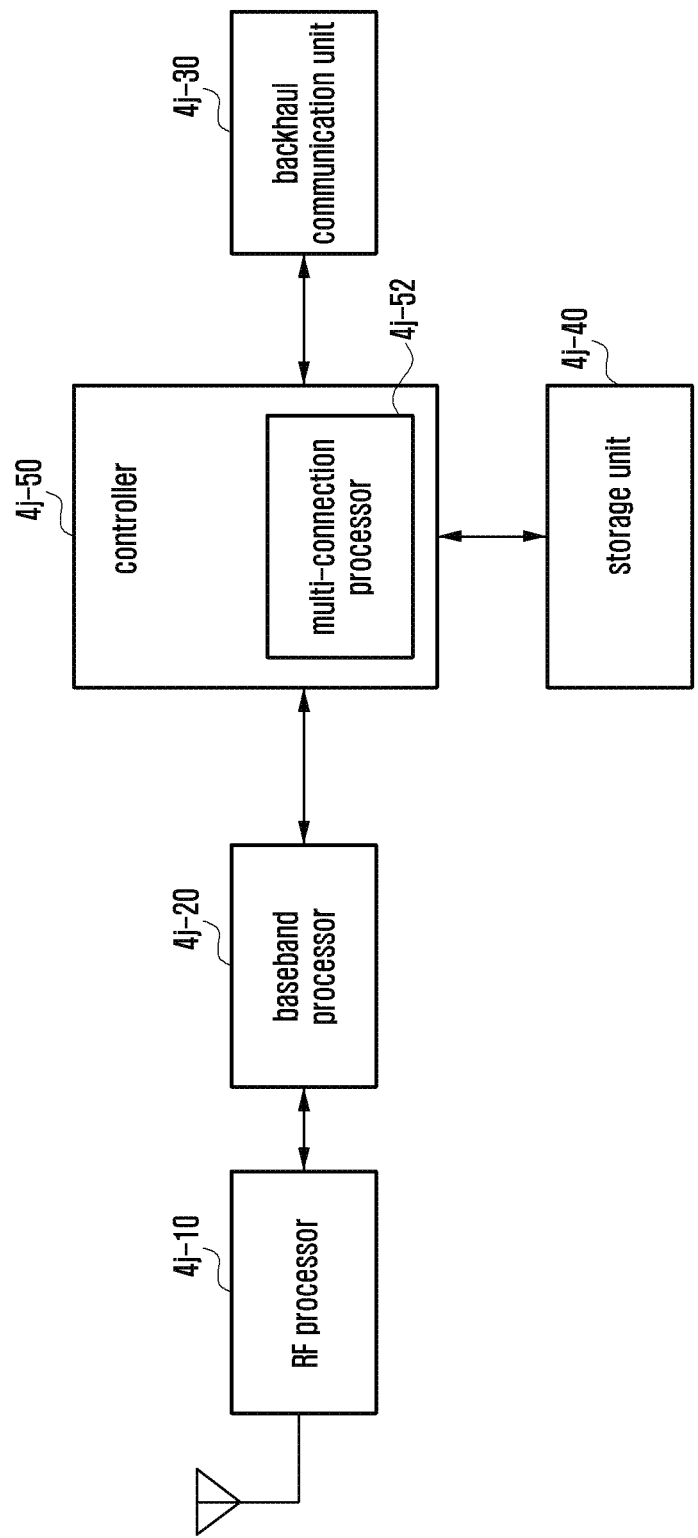
FIG. 4J is a diagram of a base station, according to an embodiment.

FIG. 4J is a diagram of a base station, according to an embodiment.

The base station includes an RF processor 4j-10, a baseband processor 4j-20, a backhaul communication unit 4j-30, a storage unit 4j-40, and a controller 4j-50.

The RF processor 4j-10 transmits and receives a signal through a radio channel, such as signal band conversion and amplification. That is, the RF processor 4j-10 performs up-conversion of a baseband signal provided from the baseband processor 4j-20 into an RF-band signal to transmit the converted signal to an antenna, and performs down-conversion of the RF-band signal received through the antenna into a baseband signal. The RF processor 4j-10 may include a transmission filter, a reception filter, an amplifier, a mixer, an oscillator, a DAC, and an ADC. Although only one antenna is illustrated, the base station may be provided with a plurality of antennas. Further, the RF processor 4j-10 may include a plurality of RF chains. The RF processor 4j-10 may perform beamforming. For the beamforming, the RF processor 4j-10 may adjust phases and sizes of signals transmitted or received through the plurality of antennas or antenna elements. The RF processor may perform down MIMO operation through transmission of one or more layers.

The baseband processor 4j-20 performs conversion between a baseband signal and a bit string in accordance with the physical layer standard of the first radio connection technology. During data transmission, the baseband processor 4j-20 generates complex symbols by encoding and modulating a transmitted bit string. During data reception, the baseband processor 4j-20 restores a received bit string by demodulating and decoding the baseband signal provided from the RF processor 4j-10. For example, when following an OFDM method, during data transmission, the baseband processor 4j-20 generates complex symbols by encoding and modulating a transmitted bit string, performs mapping of the complex symbols on subcarriers, and then configures OFDM symbols through the IFFT operation and CP insertion. During data reception, the baseband processor 4j-20 divides the baseband signal provided from the RF processor 4j-10 in the unit of OFDM symbols, restores the signals mapped on the subcarriers through the FFT operation, and then restores the received bit string through demodulation and decoding. The baseband processor 4j-20 and the RF processor 4j-10 transmit and receive the signals as described above.

The baseband processor 4j-20 and the RF processor 4j-10 may be called a transmitter, a receiver, a transceiver, or a wireless communication unit.

The backhaul communication unit 4j-30 provides an interface for performing communication with other nodes in the network. The backhaul communication unit 4j-30 converts a bit string transmitted from the eNB to another node, for example, an auxiliary base station or a core network, into a physical signal, and converts a physical signal received from another node into a bit string.

The storage unit 4j-40 stores a basic program for an operation of the main base station, application programs, and data of setup information. The storage unit 4j-40 may store information on a bearer allocated to the connected terminal and the measurement result reported from the connected terminal. The storage unit 4j-40 may store information that becomes a basis of determination whether to provide or suspend a multi-connection to the terminal. The storage unit 4j-40 provides stored data in accordance with a request from the controller 4j-50.

The controller 4j-50 controls the base station. The controller 4j-50 transmits and receives signals through the baseband processor 4j-20 and the RF processor 4j-10 or through the backhaul communication unit 4j-30. The controller 4j-50 records or reads data in or from the storage unit 4j-40. The controller 4j-50 may include at least one processor. The controller 4j-50 may include a multi-connection processor 4j-52 for performing a process to operate in a multi-connection mode.

The methods and apparatuses described herein may be implemented in the form of hardware, software, or a combination of hardware and software.

In case of software implementation, a non-transitory computer readable storage medium storing one or more programs (software modules) may be provided. One or more programs stored in the computer readable storage medium are configured for execution by one or more processors in an electronic device. The one or more programs include instructions instructing the electronic device to execute the methods according to the embodiments described in claims and the description.

Such programs (software modules or software) may be stored in a random access memory (RAM), nonvolatile memory including a flash memory, read only memory (ROM), electrically erasable programmable read only memory (EEPROM), magnetic disc storage device, compact disc-ROM (CD-ROM), digital versatile discs (DVDs) or other types of optical storage devices, and magnetic cassette. Further, the programs may be stored in a memory composed of a combination of parts or the whole thereof. Further, a plurality of constituent memories may be included.

Further, the programs may be stored in an attachable storage device capable of accessing through communication networks, such as Internet, Intranet, local area network (LAN), wide LAN (WLAN), and storage area network (SAN), or communication networks composed of combinations thereof. Such a storage device may be connected to a device performing the methods described herein through an external port. Further, a separate storage device on the communication network may be connected to the device performing the methods described herein.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method performed by a terminal in a wireless communication system, the method comprising:
   receiving, from a base station, a control message including a first information element on a first logical channel and a second information element on a list of at least one serving cell allowed for a second logical channel associated with a packet duplication, wherein the list of the at least one serving cell includes a serving cell index for each of the at least one serving cell;
   mapping the second logical channel to a second serving cell of the at least one serving cell based on the second information element;
   transmitting, to the base station, a buffer status report (BSR) associated with the first logical channel and the second logical channel;
   receiving, from the base station, a third information element allocating an uplink resource for transmitting a first data packet associated with the first logical channel and a fourth information element allocating an uplink resource for transmitting a second data packet associated with the second logical channel; and
   transmitting, to the base station, the first data packet based on the third information element and the second data packet based on the fourth information element,
   wherein the first data packet is associated with the first logical channel which is mapped to a first serving cell and the second data packet is associated with the second logical channel which is mapped to the second serving cell, and
   wherein the second data packet is a duplicate of the first data packet.

2. The method of claim 1, wherein the first data packet and the second data packet are not transmitted on a same carrier.

3. The method of claim 1, wherein the first serving cell and the second serving cell are different.

4. A method performed by a base station in a wireless communication system, the method comprising:
   transmitting, to a terminal, a control message including a first information element on a first logical channel and a second information element on a list of at least one serving cell allowed for a second logical channel associated with a packet duplication, wherein the list of the at least one serving cell includes a serving cell index for each of the at least one serving cell;
   receiving, from the terminal, a buffer status report (BSR) associated with the first logical channel and the second logical channel;
   transmitting, to the terminal, a third information element allocating an uplink resource for receiving a first data packet associated with the first logical channel and a fourth information element allocating an uplink resource for receiving a second data packet associated with the second logical channel; and
   receiving, from the terminal, the first data packet based on the third information element and the second data packet based on the fourth information element,
   wherein the second logical channel is mapped to a second serving cell of the at least one serving cell based on the second information element,
   wherein the first data packet is associated with the first logical channel which is mapped to a first serving cell and the second data packet is associated with the second logical channel which is mapped to the second serving cell, and
   wherein the second data packet is a duplicate of the first data packet.

5. The method of claim 4, wherein the first data packet and the second data packet are not received on a same carrier.

6. The method of claim 4, wherein the first serving cell and the second serving cell are different.

7. A terminal in a wireless communication system, the terminal comprising:
   a transceiver; and
   a controller configured to:
   receive, from a base station, via the transceiver, a control message including a first information element on a first logical channel and a second information element on a list of at least one serving cell allowed for a second logical channel associated with a packet duplication, wherein the list of the at least one serving cell includes a serving cell index for each of the at least one serving cell,
   map the second logical channel to a serving second cell of the at least one serving cell based on the second information element, transmit, to the base station, via the transceiver, a buffer status report (BSR) associated with the first logical channel and the second logical channel, receive, from the base station, via the transceiver, a third information element allocating an uplink resource for transmitting a first data packet associated with the first logical channel and a fourth information element allocating an uplink resource for transmitting a second data packet associated with the second logical channel, and transmit, to the base station, via the transceiver, the first data packet based on the third information element and the second data packet based on the fourth information element, wherein the first data packet is associated with the first logical channel which is mapped to a first serving cell and the second data packet is associated with the second logical channel which is mapped to the second serving cell, and wherein the second data packet is a duplicate of the first data packet.

8. The terminal of claim 7, wherein the first data packet and the second data packet are not transmitted on a same carrier.

9. The terminal of claim 7, wherein the first serving cell and the second serving cell are different.

10. A base station in a wireless communication system, the base station comprising:
   a transceiver; and
   a controller configured to:
      transmit, to a terminal, via the transceiver, a control message including a first information element on a first logical channel and a second information element on a list of at least one serving cell allowed for a second logical channel associated with a packet duplication, wherein the list of the at least one serving cell includes a serving cell index for each of the at least one serving cell,
      receive, from the terminal, via the transceiver, a buffer status report (BSR) associated with the first logical channel and the second logical channel,
      transmit, to the terminal, via the transceiver, a third information element allocating an uplink resource for receiving a first data packet associated with the first logical channel and a fourth information element allocating an uplink resource for receiving a second data packet associated with the second logical channel, and
      receive, from the terminal, via the transceiver, the first data packet based on the third information element and the second data packet based on the fourth information element,
   wherein the second logical channel is mapped to a second serving cell of the at least one serving cell based on the second information element,
   wherein the first data packet is associated with the first logical channel which is mapped to a first serving cell and the second data packet is associated with the second logical channel which is mapped to the second serving cell, and
   wherein the second data packet is a duplicate of the first data packet.

11. The base station of claim 10, wherein the first data packet and the second data packet are not received on a same carrier.

12. The base station of claim 10, wherein the first serving cell and the second serving cell are different.

* * * * *